US008489990B2

(12) United States Patent
Radloff et al.

(10) Patent No.: US 8,489,990 B2
(45) Date of Patent: Jul. 16, 2013

(54) PLAYLISTS AND BOOKMARKS IN AN INTERACTIVE MEDIA GUIDANCE APPLICATION SYSTEM

(75) Inventors: Jon P. Radloff, Castle Rock, CO (US); Thomas J. Carroll, Bensalem, PA (US); Mark Heyner, Golden, CO (US); Kenneth F. Carpenter, Jr., Mount Laurel, NJ (US); Danny R. Gaydou, II, Exton, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 589 days.

(21) Appl. No.: 11/366,863

(22) Filed: Mar. 2, 2006

(65) Prior Publication Data

US 2006/0267995 A1 Nov. 30, 2006

Related U.S. Application Data

(60) Provisional application No. 60/658,270, filed on Mar. 2, 2005, provisional application No. 60/667,870, filed on Apr. 1, 2005.

(51) Int. Cl.
*G06F 3/00* (2006.01)

(52) U.S. Cl.
USPC ........... 715/721; 715/716; 715/719; 715/720; 715/772; 715/833; 715/974; 369/30.08; 725/37

(58) Field of Classification Search
USPC ................. 715/721, 716, 772, 719, 720, 833, 715/974; 369/30.08
See application file for complete search history.

(56) References Cited

U.S. PATENT DOCUMENTS

| 5,616,876 | A  | * | 4/1997  | Cluts .............................. 84/609 |
| 6,204,840 | B1 | * | 3/2001  | Petelycky et al. ............. 715/202 |
| 6,493,002 | B1 | * | 12/2002 | Christensen .................. 715/779 |
| 6,744,967 | B2 |   | 6/2004  | Kaminski et al. |
| 6,847,778 | B1 | * | 1/2005  | Vallone et al. ................ 386/344 |
| 6,850,691 | B1 |   | 2/2005  | Stam et al. |
| 7,034,916 | B2 | * | 4/2006  | Bubie et al. ..................... 352/40 |
| 7,130,616 | B2 | * | 10/2006 | Janik .......................... 455/412.1 |
| 7,321,716 | B1 | * | 1/2008  | Vallone et al. ................ 386/344 |
| 7,934,010 | B2 |   | 4/2011  | Foster et al. |
| 2002/0092021 | A1 |   | 7/2002 | Yap et al. |
| 2002/0122052 | A1 | * | 9/2002 | Reich et al. .................... 345/716 |

(Continued)

FOREIGN PATENT DOCUMENTS

| EP | 0939405 A2 | 9/1999 |
| WO | WO 00/59214 | 10/2000 |
| WO | WO-2007120239 A2 | 10/2007 |

OTHER PUBLICATIONS

International Preliminary Report on Patentability dated May 22, 2009 PCT/US2007/023682 (GW-16 PCT).

(Continued)

*Primary Examiner* — Patrick Riegler
(74) *Attorney, Agent, or Firm* — Ropes & Gray LLP

(57) ABSTRACT

Systems and method are provided for providing a playlist transport bar. The playlist transport bar provides an overlay which graphically represents assets (e.g., programs) of a playlist in a manner that enables a user to simultaneously ascertain a playback position within the playlist and a particular asset. The playlist transport may include asset regions which each correspond to an asset in a playlist and a position indication region which may provide information relating to a playback position.

38 Claims, 25 Drawing Sheets

U.S. PATENT DOCUMENTS

| | | | |
|---|---|---|---|
| 2002/0174430 A1* | 11/2002 | Ellis et al. | 725/46 |
| 2003/0078782 A1* | 4/2003 | Blair | 704/270.1 |
| 2003/0093790 A1* | 5/2003 | Logan et al. | 725/38 |
| 2003/0103079 A1* | 6/2003 | Adatia et al. | 345/762 |
| 2003/0146915 A1 | 8/2003 | Brook et al. | |
| 2003/0149980 A1 | 8/2003 | Hassell et al. | |
| 2003/0184598 A1* | 10/2003 | Graham | 345/838 |
| 2004/0060063 A1 | 3/2004 | Russ et al. | |
| 2004/0070628 A1* | 4/2004 | Iten et al. | 345/810 |
| 2004/0075694 A1 | 4/2004 | Partridge et al. | |
| 2004/0215718 A1 | 10/2004 | Kazmi et al. | |
| 2005/0005308 A1* | 1/2005 | Logan et al. | 725/135 |
| 2005/0086703 A1* | 4/2005 | Gupta et al. | 725/135 |
| 2005/0094031 A1* | 5/2005 | Tecot et al. | 348/473 |
| 2005/0097465 A1* | 5/2005 | Giesen et al. | 715/700 |
| 2005/0114374 A1* | 5/2005 | Juszkiewicz et al. | 707/101 |
| 2005/0141877 A1* | 6/2005 | Yoo et al. | 386/95 |
| 2005/0154988 A1 | 7/2005 | Proehl et al. | |
| 2005/0166230 A1 | 7/2005 | Gaydou et al. | |
| 2005/0210507 A1 | 9/2005 | Hawkins et al. | |
| 2005/0267995 A1 | 12/2005 | Rasmussen et al. | |
| 2006/0013554 A1* | 1/2006 | Poslinski | 386/46 |
| 2006/0020662 A1 | 1/2006 | Robinson | |
| 2006/0020971 A1* | 1/2006 | Poslinski | 725/44 |
| 2006/0026634 A1 | 2/2006 | LaChapelle et al. | |
| 2006/0026638 A1 | 2/2006 | Stark et al. | |
| 2006/0026811 A1 | 2/2006 | Shultz | |
| 2006/0059526 A1* | 3/2006 | Poslinski | 725/88 |
| 2006/0112082 A1 | 5/2006 | Platt et al. | |
| 2006/0184980 A1* | 8/2006 | Cole | 725/88 |
| 2006/0265421 A1 | 11/2006 | Ranasinghe et al. | |
| 2006/0267995 A1 | 11/2006 | Radloff et al. | |
| 2007/0028267 A1 | 2/2007 | Ostojic et al. | |
| 2007/0180057 A1 | 8/2007 | McEnroe | |
| 2007/0198111 A1* | 8/2007 | Oetzel et al. | 700/94 |
| 2007/0220566 A1 | 9/2007 | Ahmad-Taylor | |
| 2007/0300184 A1 | 12/2007 | Song | |
| 2008/0114794 A1 | 5/2008 | Craner | |
| 2008/0115173 A1 | 5/2008 | Ellis et al. | |

OTHER PUBLICATIONS

International Search Report and Written Opinion dated Sep. 29, 2008, PCT/US2007/023682 (GW-16 PCT).

ISO/TC 46/SC 9: "Additional Revision to ISO/CD 15706, ISAN," Oct. 5, 1999, Video Standards and Drafts.

Roisin, C., "Authoring Structured Multimedia Documents," SOFSEM: Theory and Practice of Informatics, Conference on Current Trends in Theory and Practice of Informatics. Proceedings, XX, Nov. 21, 1998, pp. 222-239 Abstract.

Sezan, I., et al., "TV Anytime Forum Metadat Requirements," Mar. 10, 2000, Video Standards and Drafts.

\* cited by examiner

|  |  | 7:03PM |
| --- | --- | --- |
| YOUR VOD BRAND | | |
| FRIDAY NIGHT LIST 586MIN | CONTAINS 5 PROGRAMS | |
| ✓ A ☐ AND THEN SELECT ✗ BELOW TO DELETE PROGRAMS. | | |
| ORDER | PROGRAM TITLES | ✓ |
| 1 | SOPRANO #32 TONY'S SUPRISE | ☐ |
| 2 | SOPRANO #33 ANOTHER ANGEL | ☐ |
| 3 | DIE ANOTHER DAY | ☐ |
| 4 ⇕ | GOLDEN EYE | ■ |
| 5 | THE MATRIX | ☐ |

*FIG. 8*

|  |  | 7:03PM |
| --- | --- | --- |
| YOUR VOD BRAND | | |
| FRIDAY NIGHT LIST 586MIN | CONTAINS 5 PROGRAMS | |
| ✓ A ☐ AND THEN SELECT ✗ BELOW TO DELETE PROGRAMS. | | |
| ORDER | PROGRAM TITLES | ✓ |
| 1 | SOPRANO #32 TONY'S SUPRISE | ☐ |
| 2 | SOPRANO #33 ANOTHER ANGEL | ☐ |
| 3 | DIE ANOTHER DAY | ☐ |
| 4 ⇕ | GOLDEN EYE | ☑ |
| 5 | THE MATRIX | ☐ |

PLAYLISTS AND BOOKMARKS IN AN INTERACTIVE MEDIA GUIDANCE APPLICATION SYSTEM

This application claims the benefit of U.S. Provisional Application Nos. 60/667,870 and 60/658,270, filed Apr. 1, 2005 and Mar. 2, 2005, respectively, the disclosures of which are hereby incorporated herein in their entireties.

BACKGROUND OF THE INVENTION

The present invention is directed towards systems and methods for providing playlists and bookmarks in interactive media guidance application systems.

Playlists are known and may be used to determine the order in which assets (e.g., television programs, songs, etc.) are played. As defined herein, an asset refers to any type of media that may be played. Such media may include all the variants of television media, music media, interactive games, and other audio and/or video media. Assets may be added to a playlist, deleted from a playlist, or rearranged in a playlist. Various user interfaces are provided to enable a user to make such modifications to playlists.

Playlists may include several assets of similar or different media types ranging, for example, from two to several hundreds or thousands of assets. Thus, when the playtime of each asset is totaled, a substantial amount of time may be required to playback the entire playlist. Since playlists may include several assets, a user may wish to be provided with information related to the playback of assets in a particular playlist. For example, a user may be interested in knowing how much time has elapsed during playback of a playlist or an asset, or how much time is remaining in the playlist or the asset. Known systems may be able to provide information as to how much time has elapsed and give an indication as to how much time remains for a given asset, but these systems are limited to providing such information for only that one given asset and are further unable to simultaneously provide information that gives a user a sense of position within a playlist. Moreover, some of these systems require a full screen display to display such information, thereby preventing a user from simultaneously viewing programming and information related to a playlist.

Accordingly, it is desirable to provide systems and methods for providing information in a manner that enables a user to easily ascertain a playback position within a playlist and a particular asset.

It is also desirable to provide systems and methods for playlist and bookmark related features.

It is further desirable to provide systems and method for providing VOD program information screens that provide access to playlist and bookmark features.

SUMMARY OF THE INVENTION

In accordance with the principles of the present invention, systems and methods are provided for providing a playlist transport bar. The playlist transport bar provides an overlay which graphically represents assets of a playlist in a manner that enables a user to simultaneously ascertain a playback position within the playlist and a particular asset. As defined herein, a playback position is the position corresponding to a particular position in the playlist, including a particular asset, being accessed (e.g., played, paused, rewinded, fast-forwarded, skipped to the beginning of next asset, etc.). For example, if a program is paused at the half-way point of an asset (e.g., a VOD program), the playback position is at the half-way point of that asset. As another example, if the user is viewing the third hour of five hours of total programming for a playlist, the playback position is at the three-hour elapsed time position for all programming in the playlist (even though the playlist position may also be at, for example, a twenty minute elapsed time position for a currently playing asset).

The playlist transport bar may include several asset regions each corresponding to an asset in the playlist and a position indication region that provides an indication of the playback position. The manner in which asset regions are displayed may vary, depending on a number of factors. In one embodiment, an asset region for each asset in the playlist may be displayed in the playlist transport bar. In this approach, the interactive media guidance application may appropriately size each asset region to fit within the playlist transport bar. The interactive media application may apportion each asset region to be the same size, regardless of the playback time for the assets. Alternatively, the interactive media application may apportion a size to each asset region based on its playback time relative to the playback times of other assets in the playlist, while taking into account the limited display space provided in the playlist transport bar. For example, a two-hour long asset may be apportioned a larger size than a half-hour long asset.

In another embodiment, the playlist transport bar may display a limited number of asset regions so as to not saturate the playlist transport bar with asset regions corresponding to all the potential assets of a playlist. By limiting the number of asset regions displayed in the playlist transport bar at any given time, this allows the interactive media guidance application to appropriate a predetermined minimum amount of space to each displayed region. The spacing allotted to each region may accurately reflect the length of a particular asset with respect to the other shown assets. For example, a two-hour program may be presented in an asset region that is two times larger than an hour long program. In addition, in this embodiment, information may be provided that provides an indication of the playback position within the playlist.

The position indication region may serve as a visual indicator that moves along the transport bar and provides information relating to a playback position within the playlist and/or a particular asset. The position indication region may include a position needle and an information region. The position needle may provide a visual indication of a playback position within the playlist and/or a particular asset. For example, in one embodiment, the position needle may indicate both the playback position within a particular asset and the playlist. In another embodiment, the position needle may only indicate the position within an asset. In this latter embodiment, the information region may provide information relating to the playback position within the playlist. The information region may display other information such as the elapsed time of the currently accessed asset, which action (e.g., pausing, fast-forwarding, resuming play, etc.) the user is implementing, or any other information relating to the playback of assets in a playlist.

In one embodiment, the user may "drag and drop" the position indication region to a desired location using, for example, cursor arrows of a remote device. This allows a user to manually position the position indication region at any playback position on the transport bar, thereby providing a user with the ability to resume playback of any asset in the playlist at a particular playback position. In another embodiment, the interactive media guidance application may permit a user to "skip to the next" asset region. This may permit a user to skip to the beginning of an adjacent asset region.

The playlist transport bar may allow a user to navigate a highlight region to various elements within the transport bar, and, if desired, select the highlighted regions. For example, a user may navigate a highlight region to the asset regions, the position indication region, and other areas of the transport bar such as a playlist name region. Additional information or menus may be displayed depending on which elements of the transport bar are highlighted or selected.

The playlist transport bar may allow a user to modify (e.g., delete an asset) the playlist without requiring the user to access interactive media guidance application features specifically dedicated to allowing a user to modify a playlist. In addition, the playlist transport bar may allow a user to switch to another playlist, thereby enabling the user to playback assets of a different playlist.

In other embodiments, systems and methods are provided for playlist and bookmark related features. In addition, systems and method are also provided for providing VOD program information screens that provide access to playlist and bookmark features.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 8 shows an illustrative playlist with programs screen showing a highlight region that can be navigated to a checkbox in accordance with an embodiment of the invention;

FIG. 9 shows an illustrative playlist with programs screen showing that a checkbox of FIG. 8 can be selected to indicate that the program associated with the selected checkbox is to be deleted from the playlist in accordance with an embodiment of the invention;

DETAILED DESCRIPTION OF THE INVENTION

This document is divided into five major Sections. Section I describes an illustrative system architecture for an interactive media guidance application system in accordance with various embodiments of the present invention. Section II describes playlist-related features in accordance with various embodiments of the present invention. Section III describes bookmark-related features in accordance with various embodiments of the present invention. Section IV describes an illustrative transport bar for playback of programs from playlists in accordance with various embodiments of the present invention. Section V describes illustrative VOD program information screens for providing access to playlist and bookmark features in accordance with various embodiments of the present invention.

Section I. Illustrative System Architecture

Figure 1:
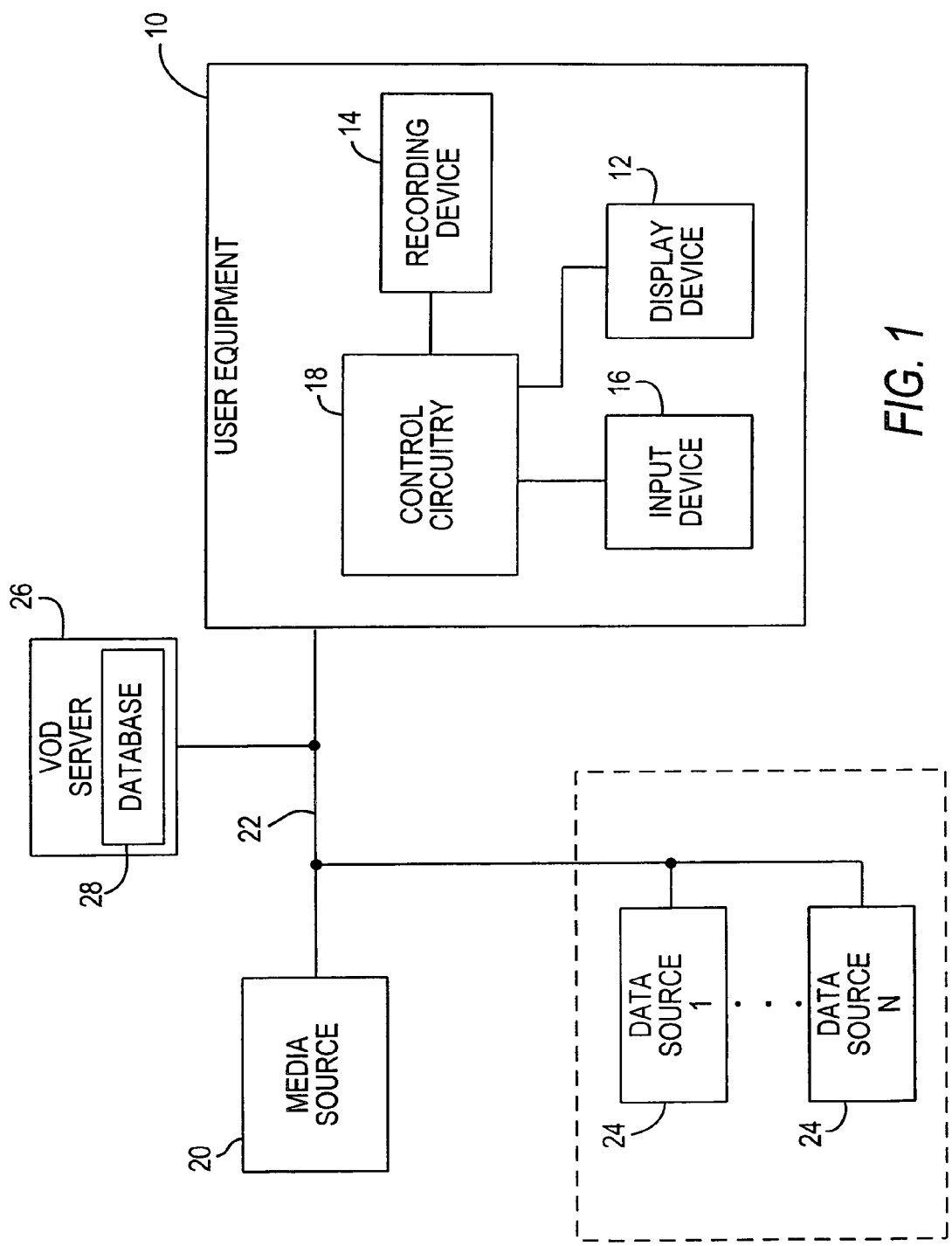
FIG. 1 is a diagram of an illustrative interactive media guidance system in accordance with an embodiment of the invention.

An illustrative interactive media system in accordance with the principles of the invention is shown in FIG. 1. User equipment 10 receives content in the form of signals from media source 20 over communications path 22.

Media source 20 may be any suitable content source such as, for example, a cable system headend, satellite television distribution facility, television broadcast facility, or any other suitable facility for originating or distributing content. Media source 20 may be configured to transmit signals over any suitable communications path 22 including, for example, a satellite path, a fiber-optic path, a cable path, or any other suitable wired or wireless path. The signals may carry any suitable content such as, for example, television programs, internet, music, news, television program listings, or any other suitable media.

VOD server 26 provides on-demand programs and associated VOD program data (e.g., VOD titles, VOD descriptions, VOD prices (if applicable), VOD viewing window data and other VOD metadata). VOD server 26 stores the VOD program data in, and retrieves the data from, database 28. As discussed below, VOD server 26 may also, in some embodiments, store playlists and saved program lists for users of user equipment 10 in database 28. VOD server 26 exchanges messages and media with user equipment 10 over communications path 22, but in other embodiments communications may be exchanged over a separate path (not shown). VOD server 26 may reside, for example, in a cable system headend. If desired, VOD server may also be a media source.

User equipment 10 may include any suitable equipment including, for example, computer equipment (e.g., a personal computer with a television card (PCTV)), television equipment, or any other suitable equipment. The television equipment may include a television, set-top box, recording device, video player, user input device (e.g., remote control, keyboard, mouse, touch pad, touch screen, voice recognition interface, etc.) or any other device suitable for providing an interactive television experience having features described in the various embodiments below. In the example of FIG. 1, user equipment 10 includes at least control circuitry 18, display device 12 and recording device 14, and user input device 16, which may be implemented as separate devices or as a single device. An interactive media guidance application may be implemented on the user equipment to display, on display device 12, the content transmitted by media source 20 over path 22, and to provide interactive media guidance application features. The interactive media guidance application may also provide users with access to VOD content and VOD data from VOD server 26.

Recording device 14 may be any of a personal video recorder, digital video recorder (DVR), video cassette recorder (VCR), DVD-recorder, or any other suitable video recorder. Recording device 14 may include one or more tuners. Recording device 14 may record programs under the control of the interactive media guidance application that resides on user equipment 10.

Display device 140 may be any suitable device including, for example, a television monitor and a computer monitor. Display device 140 may also be configured to provide for the output of audio.

The user equipment may include control circuitry 18 adapted to receive user instructions and execute the operations of an interactive media guidance application, such as an interactive program guide application. Control circuitry 18 may include one or more tuners (e.g., analog or digital tuners), decoders (e.g., MPEG decoders) processors, memory (e.g., RAM and hard disks), communications circuitry (e.g., cable modem circuitry for two-way communications with VOD server 26), input/output circuitry (e.g., graphics circuitry), and connections to the various devices of user equipment 10, and any other suitable component for providing analog or digital television programming, program recording, and interactive media guidance features. Control circuitry 18 may be configured to execute the instructions of the interactive media guidance application from memory. In one embodiment, control circuitry 18 may be included as part of one of the devices of user equipment 10 such as, for example, part of recording device 14, display 12, or any other device (e.g., a set-top box, television, video player, etc.).

User equipment 10 may receive interactive media guidance application data from one or more data sources 24. The number of data sources 24 may depend on the number of interactive media guidance applications. For example, one data source 24 may provide interactive media guidance data for non-on-demand assets (e.g., non-pay and pay-per-view television programs), and another may provide data for home shopping application data. In some embodiments VOD data (e.g., VOD programs) and program guide data may be provided to user equipment 10 by a data source 24. In such embodiments VOD server 26 may still provide VOD content.

In some embodiments, data sources 24 may provide data to the interactive media guidance application using a suitable client/server approach. There may be one server per data source or, in some embodiments, a single server may communicate as a proxy between user equipment 10 and various data sources 24.

The playlist and bookmark features described below are described as provided in embodiments where user equipment 10 provides an interactive media guidance application such as interactive television program guide. In such embodiments, user equipment 10 may include a Motorola DCT series settop box. Program guide instructions are executed by control circuitry 18 (FIG. 1). Program guide data is received from a data source 24 and stored by control circuitry 18. Control circuitry 18 executes program guide instructions and retrieves program guide data from memory when displaying program guide screens on display device 12. The displays may be provided in response to user instructions received by an input device 16, such as a remote control.

In these embodiments, the program guide may be programmed with extensions for communicating with a vendor-specific VOD server 26. The program guide extensions may call VOD-vendor-specific objects that may contain vendor-specific code for requesting VOD data from a VOD server 26, and for accessing content from VOD server 26. VOD server 26 may store data for some features provided by the interactive media guidance application such as, for example, playlist and saved program list data.

For purposes of clarity, the following discussion may sometimes describe an embodiment in which the interactive media guidance application is an interactive television program guide or interactive television application. It will be understood, however, that the following discussion and the features discussed may be applied to any interactive media guidance application such as, for example, an online program guide or a Website.

Section II. Playlists

Some embodiments of the present invention provide features for creating and managing playlists. Playlists are lists of programs that an interactive television application will play back sequentially for the user. Users may select one or more programs for inclusion in a playlist. After creating a playlist, the user can select the playlist for playback. Each program in the playlist is played back for the user, one after another in time. In some embodiments, real-time features such as pause, stop, fast-forward and rewind may be provided to allow the user to control playback of programs in the playlist. In some embodiments, the interactive application may recommend programs for inclusion in a playlist, or provide pre-made playlists.

An illustrative set of playlist features in an embodiment where users create and manage playlists of free VOD programs using an interactive television program guide (IPG) is described below. This is only illustrative, as such features may be incorporated in embodiments in which playlists include other types of programs (e.g., recorded programs (such as programs recorded on recording device 14 of FIG. 1), and non-free on-demand programs), and in which the interactive television application is not an IPG.

Figure 2:
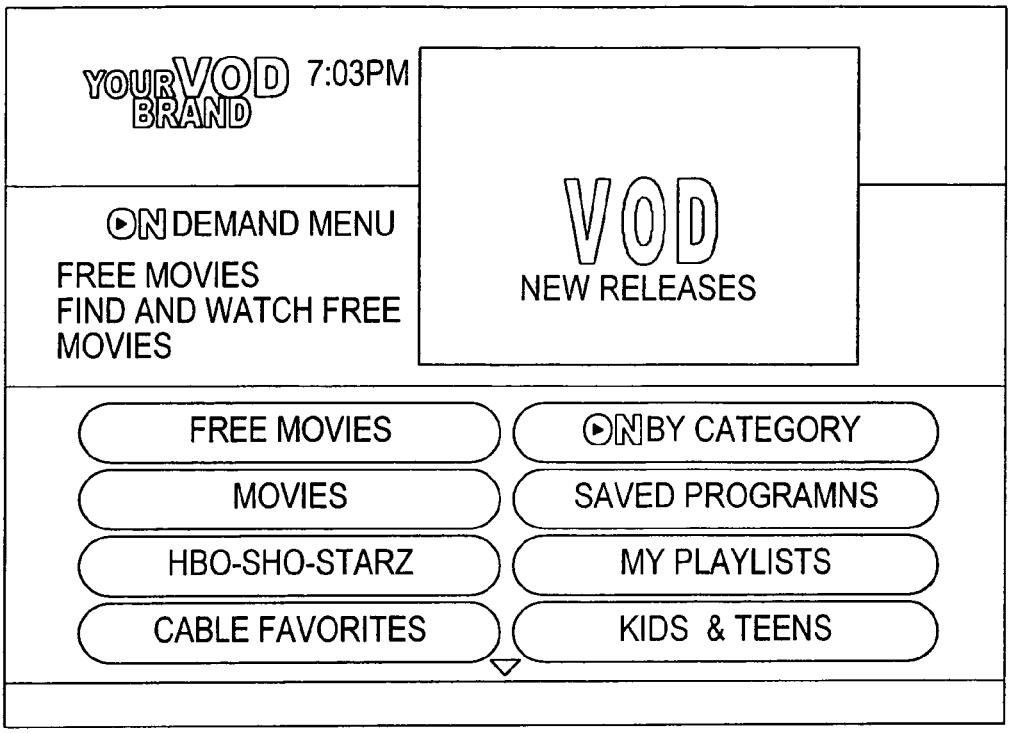
FIG. 2 shows an illustrative VOD menu with a "My Playlists" option for providing a user with access to playlist features in accordance with an embodiment of the invention.

FIG. 2 below shows an illustrative VOD menu with a "My Playlists" option for providing a user with access to playlist features. In other embodiments, users may access playlist features from other menus or displays, such as an IPG main menu or VOD program information screen (see Section V below) for example. In this layout, the VOD menu includes a barker window for video clips.

Figure 3:
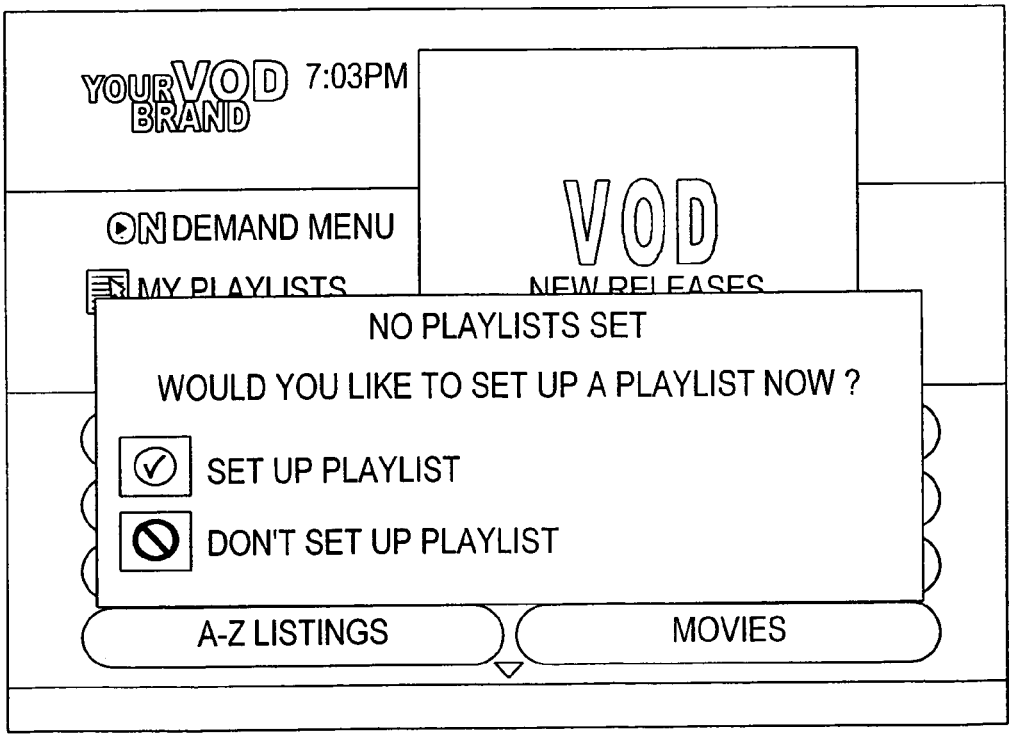
FIG. 3 shows an illustrative no playlists set overlay that may be displayed when the user selects the My Playlist option from the VOD menu of FIG. 2 in accordance with an embodiment of the invention.

FIG. 3 shows an illustrative No Playlists Set Overlay that may be displayed when the user selects My Playlists from the VOD Main Menu of FIG. 2, or other IPG menus or screens, and no playlists have been created. Tables 1 and 2 describe illustrative behaviors of the IPG and/or VOD server 26 in connection with providing such an overlay.

TABLE 1

Illustrative No Playlists Set Overlay System Description

| No. | Description |
|---|---|
| 1.0 | The Guide may display the No Playlists Set Overlay when the user selects My Playlists from the VOD Main Menu or other menus or screens provided by the Guide and no playlists have been created. |
| 1.1 | The Guide may display the title "NO PLAYLISTS SET" on the No Playlists Set Overlay in the language specified by the user in the Guide setup, in yellow text. |
| 1.2 | The Guide may display the prompt "Would you like to set up a playlist now?" on the No Playlists Set Overlay in the language specified by the user in Guide setup, in white text. |
| 1.3 | The Guide may display the OK/Yes icon on the No Playlists Set Overlay with the label "Set up Playlist" in the language specified by the user in the Guide setup, in white text. |
| 1.4 | The Guide may display the Cancel icon on the No Playlists Set Overlay with the label "Don't set up Playlist" in the language specified by the user in the Guide setup, in white text. |
| 2.0 | The default highlight may be the OK/Yes icon. |
| 3.0 | Except as specified in this section, this confirmation screen may follow the description provided in the Common Confirmation Overlay section in the Appendix. |
| 4.0 | New "default" playlists may be named automatically according to the following format: "Playlist <lowest positive integer not already used to name a playlist>". |

TABLE 2

Illustrative No Playlists Set Overlay Action Icon Table

| No. | Name | Condition | Description |
|---|---|---|---|
| 1.0 | Set up Playlist | Always present | Creates a new, empty playlist and displays the Default Playlist Screen for the new playlist. |
| 2.0 | Don't set up Playlist | Always present | Dismisses the No Playlists Set Overlay. |

Figure 4:
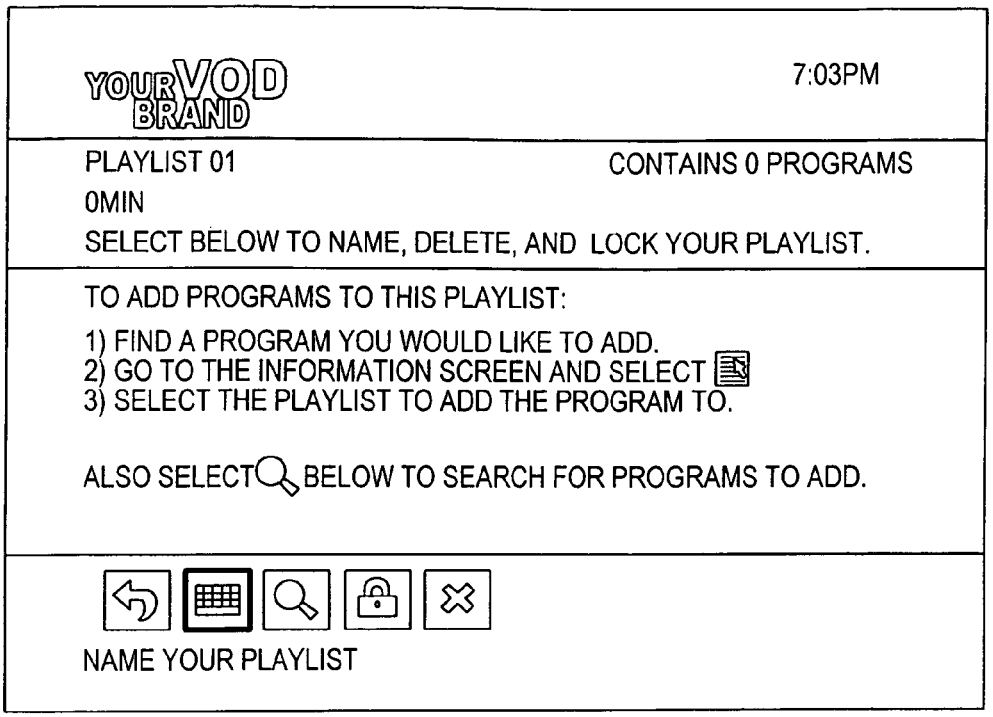
FIG. 4 shows an illustrative screen that may be displayed when the user selects a Set up Playlist button on the No Playlist Set Overlay of FIG. 3 in accordance with an embodiment of the invention.

FIG. 4 shows an illustrative screen that may be displayed when the user selects the Set up Playlist button on the No Playlists Set Overlay, selects the Add Icon on the Playlists List, or accesses an existing playlist that contains no programs. The Default Playlist screen shows default information for a playlist when it is empty. Tables 3-9 describe illustrative behaviors of the IPG and/or VOD server 26 in connection with providing such a screen.

TABLE 3

Illustrative Default Playlist Screen Instant Information

| No. | Line | Format | Description |
|---|---|---|---|
| 1.0 | 1 | Left Justified | The default playlist name, in the form "Playlist <lowest positive integer not already used to name a playlist>", displayed in yellow |
| 1.1 | 1 | Right Justified | The text "Contains 0 programs" in the language specified by the user at Guide setup, displayed in white |
| 2.0 | 2 | Left Justified | The text "0 min" in the language specified by the user at Guide setup, displayed in white |
| 3.0 | 3 | Left Justified | The text "Select below to name, delete, and lock your Playlist." in the language specified by the user at Guide setup, displayed in white |

TABLE 4

Illustrative Default Playlist Screen Reader Box Display

| No. | Line | Format | Description |
|---|---|---|---|
| 1.0 | 1 | Left Justified | The text "To add programs to this Playlist:" in the language specified by the viewer in Guide setup, displayed in yellow |
| 2.0 | 2 | | Blank |
| 3.0 | 3 | Left Justified | The text "1) Find a program you would like to add." in the language specified by the viewer in Guide setup, displayed in white |
| 4.0 | 4 | Left Justified | The text "2) Go to the information screen and select <Playlist Icon>." in the language specified by the viewer in Guide setup, displayed in white |
| 5.0 | 5 | Left Justified | The text "3) Select the Playlist to add the program to." in the language specified by the viewer in Guide setup, displayed in white |
| 6.0 | 6 | | Blank |
| 7.0 | 7 | Left Justified | The text "Also select <Search Icon> below to search for programs to add." in the language specified by the user at Guide setup, displayed in white |

TABLE 5

Illustrative Default Playlist Screen Action Icon Table

| No. | Name | Condition | Description |
|---|---|---|---|
| 1.0 | Last | Always present | Displays the previous screen |
| 2.0 | Keyboard | Always present | Displays the Playlist Keyboard Overlay |
| 3.0 | Search | Always present | Displays the Playlist Search Screen. |
| 4.0 | Lock | Always present | Displays the Lock Playlist Overlay |
| 5.0 | Delete | Always present | Displays the Delete Playlist Confirmation Overlay |

TABLE 6

Illustrative Default Playlist Screen Input Key Processing

| No. | Key | Screen Focus | Behavior |
|---|---|---|---|
| 1.0 | Power | Any | Normal |
| 2.0 | Volume Up | Any | Normal |
| 3.0 | Volume Down | Any | Normal |
| 4.0 | Mute | Any | Normal |
| 5.0 | Channel Up | Any | Normal |
| 6.0 | Channel Down | Any | Normal |
| 7.0 | Bypass | Any | Normal |
| 8.0 | Menu | Any | Normal |
| 9.0 | Guide | Any | Normal |
| 10.0 | Music | Any | Normal |
| 11.0 | Themes | Any | Normal |
| 12.0 | Search | Any | Normal |
| 13.0 | Settings | Any | Normal |
| 14.0 | Exit | Any | Normal |
| 15.0 | Last | Any | Normal |
| 16.0 | Right Arrow | Any action icon but farthest right | Normal |
| 16.1 | Right Arrow | Farthest right action icon | The Guide may move the highlight to the farthest left action icon. |
| 17.0 | Left Arrow | Any action icon but farthest left | Normal |
| 17.1 | Left Arrow | Farthest left action icon | The Guide may move the highlight to the farthest right action icon. |
| 18.0 | Up Arrow | Any | Inactive |
| 19.0 | Down Arrow | Any | Inactive |
| 20.0 | OK | Any | See Table 5 |
| 21.0 | Digits 0-9 | Any | Normal |
| 22.0 | Scroll Up | Any | Inactive |
| 23.0 | Scroll Down | Any | Inactive |
| 24.0 | Day Forward | Any | Inactive |
| 25.0 | Day Back | Any | Inactive |
| 26.0 | Help | Any | Inactive |
| 27.0 | Info | Any | Inactive |
| 28.0 | Favorite | Any | Inactive |
| 29.0 | Lock | Any | Displays the Lock Playlist Overlay |
| 30.0 | Record | Any | Inactive |
| 31.0 | Stop | Any | Inactive |
| 32.0 | Pause | Any | Inactive |
| 33.0 | Play | Any | Inactive |
| 34.0 | Rewind | Any | Inactive |
| 35.0 | Fast Forward | Any | Inactive |
| 36.0 | PPV | Any | Normal |
| 37.0 | Letters A-Z | Any | Inactive |
| 38.0 | VOD | Any | Inactive |
| 39.0 | Return to Live TV | Any | Inactive |
| 40.0 | Skip Forward | Any | Inactive |
| 41.0 | Replay | Any | Inactive |
| 42.0 | A | Any | Inactive |
| 43.0 | B | Any | Inactive |
| 44.0 | C | Any | Inactive |
| 45.0 | Digital Recordings | Any | Normal |
| 46.0 | Swap | Any | Inactive |

TABLE 7

Illustrative Default Playlist Screen Other Event Handling

| No. | Event | Conditions/Comments |
|---|---|---|
| 1.0 | Screen Timeout | Normal |
| 2.0 | Reminder | Normal |
| 3.0 | Scheduled Recording Fires | Normal |
| 4.0 | Ordered PPV Start | Normal |
| 5.0 | PPV Purchase Window Expires | Inactive |
| 6.0 | Current Program Ends | Normal |
| 7.0 | Data added, deleted or modified in database | Normal |

TABLE 8

Illustrative Default Playlist Screen Screen/Mode Entry

| No. | Functionality | Description |
|---|---|---|
| 1.0 | Guide Initialization | The Default Playlist Screen may be available as soon as the VOD feature is available. |
| 2.0 | Highlight | The default highlight may be the Last icon on the Action Icon Bar |
| 3.0 | Display Inclusion Criteria | Not applicable |
| 4.0 | Sorting/Grouping Criteria | Not applicable |
| 5.0 | Customization | The OnDemand icon may be MSO-configurable. |

TABLE 8-continued

Illustrative Default Playlist Screen Screen/Mode Entry

| No. | Functionality | Description |
|---|---|---|
| 6.0 | Other Entry Actions | Not applicable |

TABLE 9

Illustrative Default Playlist Screen Formatting

| No. | Functionality | Description |
|---|---|---|
| 1.0 | Program Title | Not applicable |
| 2.0 | Time | Normal |
| 3.0 | Channel | Not applicable |
| 4.0 | Other Text | Not Applicable |

TABLE 9-continued

Illustrative Default Playlist Screen Formatting

| No. | Functionality | Description |
|---|---|---|
| 5.0 | Colors | Normal |
| 6.0 | Indicators | Not applicable |
| 7.0 | Branding | Not Applicable |
| 8.0 | Audio | Normal |
| 9.0 | LEDs | Normal |

Figure 5:
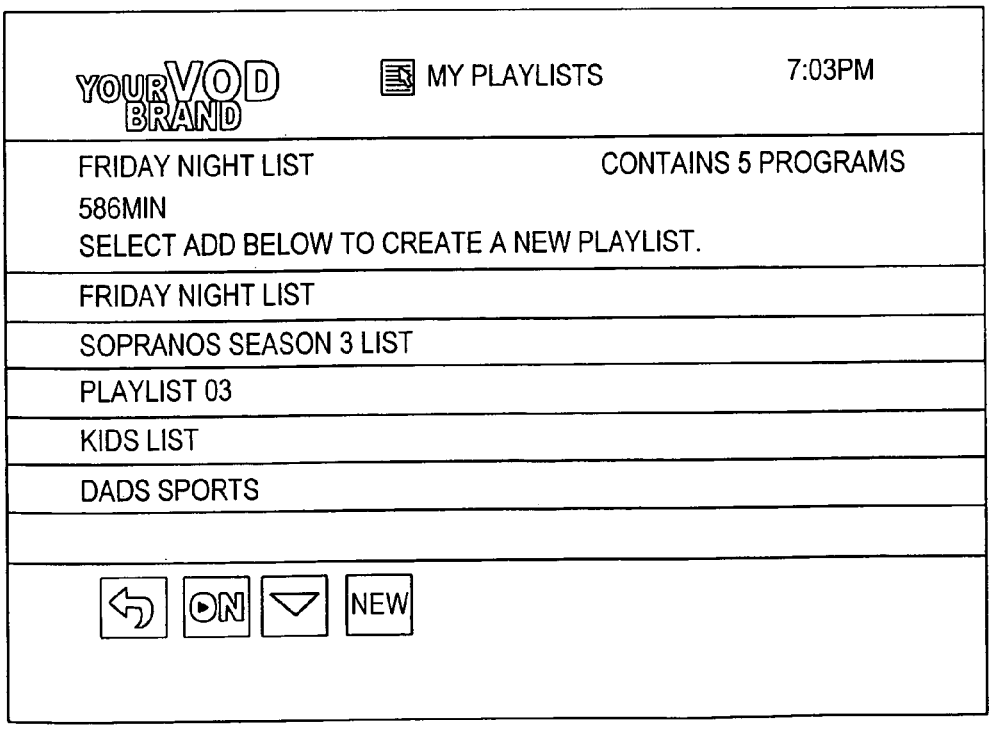
FIG. 5 shows an illustrative playlists list in accordance with an embodiment of the invention.
Figure 6:
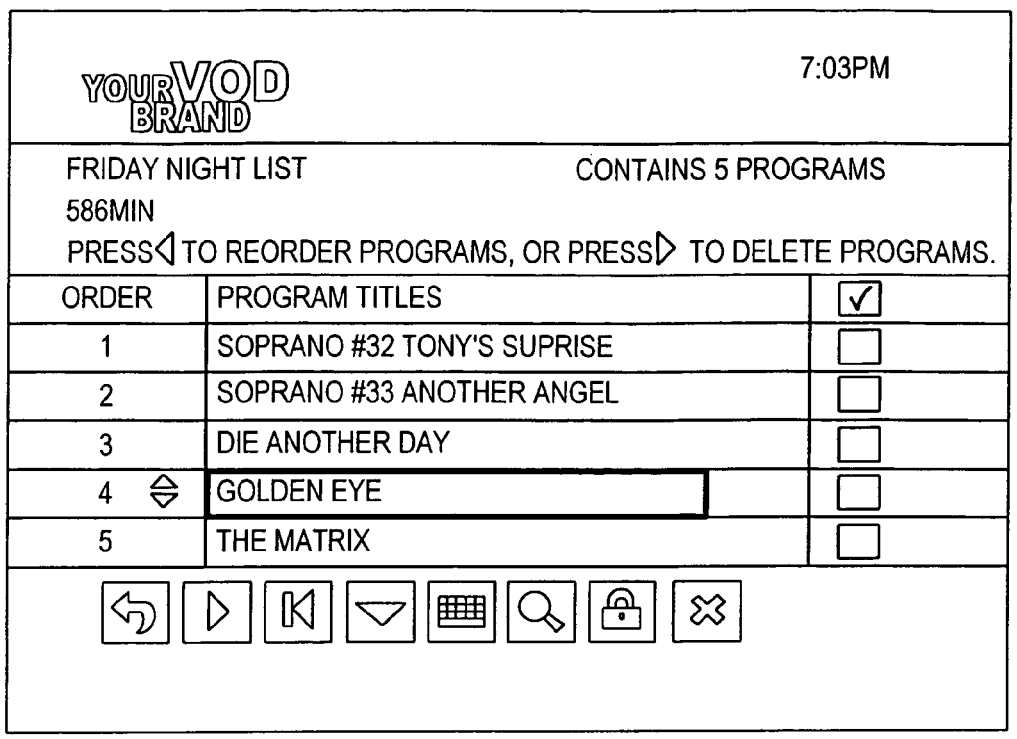
FIG. 6 shows an illustrative playlist with programs screen showing a highlighted program in accordance with embodiment of the invention.
Figure 7:
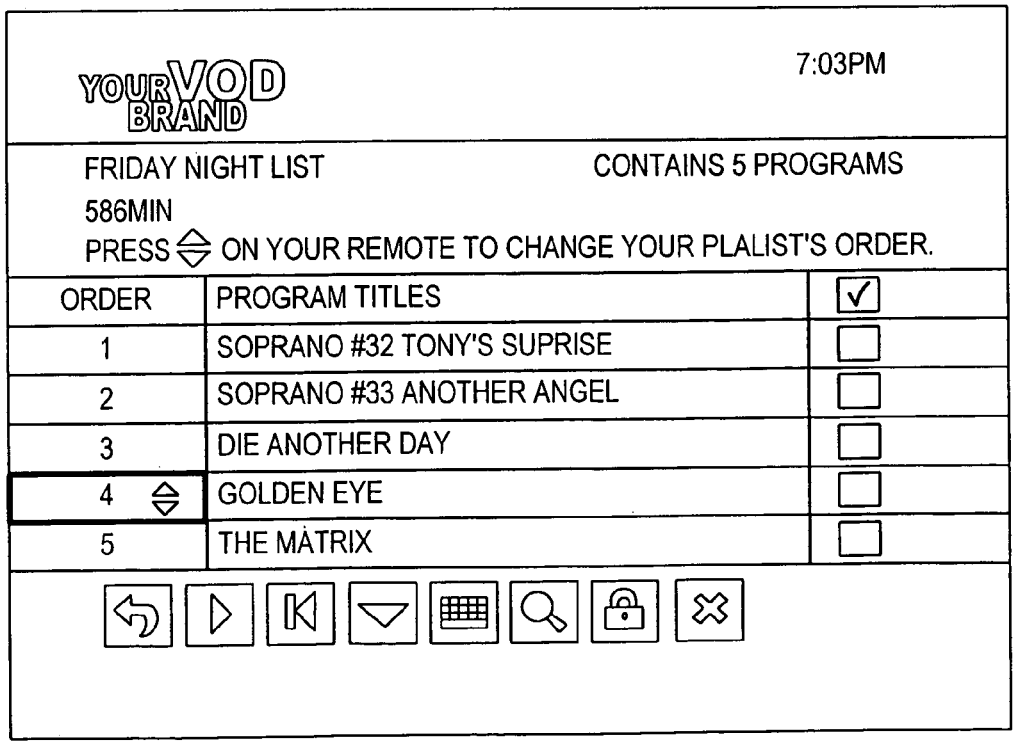
FIG. 7 shows an illustrative playlist with programs screen showing an option for allowing a user to change the order the programs in the playlist in accordance with an embodiment of the invention.

FIG. 5 shows an illustrative playlists list. The Playlists List displays the user's current playlists. It is displayed when the user selects My Playlists from the VOD Main Menu or other menus or screens, and one or more playlists have already been created. Playlists can be added and accessed from this screen. Tables 10-17 describe illustrative behaviors of the IPG and or VOD server 26 in connection with providing such a screen.

TABLE 10

Illustrative Playlists List Screen System Description

| No. | Description |
|---|---|
| 1.0 | VOD server 26 may maintain a list of playlists for each distinct subscriber household. |
| 1.1 | The list of playlists may be ordered according to the date and time of playlist creation, beginning with the most recently created playlist. |
| 2.0 | When the Guide requests the list of playlists, and if more than one playlist has been created, VOD server 26 may provide the list of playlists to the Guide. |
| 2.1 | VOD server 26 will page up or down within the Playlist List screen to allow viewing additional playlist list pages. |
| 3.0 | VOD server 26 may maintain at least the following metadata for each playlist in the playlist list: Playlist name Number of programs in playlist Total duration of playlist |
| 4.0 | VOD server 26 may add a new playlist in response to requests from the Guide to add a new playlist. |
| 4.1 | VOD server 26 may allow the creation of up to, e.g., 24 playlists per STB. |
| 4.2 | VOD server 26 may communicate an error to the Guide if a request is made to add a new playlist, and the maximum number of playlists has been reached for the STB. |
| 5.0 | VOD server 26 may provide an existing playlist in response to requests from the Guide to access an existing playlist. |
| 6.0 | VOD server 26 may maintain and transfer playlist specifications across STB replacements. |

TABLE 11

Illustrative Playlists List General Description

| No. | Description |
|---|---|
| 1.0 | The Playlists List may display the Playlists icon, followed by the title "My Playlists" in the language specified by the user at Guide setup, centered in white text in the screen header area. |
| 2.0 | The maximum number of playlists that can be created may be, e.g., 24. |

TABLE 12

Illustrative Playlists List Instant Information

| No. | Line | Format | Description |
|---|---|---|---|
| 1.0 | 1 | Left Justified | The name of the highlighted playlist if there are existing playlists when the screen is invoked, displayed in yellow |
| 1.1 | 1 | Right Justified | The text "Contains <number> Programs" in the language specified by the user at Guide setup, displayed in white, if there are existing playlists when the screen is invoked, where <number> is the number of videos in the highlighted playlist |
| 1.2 | 1 | Left Justified | The text "No Playlists have been created" in the language specified by the user at Guide setup, displayed in yellow, if no playlists currently exist when the screen is invoked |
| 1.3 | 1 | | Blank if there are existing playlists when the screen is invoked and no playlist is highlighted |
| 2.0 | 2 | Left Justified | Runtime of the highlighted playlist (total runtime of all programs in the playlist) if there are existing playlists when the screen is invoked |
| 2.1 | 2 | | Blank if no playlists currently exist when the screen is invoked or no playlist is highlighted |
| 3.0 | 3 | | The text "Select <Add Action Icon> below to create a new Playlist." in the language specified by the user at Guide setup, displayed in white |

TABLE 13

Illustrative Playlists List Action Icon Table

| No. | Name | Condition | Description |
|---|---|---|---|
| 1.0 | Last | Always present | Displays the previous screen |
| 2.0 | VOD | Always present | Displays the VOD Main Menu |
| 3.0 | Down Arrow | Always present | Displays the next page of playlist listings |
| 3.1 | Down Arrow | Always present | Inactive if no additional pages are available below the current page of playlists. |
| 4.0 | New Playlist | Always present | Displays the Default Playlist screen if the maximum number of playlists has not been reached |
| 4.1 | New Playlist | Always present | Displays the Maximum Playlists Notice if the maximum number of playlists has been reached |

TABLE 14

Illustrative Playlists List Input Key Processing

| No. | Key | Screen Focus | Behavior |
|---|---|---|---|
| 1.0 | Power | Any | Normal |
| 2.0 | Volume Up | Any | Normal |
| 3.0 | Volume Down | Any | Normal |
| 4.0 | Mute | Any | Normal |
| 5.0 | Channel Up | Any | Normal |
| 6.0 | Channel Down | Any | Normal |
| 7.0 | Bypass | Any | Normal |
| 8.0 | Menu | Any | Normal |
| 9.0 | Guide | Any | Normal |
| 10.0 | Music | Any | Normal |
| 11.0 | Themes | Any | Normal |
| 12.0 | Search | Any | Normal |
| 13.0 | Settings | Any | Normal |
| 14.0 | Exit | Any | The Guide may return to Idle Mode and display and Flip Banner. |
| 15.0 | Last | Any | Normal |
| 16.0 | Right Arrow | List Cell | Inactive |

TABLE 14-continued

Illustrative Playlists List Input Key Processing

| No. | Key | Screen Focus | Behavior |
|---|---|---|---|
| 16.1 | Right Arrow | Any action icon but farthest right | Normal |
| 16.2 | Right Arrow | Farthest right action icon | The Guide may move the highlight to the farthest left action icon. |
| 17.0 | Left Arrow | List Cell | Inactive |
| 17.1 | Left Arrow | Any action icon but farthest left | Normal |
| 17.2 | Left Arrow | Farthest left action icon | The Guide may move the highlight to the farthest right action icon. |
| 18.0 | Up Arrow | Top list cell on first page | Inactive |
| 18.1 | Up Arrow | Top list cell, any but first page | The Guide may display the previous page and highlight the lowest selectable list cell. |
| 18.2 | Up Arrow | Any list cell but the top on the page | The Guide may move the highlight to the next higher list cell. |
| 18.3 | Up Arrow | Any Action Icon | The Guide may move the highlight to the lowest list cell on the current page. |
| 19.0 | Down Arrow | Any list cell but the last on the page | The Guide may move the highlight to the next lower list cell on the page. |
| 19.1 | Down Arrow | Last list cell on the page | The Guide may move the highlight to the default action icon. |
| 19.2 | Down Arrow | Any Action Icon except Down Arrow | Inactive |
| 19.3 | Down Arrow | Down Arrow action icon, any page but the last | The Guide may display the next page and highlight the highest selectable list cell. |
| 19.4 | Down Arrow | Down Arrow action icon, last page | Inactive |
| 20.0 | OK | Any list cell | If the highlighted playlist contains at least one program, is not locked and does not contain any programs that are locked, the Guide may request data for the highlighted playlist from VOD server 26 and display the Playlist Information Screen. |
| 20.1 | OK | Any list cell | If the highlighted playlist contains at least one program, and is locked or contains any programs that are locked, the Guide may display the Lock PIN Overlay. |
| 20.2 | OK | Any list cell | If the highlighted playlist does not contain any programs, the Guide may request data for the highlighted playlist from VOD server 26 and display the Default Playlist screen. |
| 20.3 | OK | Any action icon | See Table 13. |
| 21.0 | Digits 0-9 | Any | Normal |
| 22.0 | Scroll Up | Any | Normal |
| 23.0 | Scroll Down | Any | Normal |
| 24.0 | Day Forward | Any | Inactive |
| 25.0 | Day Back | Any | Inactive |
| 26.0 | Help | Any | Inactive |
| 27.0 | Info | Any list cell | If the highlighted playlist contains at least one program, is not locked and does not contain any programs that are locked, the Guide may request data for the highlighted playlist from VOD server 26 and display the Playlist Information Screen. |
| 27.1 | Info | Any list cell | If the highlighted playlist contains at least one program, and is locked or contains any programs that are locked, the Guide may display the Lock PIN Overlay. |
| 27.2 | Info | Any list cell | If the highlighted playlist does not contain any programs, the Guide may request data for the highlighted playlist from VOD server 26 and displays the Default Playlist screen. |

TABLE 14-continued

Illustrative Playlists List Input Key Processing

| No. | Key | Screen Focus | Behavior |
|---|---|---|---|
| 27.3 | Info | Any action icon | Inactive |
| 28.0 | Favorite | Any | Inactive |
| 29.0 | Lock | Any | Inactive |
| 30.0 | Record | Any | Inactive |
| 31.0 | Stop | Any | Inactive |
| 32.0 | Pause | Any | Inactive |
| 33.0 | Play | Any | Inactive |
| 34.0 | Rewind | Any | Inactive |
| 35.0 | Fast Forward | Any | Inactive |
| 36.0 | PPV | Any | Normal |
| 37.0 | Letters A-Z | Any | Inactive |
| 38.0 | VOD | Any | Inactive |
| 39.0 | Return to Live TV | Any | Normal |
| 40.0 | Skip Forward | Any | Inactive |
| 41.0 | Replay | Any | Inactive |
| 42.0 | A | Any | Inactive |
| 43.0 | B | Any | Inactive |
| 44.0 | C | Any | Inactive |
| 45.0 | DVR | Any | Normal |
| 46.0 | Swap | Any | Inactive |

TABLE 15

Illustrative Playlists List Other Event Handling

| No. | Event | Conditions/Comments |
|---|---|---|
| 1.0 | Screen Timeout | Normal |
| 2.0 | Reminder | Normal |
| 3.0 | Scheduled Recording Fires | Normal |
| 4.0 | Ordered PPV Start | Normal |
| 5.0 | PPV Purchase Window Expires | Inactive |
| 6.0 | Current Program Ends | Normal |

TABLE 16

Illustrative Playlists List Screen/Mode Entry

| No. | Functionality | Description |
|---|---|---|
| 1.0 | Guide Initialization | The Playlists List Screen may be available as soon as the VOD feature is available. |
| 2.0 | Highlight | If there are existing playlists, the default highlight may be the first playlist on the page. |
| 2.1 | Highlight | If there are no existing playlists, the default highlight may be the Add Action Icon. |
| 2.2 | Highlight | If the user navigates from a list cell to the action icons, the default action icon may be the Down Arrow Action Icon. |
| 3.0 | Display Inclusion Criteria | Display all existing playlists. |
| 4.0 | Sorting/Grouping Criteria | The playlists may be displayed in order of creation time, from newest to oldest. |
| 5.0 | Customization | The OnDemand icon may be MSO-configurable. |

TABLE 17

Illustrative Playlists List Screen Formatting

| No. | Functionality | Description |
|---|---|---|
| 1.0 | Program Title | Not applicable |
| 2.0 | Time | Normal |
| 3.0 | Channel | Not applicable |
| 4.0 | Other Text | Not applicable |
| 5.0 | Colors | Normal |
| 6.0 | Indicators | Not applicable |
| 7.0 | Branding | Not applicable |
| 8.0 | Audio | Normal |
| 9.0 | LEDs | The Guide may display the last user channel or current time on the LED according to the description provided in the Appendix for time/channel display on the LED. |

FIGS. 6-9 show illustrative Playlist with Programs Screens that may be displayed when the user selects a playlist from the Playlist List and the playlist contains one or more programs, or when the user selects the Add action icon on the Select a Playlist overlay. Tables 18-25 describe illustrative behaviors of the IPG and/or VOD server 26 in connection with providing such screens.

TABLE 18

Illustrative Playlist with Programs Screen
System Description

| No. | Description |
|---|---|
| 1.0 | VOD server 26 may maintain the playlists contents for each playlist stored for a STB. |
| 1.1 | Playlist contents may only include VOD programs that are free for all users without any subscription or purchase. |
| 1.2 | VOD server 26 may maintain the sequence of VOD programs within a VOD playlist. |
| 2.0 | VOD server 26 may include up to, e.g., 24 distinct VOD assets within a VOD playlist. |
| 3.0 | VOD server 26 may reposition individual VOD assets within the VOD playlist sequence. |
| 4.0 | VOD server 26 may automatically delete programs from a VOD playlist if they reach the end of their licensing window. |
| 4.1 | VOD server 26 may delete expired programs from a VOD playlist on a periodic, scheduled basis. |
| 5.0 | VOD server 26 may automatically delete programs from a VOD playlist if they not longer meet the eligibility criteria for inclusion in a playlist. |
| 5.1 | VOD server 26 may delete ineligible programs from a VOD playlist on a periodic, scheduled basis. |
| 6.0 | VOD server 26 may maintain and transfer playlist specifications across STB replacements. |
| 7.0 | VOD server 26 may allow users to delete VOD programs from a VOD playlist. |
| 8.0 | VOD server 26 may maintain a record of the last playback position from the last time the playlist was played. |
| 8.1 | If the VOD program encompassing the last playback position is deleted from the playlist, the playback position may be moved to the beginning of the next asset in the playlist. |
| 8.2 | If the VOD program encompassing the last playback position is deleted from the playlist, and was the last asset in the playlist, the playback position may be moved to the beginning of the playlist. |
| 9.0 | VOD server 26 may play back a VOD playlist from the beginning. |
| 10.0 | VOD server 26 may play back a VOD playlist from the last playback position. |
| 11.0 | VOD server 26 may page up or down within the Playlist with Programs screen, to allow additional program listing pages within the playlist to be viewed. |

TABLE 19

Illustrative Playlist with Programs Screen
General Description

| No. | Description |
|---|---|
| 1.0 | The Playlist with Programs screen may include:<br>a screen header area<br>an instant information area<br>a playlist sequence area<br>an action icon area |
| 2.0 | The playlist sequence area may include:<br>a sequence number column<br>a program title column<br>a deletion checkbox column. |
| 2.1 | Each of the columns in the playlist sequence area may have a header row. |
| 2.1.1 | The Guide displays the heading text "Order" in the header row of the sequence number column, center justified, in the language specified by the user at Guide setup, in white. |
| 2.1.2 | The Guide displays the heading text "Program Titles" in the header row of the program title column, left justified, in the language specified by the user at Guide setup, in white. |
| 2.1.3 | The Guide may display a checkbox in a "checked" state in the header row of the deletion checkbox column, left justified, in white. |
| 3.0 | If the user plays a playlist, any program within the playlist that is no longer available from VOD server 26 may be skipped over with no notification to the user1. |
| 4.0 | If the user plays a playlist, any program within the playlist that is no longer free for all users, without any subscription or purchase, may be skipped over with no notification to the user2. |
| 5.0 | Each distinct row within the playlist sequence area may represent a distinct program within the playlist. |
| 5.1 | The cell in the sequence number column, on a specific row in the playlist sequence area, may include the program's sequence number, centered in black text. |

TABLE 19-continued

Illustrative Playlist with Programs Screen
General Description

| No. | Description |
|---|---|
| 5.2 | The cell in the program title column, on a specific row in the playlist sequence area, may include the full program title, left justified in white text. |
| 5.3 | The cell in the deletion checkbox column, on a specific row in the playlist sequence area, may include a checkbox that is in either a checked or an unchecked state, left justified. |
| 5.3.1 | The default state of all checkboxes in the deletion checkbox column may be unchecked. |

[1] While VOD server 26 may automatically delete such programs, a playlist containing such a program may be played before the deletion is performed.
[2] While VOD server 26 may automatically delete such programs, a playlist containing such a program may be played before the deletion is performed.

TABLE 20

Illustrative Playlist with Programs Screen
Instant Information

| No. | Line | Format | Description |
|---|---|---|---|
| 1.0 | 1 | Left Justified | The name of the playlist, displayed in yellow |
| 1.1 | 1 | Right Justified | The text "Contains <number> Programs" in the language specified by the user at Guide setup, displayed in white, where <number> is the number of programs in the playlist. |
| 2.0 | 2 | Left Justified | Runtime of the playlist (total runtime of all programs in the playlist) |
| 3.0 | 3 | Left Justified | If a row in the Order column is highlighted, the text "Press <up/down arrows> on your remote to change your Playlist's order." is displayed in the language specified by the user in Guide setup and displayed in white text. |
| 3.1 | 3 | Left Justified | If the program title is highlighted, the text "Press <left arrow> to reorder programs, or press <right arrow> to delete programs." is displayed in the language specified by the user in Guide setup and displayed in white text. |
| 3.2 | 3 | Left Justified | If a row in the checkmark column is highlighted, the text "<checkmark> a <box symbol> and then select <X symbol> below to delete programs." is displayed in the language specified by the user at Guide setup and displayed in white text. |

TABLE 21

Illustrative Playlist with Programs Screen Action
Icon Table

| No. | Name | Condition | Description |
|---|---|---|---|
| 1.0 | Last | Always present | Displays the screen from which it was displayed |
| 2.0 | Resume | Always present | Sends the video play request to VOD server 26 instructing the server to begin playing at the last playback position in the playlist. |
| 2.1 | Resume | Always present | If the last playback position in the playlist is a VOD program for which trick mode is not available, VOD server 26 may resume playback at the beginning of that VOD program. |
| 3.0 | Restart | Always present | Sends the video play request to VOD server 26 instructing the server to begin playing at the beginning of the playlist. |
| 4.0 | Down Arrow | Always present | Displays the next page of VOD programs in the playlist if there is a next page |
| 4.1 | Down Arrow | Always present | Inactive if there is no next page |
| 5.0 | Keyboard | Always present | Displays the Playlist Keyboard Overlay |
| 6.0 | Search | Always present | Displays the Playlist Search Screen |
| 7.0 | Lock | Always present | Displays the Lock Playlist Overlay |
| 8.0 | Delete | Always present | Displays the Playlist Deletion Options Overlay |

TABLE 22

Illustrative Playlist with Programs Screen
Input Key Processing

| No. | Key | Screen Focus | Behavior |
|---|---|---|---|
| 1.0 | Power | Any | Normal |
| 2.0 | Volume Up | Any | Normal |

TABLE 22-continued

Illustrative Playlist with Programs Screen
Input Key Processing

| No. | Key | Screen Focus | Behavior |
|---|---|---|---|
| 3.0 | Volume Down | Any | Normal |
| 4.0 | Mute | Any | Normal |
| 5.0 | Channel Up | Any | Normal |
| 6.0 | Channel Down | Any | Normal |
| 7.0 | Bypass | Any | Normal |
| 8.0 | Menu | Any | Normal |
| 9.0 | Guide | Any | Normal |
| 10.0 | Music | Any | Normal |
| 11.0 | Themes | Any | Normal |
| 12.0 | Search | Any | Normal |
| 13.0 | Settings | Any | Normal |
| 14.0 | Exit | Any | Normal |
| 15.0 | Last | Any | Normal |
| 16.0 | Right Arrow | Sequence number column | The Guide may move the highlight to the program title column within the same row. |
| 16.1 | Right Arrow | Program title column | The Guide may move the highlight to the deletion checkbox column within the same row. |
| 16.2 | Right Arrow | Deletion checkbox column | Inactive |
| 16.3 | Right Arrow | Any action icon but farthest right | Normal |
| 16.4 | Right Arrow | Farthest right action icon | The Guide may move the highlight to the farthest left action icon. |
| 17.0 | Left Arrow | Sequence number column | Inactive |
| 17.1 | Left Arrow | Program title column | The Guide may move the highlight to the sequence number column within the same row. |
| 17.2 | Left Arrow | Deletion checkbox column | The Guide may move the highlight to the program title column within the same row. |
| 17.3 | Left Arrow | Any action icon but the farthest left | Normal |
| 17.4 | Left Arrow | Farthest left action icon | The Guide may move the highlight to the farthest right action icon. |
| 18.0 | Up Arrow | Top row within playlist sequence area, first page | Inactive |
| 18.1 | Up Arrow | Any row except top row within playlist sequence area, any column except sequence number column | The Guide may move the highlight to the next higher row, within the same column. |
| 18.2 | Up Arrow | Any row except top row within playlist sequence area, sequence number column | The Guide may send a request to VOD server 26 to move the currently highlighted program up one position within the playlist sequence, and refresh the playlist sequence area display. |
| 18.3 | Up Arrow | Top row within playlist sequence area, any column except sequence number column, any but first page | The Guide may display the previous page and highlight the bottom row, within the same column. |
| 18.4 | Up Arrow | Top row within playlist sequence area, sequence number | The Guide may: send a request to VOD server 26 to move the currently highlighted program up one position within the playlist sequence display the previous page |

TABLE 22-continued

Illustrative Playlist with Programs Screen
Input Key Processing

| No. | Key | Screen Focus | Behavior |
|---|---|---|---|
| | | column, any but first page | highlight the bottom row, within the same column. |
| 18.5 | Up Arrow | Any action icon | The Guide may highlight the bottom row of the playlist sequence area, program title column. |
| 19.0 | Down Arrow | Bottom row within playlist sequence area, last page | Inactive |
| 19.1 | Down Arrow | Any row except bottom row within playlist sequence area, any column except sequence number column | The Guide may move the highlight to the next lower row, within the same column. |
| 19.2 | Down Arrow | Any row except bottom row within playlist sequence area, sequence number column | The Guide may send a request to VOD server 26 to move the currently highlighted program down one position within the playlist sequence, and may refresh the playlist sequence area display. |
| 19.3 | Down Arrow | Bottom row within playlist sequence area, any column except sequence number column, any but last page | The Guide may display the next page and highlight the top row, within the same column. |
| 19.4 | Down Arrow | Bottom row within playlist sequence area, sequence number column, any but last page | The Guide may: send a request to VOD server 26 to move the currently highlighted program down one position within the playlist sequence display the next page highlight the top row, within the same column. |
| 19.5 | Down Arrow | Any action icon except Down Arrow action icon | Inactive |
| 19.6 | Down Arrow | Down Arrow action icon, any but last page | The Guide may display the next page and highlight the top row, within the same column. |
| 19.7 | Down Arrow | Down Arrow action icon, last page | Inactive |
| 20.0 | OK | Any action icon | See Table 21. |
| 20.1 | OK | Program title column | The Guide may display the VOD Program Information Screen for the highlighted program. |
| 20.2 | OK | Sequence number column | Inactive |
| 20.3 | OK | Deletion checkbox column | The Guide may toggle the check symbol on or off inside the checkbox on the current row. |
| 21.0 | Digits 0-9 | Any | Normal |
| 22.0 | Scroll Up | Any page but first | The Guide may display the previous page and highlight the top row, within the same column. |
| 22.0 | Scroll Up | First page | Inactive |
| 23.0 | Scroll Down | Any page but last | The Guide may display the next page and highlight the top row, within the same column. |
| 23.0 | Scroll Down | Last page | Inactive |
| 24.0 | Day Forward | Any | Inactive |
| 25.0 | Day Back | Any | Inactive |
| 26.0 | Help | Any | Inactive |
| 27.0 | Info | Program title column | The Guide may display the VOD Program Information Screen for the highlighted program. |

TABLE 22-continued

Illustrative Playlist with Programs Screen
Input Key Processing

| No. | Key | Screen Focus | Behavior |
|---|---|---|---|
| 27.1 | Info | Playlist sequence area, any column but program title column | Inactive |
| 27.2 | Info | Any action Icon | Inactive |
| 28.0 | Favorite | Any | Inactive |
| 29.0 | Lock | Any | Displays the Lock Playlist Overlay |
| 30.0 | Record | Any | Inactive |
| 31.0 | Stop | Any | Inactive |
| 32.0 | Pause | Any | Inactive |
| 33.0 | Play | Any | Inactive |
| 34.0 | Rewind | Any | Inactive |
| 35.0 | Fast Forward | Any | Inactive |
| 36.0 | PPV | Any | Normal |
| 37.0 | Letters A-Z | Any | Inactive |
| 38.0 | VOD | Any | Inactive |
| 39.0 | Return to Live TV | Any | Inactive |
| 40.0 | Skip Forward | Any | Inactive |
| 41.0 | Replay | Any | Inactive |
| 42.0 | A | Any | Inactive |
| 43.0 | B | Any | Inactive |
| 44.0 | C | Any | Inactive |
| 45.0 | Digital Recordings | Any | Normal |
| 46.0 | Swap | Any | Inactive |

TABLE 23

Illustrative Playlist with Programs Screen
Other Event Handling

| No. | Event | Conditions/Comments |
|---|---|---|
| 1.0 | Screen Timeout | Normal |
| 2.0 | Reminder | Normal |
| 3.0 | Scheduled Recording Fires | Normal |
| 4.0 | Ordered PPV Start | Normal |
| 5.0 | PPV Purchase Window Expires | Inactive |
| 6.0 | Current Program Ends | Normal |
| 7.0 | Data added, deleted or modified in database | Normal |

TABLE 24

Illustrative Playlist with Programs Screen/Mode Entry

| No. | Functionality | Description |
|---|---|---|
| 1.0 | Guide Initialization | The Playlist Screen - Not Empty may be available as soon as the VOD feature is available. |
| 2.0 | Highlight | The default highlight may be on the first listing in the playlist. |
| 3.0 | Display Inclusion Criteria | Display all VOD programs in the playlist. |
| 4.0 | Sorting/Grouping Criteria | Programs within the playlist may be ordered as specified in the VOD data. |
| 4.1 | Sorting/Grouping Criteria | Programs may be placed at the end of the playlist when they are added, by default. |
| 4.2 | Sorting/Grouping Criteria | See arrow key description in Table 22 for reordering of programs in the playlist. |
| 5.0 | Customization | The OnDemand icon may be MSO-configurable. |
| 6.0 | Other Entry Actions | Not applicable |

TABLE 25

Illustrative Playlist with Programs Screen Formatting

| No. | Functionality | Description |
|---|---|---|
| 1.0 | Program Title | Normal |
| 2.0 | Time | Normal |
| 3.0 | Channel | Not applicable |
| 4.0 | Other Text | Not Applicable |
| 5.0 | Colors | Normal |
| 6.0 | Indicators | Not applicable |
| 7.0 | Branding | Not Applicable |
| 8.0 | Audio | Normal |
| 9.0 | LEDs | Normal |

Figure 10:
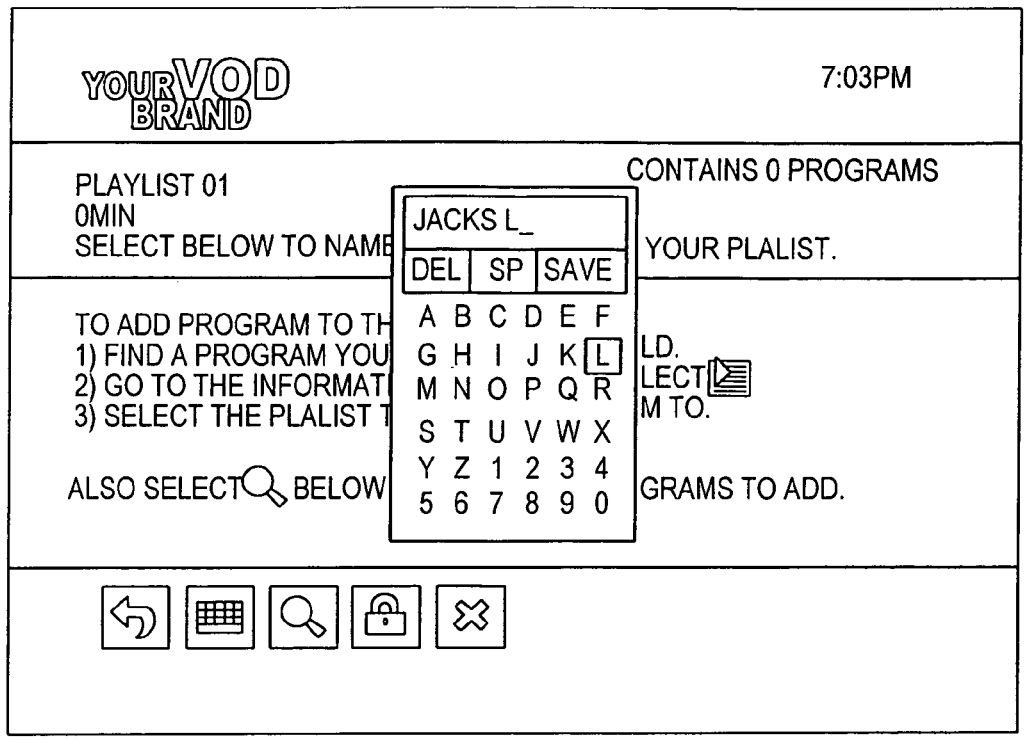
FIG. 10 shows an illustrative keyboard overlay in accordance with an embodiment of the invention.

FIG. 10 shows an illustrative keyboard overlay. Tables 26-27 describe illustrative behaviors of the IPG and/or VOD server 26 in connection with providing such an overlay.

TABLE 26

Illustrative Playlist Keyboard Overlay
General Description

| No. | Description |
|---|---|
| 1.0 | The guide may provide an on screen Playlist Keyboard overlay for naming distinct VOD playlists. |
| 1.1 | The Playlist Keyboard overlay may include a keyboard component and a string entry field. |
| 2.0 | The keyboard component may facilitate entry of all capital letters of the English alphabet, digits 0-9 and the space character within the string entry field. |
| 2.1 | The string entry field may allow the user to see characters in the character string as they are entered. |
| 2.1.1 | Entry of characters may be sequential from left to right. |
| 2.1.2 | The character entry position may be maintained after the rightmost character in the string entry field. |
| 2.1.3 | The character entry position may be represented by a character entry cursor. |
| 2.2 | The keyboard component may facilitate deletion of the rightmost character in the string entry field via the Delete/Backspace selectable item. |
| 2.3 | The keyboard component may allow entry of up to, e.g., 25 characters within the string entry field. |
| 2.3.1 | If the number of characters, together with the character entry cursor, exceeds the display capacity of the string entry field, one or more leftmost characters may be shifted beyond the left edge of the string entry field, as required to maintain the character entry cursor within the right edge of the string entry field. |
| 2.3.2 | If any characters remain shifted beyond the left edge of the string entry field, and the user deletes the rightmost character using the Delete/Backspace key, one or more first characters may be shifted back into the string entry field display, provided the character entry cursor may maintain its position within the right edge of the string entry field. |
| 2.3.3 | If no characters remain shifted beyond the left edge of the string entry field, and the user deletes the rightmost character using the Delete/Backspace key, the characters may remain fixed within the string entry field, and the character entry cursor may move to the left. |
| 3.0 | The space character option in the keyboard component may include the text "Sp" in white text. |
| 4.0 | The delete/backspace option in the keyboard component may include the text "Del" in white text. |
| 5.0 | The save option in the keyboard component may include the text "Save" in white text. |
| 5.1 | The "Save" selectable item may be grayed out if no non-space characters have been entered in the string entry field. |
| 6.0 | The default highlight on entry may be the "A" character in the keyboard component. |
| 7.0 | The string entry field may be empty on entry. |

TABLE 27

Illustrative Playlist Keyboard Overlay
Input Key Processing

| No. | Key | Screen Focus | Behavior |
|---|---|---|---|
| 1.0 | Power | Any | Normal |
| 2.0 | Volume Up | Any | Normal |
| 3.0 | Volume Down | Any | Normal |
| 4.0 | Mute | Any | Normal |
| 5.0 | Channel Up | Any | Normal |

TABLE 27-continued

Illustrative Playlist Keyboard Overlay
Input Key Processing

| No. | Key | Screen Focus | Behavior |
|---|---|---|---|
| 6.0 | Channel Down | Any | Normal |
| 7.0 | Bypass | Any | Normal |
| 8.0 | Menu | Any | Normal |
| 9.0 | Guide | Any | Normal |
| 10.0 | Music | Any | Normal |
| 11.0 | Themes | Any | Normal |
| 12.0 | Search | Any | Normal |
| 13.0 | Settings | Any | Inactive |
| 14.0 | Exit | Any | Normal |
| 15.0 | Last | Any | The Guide may dismiss the Playlist Keyboard overlay and redisplay the screen it was accessed from. |
| 16.0 | Right Arrow | Anywhere in keyboard component except rightmost keys. | Move the highlight to the next key to the right in the keyboard component. |
| 16.1 | Right Arrow | Rightmost keys in keyboard component, or string entry field | Inactive |
| 17.0 | Left Arrow | Anywhere in keyboard component except leftmost keys. | Move the highlight to the next key to the left in the keyboard component. |
| 17.1 | Left Arrow | Leftmost keys in keyboard component, or string entry field. | Inactive |
| 18.0 | Up Arrow | Alphanumeric keys in keyboard component, not including top row. | Move the highlight to the next higher key in the keyboard component. |
| 18.1 | Up Arrow | "A" or "B" key in keyboard component. | Move highlight to the "Delete" option. |
| 18.2 | Up Arrow | "C" or "D" key in keyboard component. | Move highlight to the "Spacebar" option. |
| 18.3 | Up Arrow | "E" or "F" key in keyboard component. | Move highlight to the "Save" option. |
| 18.4 | Up Arrow | Delete, Space or Save option in the keyboard component. | Move the highlight to the string entry field. |
| 18.5 | Up Arrow | String entry field. | Inactive |
| 19.0 | Down Arrow | String entry field. | Move highlight to the "Delete" option. |
| 19.1 | Down Arrow | Delete option in the keyboard component. | Move the highlight to the "A" key in the keyboard component. |
| 19.2 | Down Arrow | Space option in the keyboard component. | Move the highlight to the "C" key in the keyboard component. |
| 19.3 | Down Arrow | Save option in the keyboard component. | Move the highlight to the "E" key in the keyboard component. |
| 19.4 | Down Arrow | Alphanumeric keys in keyboard component, not including bottom row. | Move the highlight to the next lower key in the keyboard component. |
| 19.5 | Down Arrow | Bottom row of alphanumeric keys in keyboard component. | Inactive |
| 20.0 | OK | String entry field, string contains at least | The Guide may rename the current favorite list using the character string in the string entry field, dismiss the Playlist Keyboard |

TABLE 27-continued

Illustrative Playlist Keyboard Overlay
Input Key Processing

| No. | Key | Screen Focus | Behavior |
|---|---|---|---|
| | | one non-space character. | overlay and redisplay the screen it was accessed from. |
| 20.1 | OK | String entry field, string contains no non-space characters. | Inactive |
| 20.2 | OK | Any alphanumeric key, or space key, in the keyboard component. | If fewer than, e.g., 25 characters have been entered, append the corresponding character to the character string, and shift the string entry field display as required. |
| 20.2.1 | OK | Any alphanumeric key, or space key, in the keyboard component. | Inactive if, e.g., 25 characters have been entered. |
| 20.4 | OK | Delete/backspace key in keyboard component. | Delete the rightmost search character in the search string entry field, and shift the search string entry field display as required. |
| 20.4.1 | OK | Delete/backspace key in keyboard component. | Inactive if there are no characters in the string entry field. |
| 20.5 | OK | "Save" option in keyboard component, string contains at least one non-space character. | The Guide may rename the current favorite list using the character string in the string entry field, dismiss the Playlist Keyboard overlay and redisplay the screen it was accessed from. |
| 20.6 | OK | "Save" option in keyboard component, string contains no non-space characters. | Inactive |
| 21.0 | Digits 0-9 | Any | If fewer than, e.g., 25 characters have been entered, append the corresponding number to the character string, and shift the string entry field display as required. |
| 21.1 | Digits 0-9 | Any | Inactive if, e.g., 25 characters have been entered. |
| 22.0 | Scroll Up | Any | Inactive |
| 23.0 | Scroll Down | Any | Inactive |
| 24.0 | Day Forward | Any | Inactive |
| 25.0 | Day Back | Any | Inactive |
| 26.0 | Help | Any | Inactive |
| 27.0 | Info | Any | Inactive |
| 28.0 | Favorite | Any | Inactive |
| 29.0 | Lock | Any | Inactive |
| 30.0 | Record | Any | Inactive |
| 31.0 | Stop | Any | Inactive |
| 32.0 | Pause | Any | Inactive |
| 33.0 | Play | Any | Inactive |
| 34.0 | Rewind | Any | Inactive |
| 35.0 | Fast Forward | Any | Inactive |
| 36.0 | PPV | Any | Normal |
| 37.0 | Letters A-Z | Any | If fewer than, e.g., 25 characters have been entered, append the corresponding character to the character string, and shift the string entry field display as required. |
| 37.1 | Letters A-Z | Any | Inactive if, e.g., 25 characters have been entered. |
| 38.0 | VOD | Any | Normal |
| 39.0 | Return to Live TV | Any | Normal |
| 40.0 | Skip Forward | Any | Inactive |
| 41.0 | Replay | Any | Inactive |
| 42.0 | A | Any | Inactive |
| 43.0 | B | Any | Inactive |
| 44.0 | C | Any | Inactive |

TABLE 27-continued

Illustrative Playlist Keyboard Overlay
Input Key Processing

| No. | Key | Screen Focus | Behavior |
|---|---|---|---|
| 45.0 | Digital Recordings | Any | Normal |
| 46.0 | Swap | Any | Inactive |

Figure 11:
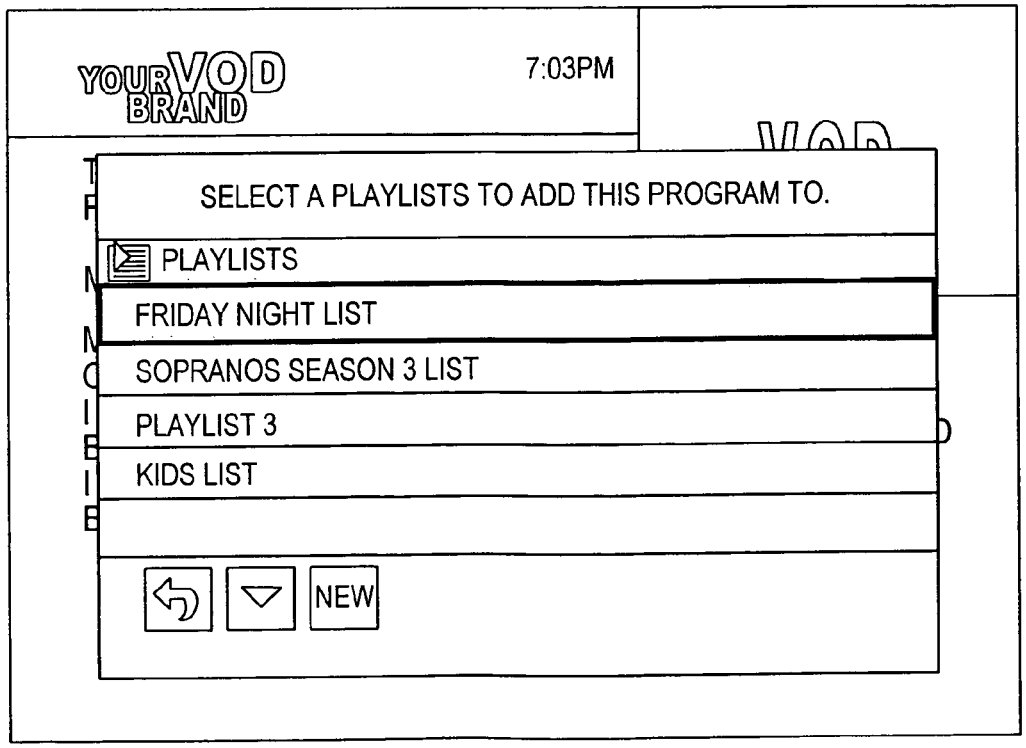
FIG. 11 shows an illustrative overlay that allows a user to select a playlist from a list of playlists in accordance with an embodiment of the invention.

FIG. 11 show an illustrative Select a Playlist Overlay that may be displayed when the user selects the Add to a Playlist Icon on the VOD Program Information screen. The user selects a playlist to which the program will be added. Tables 28-34 describe illustrative behaviors of the IPG and/or VOD server 26 in connection with providing such an overlay.

TABLE 28

Illustrative Select a Playlist Overlay
System Description

| No. | Description |
|---|---|
| 1.0 | VOD server 26 may maintain a list of playlists for each distinct STB. |
| 1.1 | The list of playlists may be ordered according to the date and time of playlist creation, beginning with the most recently created playlist. |
| 2.0 | When the Guide requests the list of playlists, and if more than one playlist has been created, VOD server 26 may provide the list of playlists to the Guide. |
| 2.1 | VOD server 26 pages up or down within the Select a Playlist overlay to allow viewing of additional playlist list pages. |
| 3.0 | VOD server 26 responds to requests from the Guide to add a new playlist. |
| 3.1 | VOD server 26 may create up to, for example, 24 playlists per STB. |
| 3.2 | VOD server 26 may communicate an error to the Guide if a request is made to add a new playlist, and the maximum number of playlists has been reached for the STB. |
| 4.0 | VOD server 26 responds to requests from the Guide to add a VOD program to an existing playlist. |
| 4.1 | VOD server 26 may include up to, for example, 24 programs per VOD playlist. |
| 4.2 | VOD server 26 may communicate an error to the Guide if a request is made to add a program to a playlist, and the maximum number of programs has been reached for the selected playlist. |

TABLE 29

Illustrative Select a Playlist Overlay
General Description

| No. | Description |
|---|---|
| 1.0 | The Guide may display the Select a Playlist Overlay when the user selects the Add Video to Playlist Icon on the VOD Program Information screen. |
| 2.0 | The Select a Playlist Overlay may include: an overlay title area a playlist list area an action icon area |
| 3.0 | The title of the Select a Playlist Overlay may be "Select a Playlist to add this program to." in the language specified by the user in the Guide setup, displayed in yellow text, centered in the overlay title area. |
| 4.0 | The playlist list area may include a header row and a vertical list of playlists. |
| 4.1 | The header row may include, left justified, the Playlist icon, followed by the text "Playlists" in white text, in the language specified by the user in Guide setup. |
| 4.2 | Each list cell in the vertical list of playlists may include the playlist name, left justified in white text. |
| 5.0 | If no playlists have been created, the vertical list of playlists may include the text "No playlists have been created" in the language specified by the user at Guide setup, displayed in yellow, |

TABLE 30

Illustrative Select a Playlist Overlay Action Icon Table

| No. | Name | Condition | Description |
|---|---|---|---|
| 1.0 | Last | Always present | Displays the screen from which it was displayed |
| 2.0 | Down Arrow | Always present | Displays the next page of VOD playlists |
| 2.1 | Down Arrow | Always present | Inactive if the current page is the last or only page. |
| 3.0 | New Playlist | Always present | If the maximum number of playlists has not been reached, the Guide may: Send a request to VOD server 26 to create a new playlist, assigning a default playlist name in the form "Playlist <lowest positive integer not already used to name a playlist>", and with the VOD program from the underlying VOD Program Information screen as its sole asset. Display the Playlist with Programs screen for the new playlist. |
| 3.1 | New Playlist | Always present | If the maximum number of playlists has been reached, the Guide may display the Maximum Playlists Notice |

TABLE 31

Illustrative Select a Playlist Overlay Input Key Processing

| No. | Key | Screen Focus | Behavior |
|---|---|---|---|
| 1.0 | Power | Any | Normal |
| 2.0 | Volume Up | Any | Normal |
| 3.0 | Volume Down | Any | Normal |
| 4.0 | Mute | Any | Normal |
| 5.0 | Channel Up | Any | Normal |
| 6.0 | Channel Down | Any | Normal |
| 7.0 | Bypass | Any | Normal |
| 8.0 | Menu | Any | Normal |
| 9.0 | Guide | Any | Normal |
| 10.0 | Music | Any | Normal |
| 11.0 | Themes | Any | Normal |
| 12.0 | Search | Any | Normal |
| 13.0 | Settings | Any | Normal |
| 14.0 | Exit | Any | Normal |
| 15.0 | Last | Any | Normal |
| 16.0 | Right Arrow | Any list cell | Inactive |
| 16.1 | Right Arrow | Any action icon but farthest right | Normal |
| 16.2 | Right Arrow | Farthest right action icon | The Guide may move the highlight to the farthest left action icon. |
| 17.0 | Left Arrow | Any list cell | Inactive |
| 17.1 | Left Arrow | Any action icon but the farthest left | Normal |
| 17.2 | Left Arrow | Farthest left action icon | The Guide may move the highlight to the farthest right action icon. |
| 18.0 | Up Arrow | Top list cell on first page | Inactive |
| 18.1 | Up Arrow | Any list cell except top on page | The Guide may move the highlight to the next higher list cell. |
| 18.2 | Up Arrow | Top list cell on any page but first | The Guide may display the previous page and highlight the bottom list cell. |
| 18.3 | Up Arrow | Any action icon | The Guide may highlight the bottom list cell on the page. |
| 19.0 | Down Arrow | Any list cell except bottom on page | The Guide may move the highlight to the next lower list cell. |
| 19.1 | Down Arrow | Bottom list cell | The Guide may move the highlight to the Down Arrow Action Icon. |
| 19.2 | Down Arrow | Down Arrow action icon | The Guide may display the next page of listings and highlight the top list cell. |

TABLE 31-continued

Illustrative Select a Playlist Overlay Input Key Processing

| No. | Key | Screen Focus | Behavior |
|---|---|---|---|
| 19.3 | Down Arrow | Any action icon except Down Arrow | Inactive |
| 20.0 | OK | Any action icon | See Table 30. |
| 20.1 | OK | Any list cell | Send a request to VOD server 26 to add the program from the underlying VOD Program Information screen to the selected playlist. If successful, dismiss the Select a Playlist Overlay and display the Program Added Overlay. |
| 20.2 | OK | Any list cell | Send a request to VOD server 26 to add the program from the underlying VOD Program Information screen to the selected playlist. If the playlist has reached the maximum number of programs, display the Maximum Programs notice over the Select a Playlist Overlay. |
| 21.0 | Digits 0-9 | Any | Normal |
| 22.0 | Scroll Up | Any | Normal |
| 23.0 | Scroll Down | Any | Normal |
| 24.0 | Day Forward | Any | Inactive |
| 25.0 | Day Back | Any | Inactive |
| 26.0 | Help | Any | Inactive |
| 27.0 | Info | Any list cell | The Guide may display the Playlist Information Screen for the highlighted Playlist. |
| 27.1 | Info | Any action Icon | Inactive |
| 28.0 | Favorite | Any | Inactive |
| 29.0 | Lock | Any | Inactive |
| 30.0 | Record | Any | Inactive |
| 31.0 | Stop | Any | Inactive |
| 32.0 | Pause | Any | Inactive |
| 33.0 | Play | Any | Inactive |
| 34.0 | Rewind | Any | Inactive |
| 35.0 | Fast Forward | Any | Inactive |
| 36.0 | PPV | Any | Normal |
| 37.0 | Letters A-Z | Any | Inactive |
| 38.0 | VOD | Any | Inactive |
| 39.0 | Return to Live TV | Any | Inactive |
| 40.0 | Skip Forward | Any | Inactive |
| 41.0 | Replay | Any | Inactive |
| 42.0 | A | Any | Inactive |
| 43.0 | B | Any | Inactive |
| 44.0 | C | Any | Inactive |
| 45.0 | Digital Recordings | Any | Normal |
| 46.0 | Swap | Any | Inactive |

TABLE 32

Illustrative Select a Playlist Overlay Other Event Handling

| No. | Event | Conditions/Comments |
|---|---|---|
| 1.0 | Screen Timeout | Normal |
| 2.0 | Reminder | Normal |
| 3.0 | Scheduled Recording Fires | Normal |
| 4.0 | Ordered PPV Start | Normal |
| 5.0 | PPV Purchase Window Expires | Inactive |
| 6.0 | Current Program Ends | Normal |
| 7.0 | Data added, deleted or modified in database | Normal |

TABLE 33

Illustrative Select a Playlist Overlay Screen/Mode Entry

| No. | Functionality | Description |
|---|---|---|
| 1.0 | Guide Initialization | The Select a Playlist Overlay may be available as soon as the VOD feature is available. |
| 2.0 | Highlight | The default highlight may be on the first playlist in the list. |
| 2.1 | Highlight | If no playlists have been created, the default highlight may be on the "Add Playlist" action icon. |
| 3.0 | Display Inclusion Criteria | Display all existing playlists. |
| 4.0 | Sorting/Grouping Criteria | The playlists may be displayed in order of creation time, from newest to oldest. |
| 5.0 | Customization | The OnDemand icon may be MSO-configurable. |
| 6.0 | Other Entry Actions | Not applicable |
| 7.0 | VOD Program context | The Guide may retain the context of the VOD program from the underlying VOD Program Information screen. |

TABLE 34

Illustrative Select a Playlist Overlay Screen Formatting

| No. | Functionality | Description |
|---|---|---|
| 1.0 | Program Title | Not applicable |
| 2.0 | Time | Normal |
| 3.0 | Channel | Not applicable |
| 4.0 | Other Text | Not Applicable |
| 5.0 | Colors | Normal |
| 6.0 | Indicators | Not applicable |
| 7.0 | Branding | Not Applicable |
| 8.0 | Audio | Normal |
| 9.0 | LEDs | Normal |

Figure 12:
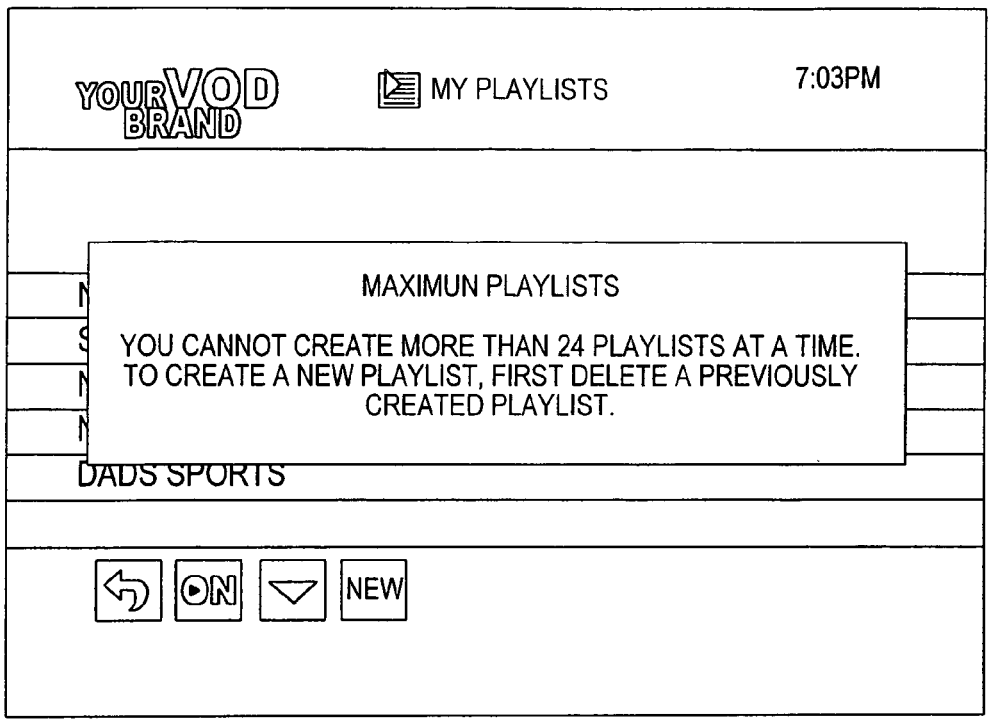
FIG. 12 shows an illustrative overlay informing a user that additional playlists cannot be created in accordance with an embodiment of the invention.

FIG. 12 shows an illustrative Maximum Playlists Overlay. The Maximum Playlists overlay may be displayed when the maximum number of playlists (e.g., 24) has been created, and the user makes a request to add a new playlist. Table 35 describes illustrative behaviors of the IPG and/or VOD server 26 in connection with providing such an overlay.

TABLE 35

Illustrative Maximum Playlists Overlay
General Descriptions

| No. | Description |
|---|---|
| 1.0 | This overlay may be displayed when the user selects the New Playlist icon on the Playlists List Screen or the Select a Playlist Overlay and the maximum number of 24 playlists has already been created. |
| 1.0 | The Maximum Playlists Overlay may include the Playlist icon followed by the title "MAXIMUM PLAYLISTS CREATED" in yellow text, centered at the top of the overlay. |
| 2.0 | The Maximum Playlists Overlay may include the text "The maximum number of Playlists has been reached. You must delete an existing Playlist to continue." in white text, centered below the title and in the language specified by the user in Language Setup. |
| 3.0 | All key presses may follow the Common Input Key Processing definition for Notice Overlays in the Appendix. |
| 4.0 | The Maximum Playlists Overlay may follow the Common Other Event Handling definition for Notice Overlays in the Appendix. |

Figure 13:
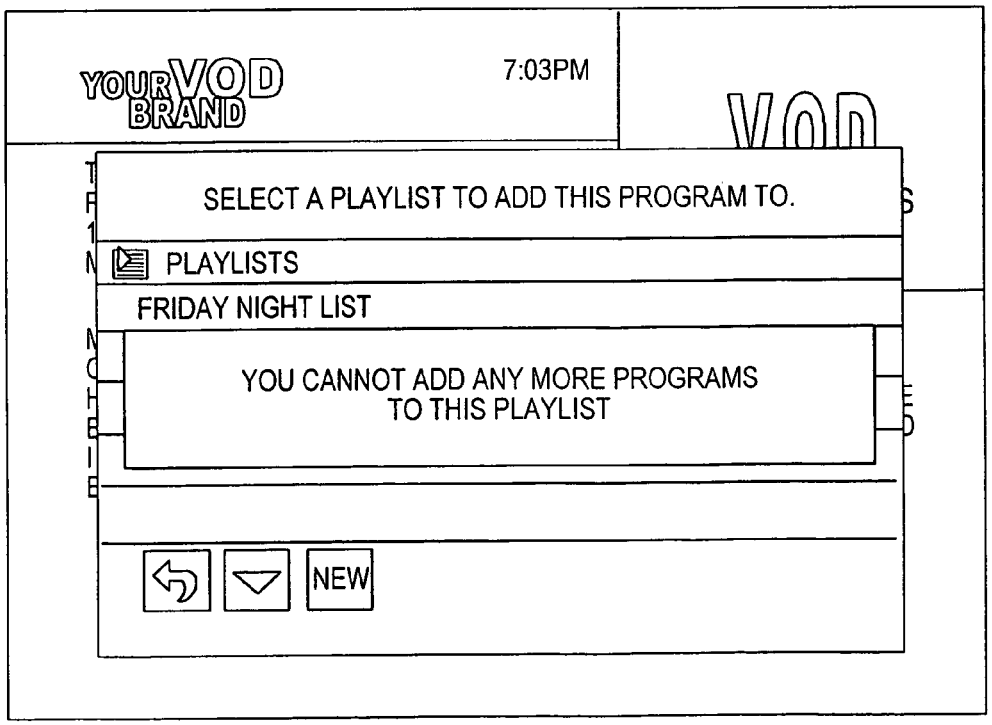
FIG. 13 shows an illustrative overlay informing a user that additional programs cannot be added to a playlist in accordance with an embodiment of the invention.

FIG. 13 shows an illustrative Maximum Programs Notice. This notice may be displayed when the user attempts to add a program to a playlist that already contains the maximum number of programs. Table 36 describes illustrative behaviors of the IPG and/or VOD server 26 in connection with providing such an overlay.

TABLE 36

Illustrative Maximum Programs Notice
General Description

| No. | Description |
|---|---|
| 1.0 | This notice may be displayed when the user selects a playlist from the Select a Playlist Overlay, or attempts to "toggle a program on" within the Playlist search screen, but the playlist already contains the maximum number of, e.g., 24 programs. |
| 2.0 | Notice text may be "You cannot add any more programs to this Playlist." displayed in yellow in the language selected by the user in Guide Setup. |
| 3.0 | This notice may follow the description as defined for Overlay Notice screens, except as specified in this section. |

Figure 14:
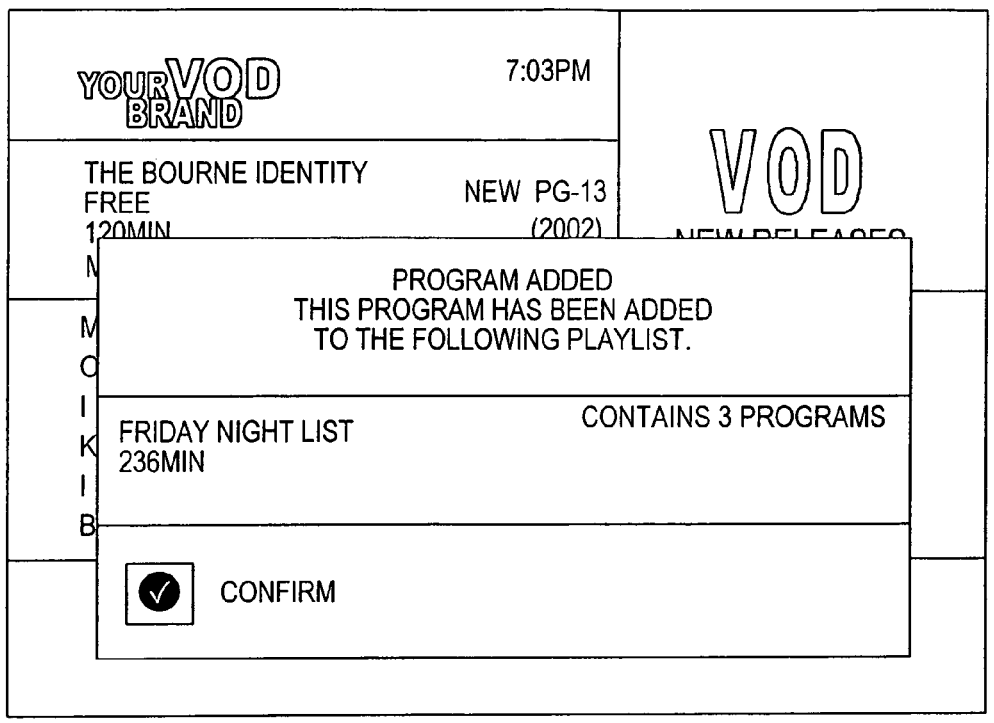
FIG. 14 shows an illustrative overlay indicating that a program has been successfully added to a playlist in accordance with an embodiment of the invention.

FIG. 14 shows an illustrative Program Added Overlay. The Program Added Overlay may be displayed when the Guide has successfully added a program to a playlist. Tables 37-38 describe illustrative behaviors of the IPG and/or VOD server 26 in connection with providing such an overlay.

TABLE 37

Illustrative Program Added Overlay
General Description

| No. | Description |
|---|---|
| 1.0 | The title of the Program Added Overlay may be "PROGRAM ADDED" in the language specified by the viewer in the Guide setup, displayed in yellow. |

TABLE 37-continued

Illustrative Program Added Overlay
General Description

| No. | Description |
|---|---|
| 1.1 | The Guide may display the text, "This program has been added to the following playlist.", on the Program Added Overlay in the language specified by the viewer in the Guide setup, displayed in white. |
| 2.0 | The Guide may display the OK/Yes Icon with the label "Confirm" on the overlay, in the language specified by the user in Guide setup. |
| 2.1 | When the OK key is pressed with the "Confirm" option highlighted, the Guide dismisses the overlay. |
| 3.0 | The default highlight on the Program Added Overlay may be the Confirm Icon. |
| 4.0 | Except as otherwise specified here, this overlay may follow the description for Single Action Overlays in the Appendix). |

TABLE 38

Illustrative Playlist with Programs Screen
Instant Information

| No. | Line | Format | Description |
|---|---|---|---|
| 1.0 | 1 | Left Justified | The name of the playlist, displayed in yellow |
| 1.1 | 1 | Right Justified | The text "Contains <number> programs" in the language specified by the user at Guide setup, displayed in white, where <number> is the number of programs in the playlist. |
| 2.0 | 2 | Left Justified | Runtime of the playlist (total runtime of all programs in the playlist) |

Figure 15:
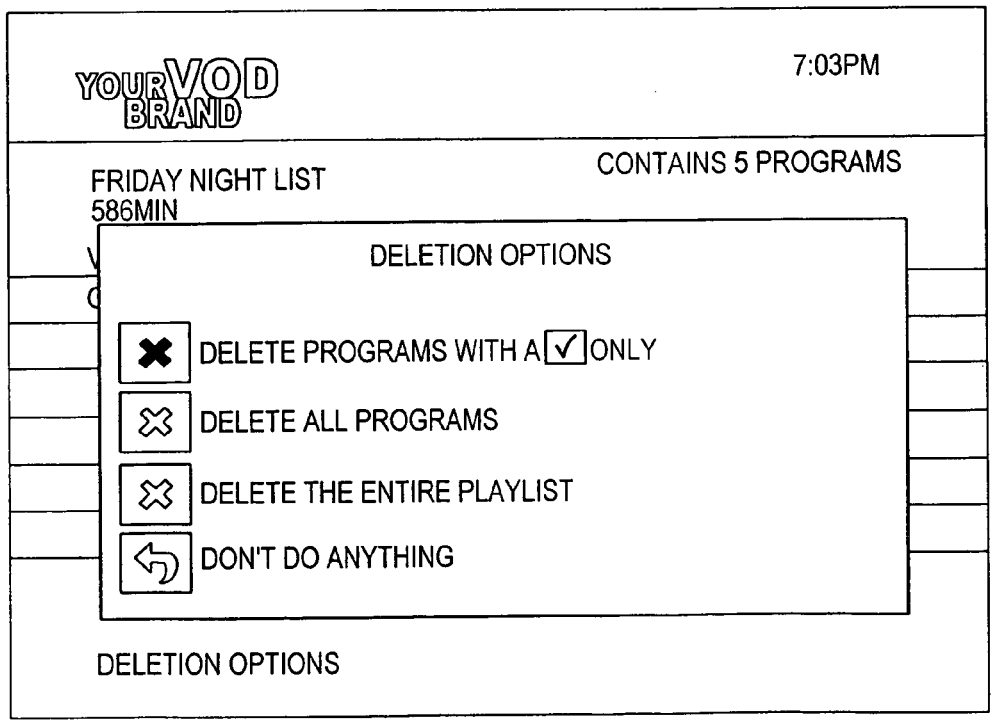
FIG. 15 shows an illustrative overlay providing a user with various deletion options in accordance with an embodiment of the invention.

FIG. 15 shows an illustrative Playlist Deletion Options Overlay. The Playlist Deletion Options Overlay may be displayed when the user selects the Delete Action Icon on the Playlist with Programs Screen. Tables 39-40 describe illustrative behaviors of the IPG and/or VOD server 26 in connection with providing such an overlay.

TABLE 39

Illustrative Playlist Deletion Options Overlay
General Description

| No. | Description |
|---|---|
| 1.0 | The Guide may display the Playlist Deletion Options Overlay when the user selects the Delete Action Icon on the Playlist with Programs Screen. |
| 1.1 | The title of the Playlist Deletion Options Overlay may be "DELETION OPTIONS" in the language specified by the viewer in the Guide setup, displayed in yellow text. |
| 2.0 | If the user has checked the deletion checkbox for at least one program in the Playlist with Programs screen, the Guide may display the Delete Icon on the Playlist Deletion Options Overlay with the label "Delete programs with a <checkmark/box> only" in the language specified by the user in the Guide setup. |
| 2.1 | The Guide may display the Delete Icon on the Playlist Deletion Options Overlay with the label "Delete all programs" in the language specified by the user in the Guide setup. |

TABLE 39-continued

Illustrative Playlist Deletion Options Overlay
General Description

| No. | Description |
|---|---|
| 2.2 | The Guide may display the Delete Icon on the Playlist Deletion Options Overlay with the label "Delete the entire playlist" in the language specified by the user in the Guide setup. |
| 2.3 | The Guide may display the Last/Back Icon on the Playlist Deletion Options Overlay with the label "Cancel" in the language specified by the user in the Guide setup. |
| 3.0 | The Deletion Options may be displayed in the following order: Delete programs with a <checkmark/box> only (if present) Delete all programs Delete the entire Playlist Don't do anything |
| 4.0 | The default highlight may be the "Delete programs with a <checkmark/box> only" option, if present. |
| 4.1 | If the "Delete programs with a <checkmark/box> only" option is not present, the default highlight may be the "Delete all programs" option. |
| 5.0 | Except as specified in this section, this overlay may follow the description in the Common Action Overlay section of the Appendix. |

TABLE 40

Illustrative Playlist Deletion Options Overlay Action
Icon Description

| No. | Action Icon | Function When Selected |
|---|---|---|
| 1.0 | Delete programs with a checkmark only (if present) | If all of the programs are checked on the underlying Playlist with Programs Screen, the Guide may: send a request to VOD server 26 to delete all programs from the playlist dismiss the overlay, and display the Default Playlist Screen with the playlist name in place of the default playlist name. |
| 1.1 | Delete programs with a checkmark only (if present) | If not all of the programs are checked on the underlying Playlist with Programs Screen, the Guide may: send a request to VOD server 26 to delete all checked programs from the playlist dismiss the overlay, and display the underlying Playlist with Programs Screen updated to reflect the deletions. |
| 2.0 | Delete all programs | The Guide may: send a request to VOD server 26 to delete all programs from the playlist dismiss the overlay, and display the Default Playlist Screen with the playlist name in place of the default playlist name. |
| 3.0 | Delete the entire Playlist | The Guide may dismiss the overlay and display the Delete Playlist Confirmation Overlay. |
| 4.0 | Don't do anything | The Guide may dismiss the overlay. |

Figure 16:
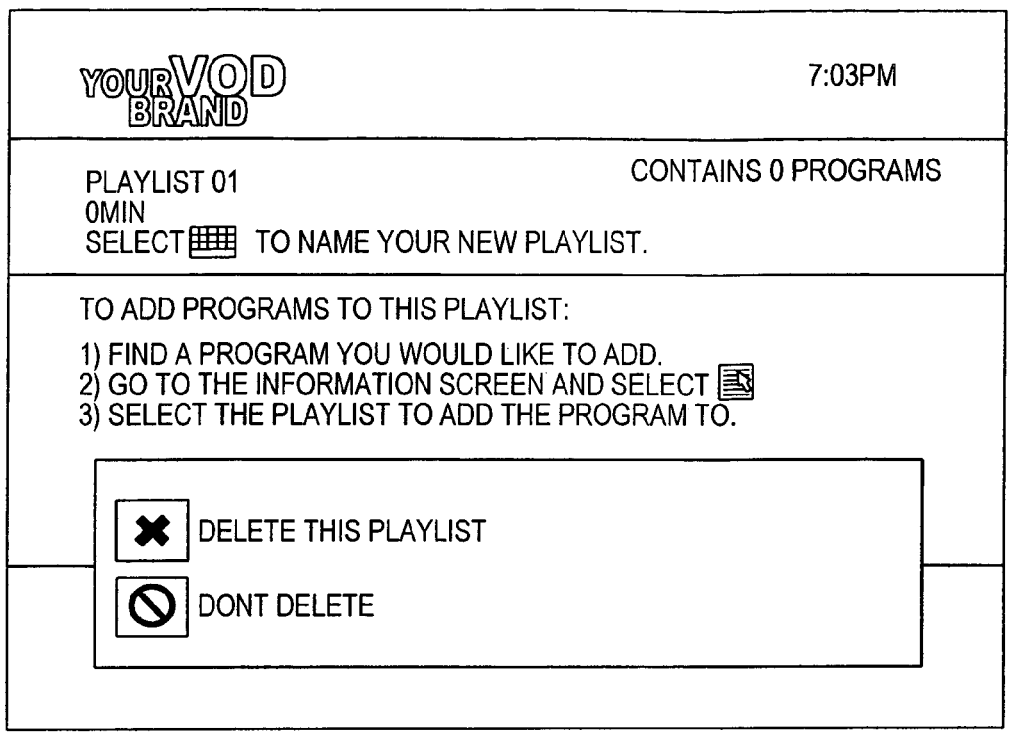
FIG. 16 shows an illustrative overlay confirming deletion of a playlist in accordance with an embodiment of the invention.

FIG. 16 shows an illustrative Delete Playlist Confirmation Overlay that may be displayed when the user selects the Delete Action Icon on the Default Playlist Screen or selects the Delete Entire Playlist option on the Playlist Deletion Options Overlay. Tables 41-42 describe illustrative behaviors of the IPG and/or VOD server 26 in connection with providing such an overlay.

TABLE 41

Illustrative Delete Playlist Confirmation Overlay General Description

| No. | Description | Rationale |
|---|---|---|
| 1.0 | The Guide may display the Delete Playlist Confirmation Overlay when the user selects the Delete Action Icon on the Default Playlist Screen or selects the Delete Entire Playlist option on the Playlist Deletion Options Overlay. | |
| 1.1 | The Guide may display the Delete Icon on the Delete Playlist Confirmation Overlay with the label "Delete Playlist" in the language specified by the user in the Guide setup. | |
| 1.2 | The Guide may display the Cancel Icon on the Delete Playlist Confirmation Overlay with the label "Don't delete Playlist" in the language specified by the user in the Guide setup. | |
| 2.0 | The default highlight may be the Delete Icon. | |
| 3.0 | Except as specified in this section, this confirmation screen may follow the description provided in the Common Confirmation Overlay section of the Appendix. | |

TABLE 42

Illustrative Delete Playlist Confirmation Overlay Action Icon Table

| No. | Name | Condition | Description |
|---|---|---|---|
| 1.0 | Delete Playlist | Always present | The Guide may: send a request to VOD server 26 to delete the playlist with all of its contents dismiss the overlay and display the screen from which the playlist was accessed. |
| 2.0 | Don't delete Playlist | Always present | The Guide may dismiss the overlay. |

Figure 17:
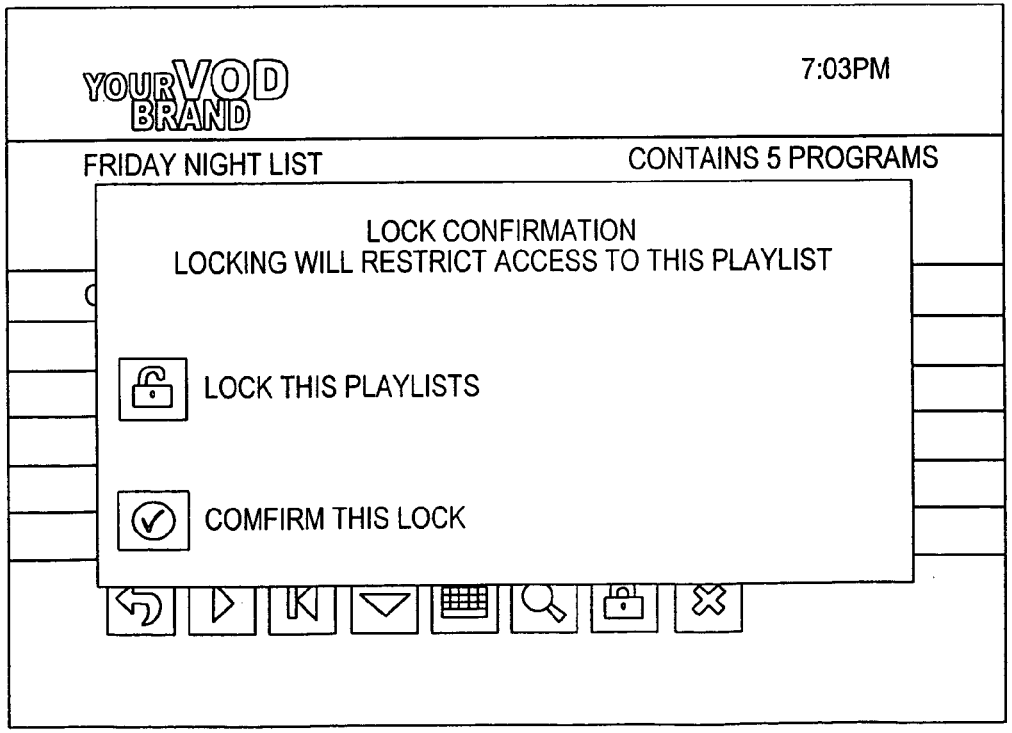
FIG. 17 shows an illustrative overlay that may be displayed when a user selects a lock action icon in accordance with an embodiment of the invention.

FIG. 17 shows an illustrative overlay that may be displayed when the user selects the Lock Action Icon on the Default Playlist Screen or Playlist with Programs Screen and enters the proper PIN on the Enter Locks PIN Overlay. If a playlist is locked, anyone without the correct PIN will not be able to access the Playlist for playback, editing, or deleting. Tables 43-44 describe illustrative behaviors of the IPG and/or VOD server 26 in connection with providing such an overlay.

TABLE 43

Illustrative Lock Playlist Overlay General Description

| No. | Description |
|---|---|
| 1.0 | This overlay may be displayed when the user selects the Lock Action Icon on the Default Playlist Screen or Playlist with Programs Screen and enters the proper PIN on the Enter Locks PIN Overlay. |
| 2.0 | Title text for the Lock Playlist Overlay may be "LOCK CONFIRMATION" displayed in yellow. |
| 2.1 | Descriptive text under the title text may be "Locking will restrict access to this playlist.", displayed in white. |
| 3.0 | If the playlist is currently unlocked, the Guide may display the Unlocked Icon on the Lock Playlist Overlay with the label "Lock this playlist" in the language specified by the user in the Guide setup. |
| 3.1 | If the playlist is currently locked, the Guide may display the Locked Icon on the Lock Playlist Overlay with the label "Unlock this playlist" in the language specified by the user in the Guide setup. |
| 4.0 | The Guide may display the OK/Yes Icon on the Lock Playlist Overlay with the label "Confirm this Lock" in the language specified by the user in the Guide setup. |
| 5.0 | The default highlight for this overlay may be the "Confirm this lock" option. |
| 6.0 | Except as specified in this section, this overlay may follow the description provided in the Common Action Overlay section of the Appendix. |

TABLE 44

Illustrative Lock Playlist Overlay Action Icon Description

| No. | Action Icon | Function When Selected |
|---|---|---|
| 1.0 | Lock this playlist | The Guide may update the playlist lock state to locked, updates the action icon to the Locked Icon, and updates the label to "Unlock this playlist". |
| 1.1 | Unlock this playlist | The Guide may update the playlist lock state to unlocked, updates the action icon to the Unlocked Icon, and updates the label to "Lock this playlist". |
| 2.0 | Confirm this lock | The Guide may dismiss the overlay. |

Figure 18:
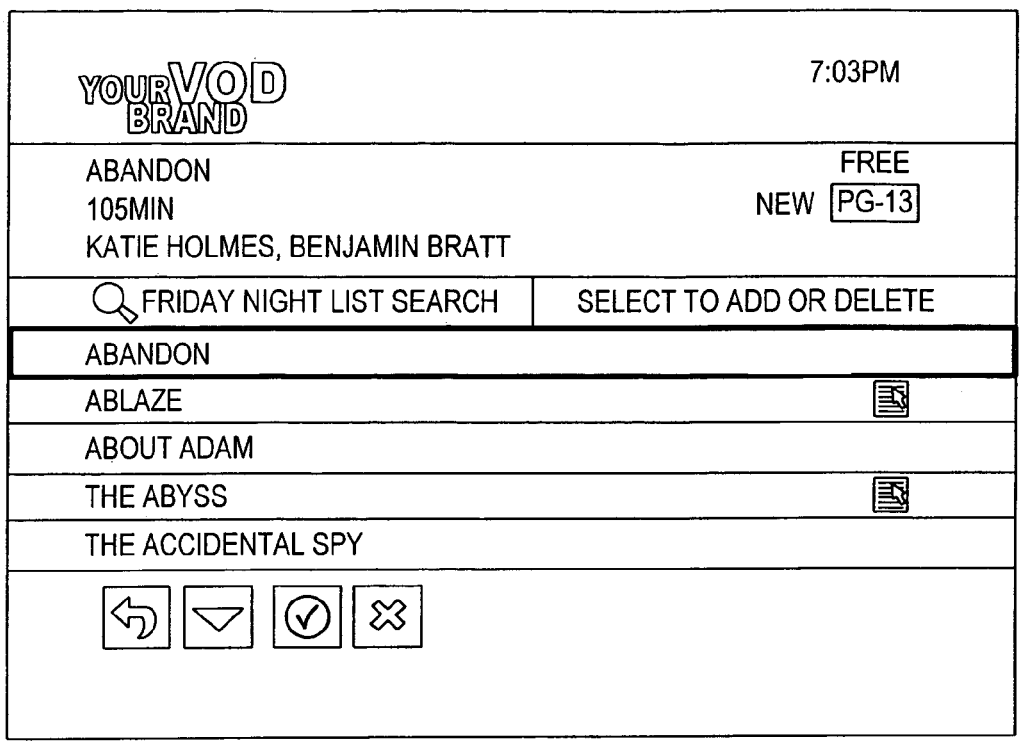
FIG. 18 shows an illustrative search screen that may be provided when a user selects a search action icon in accordance with an embodiment of the invention.
Figure 19:
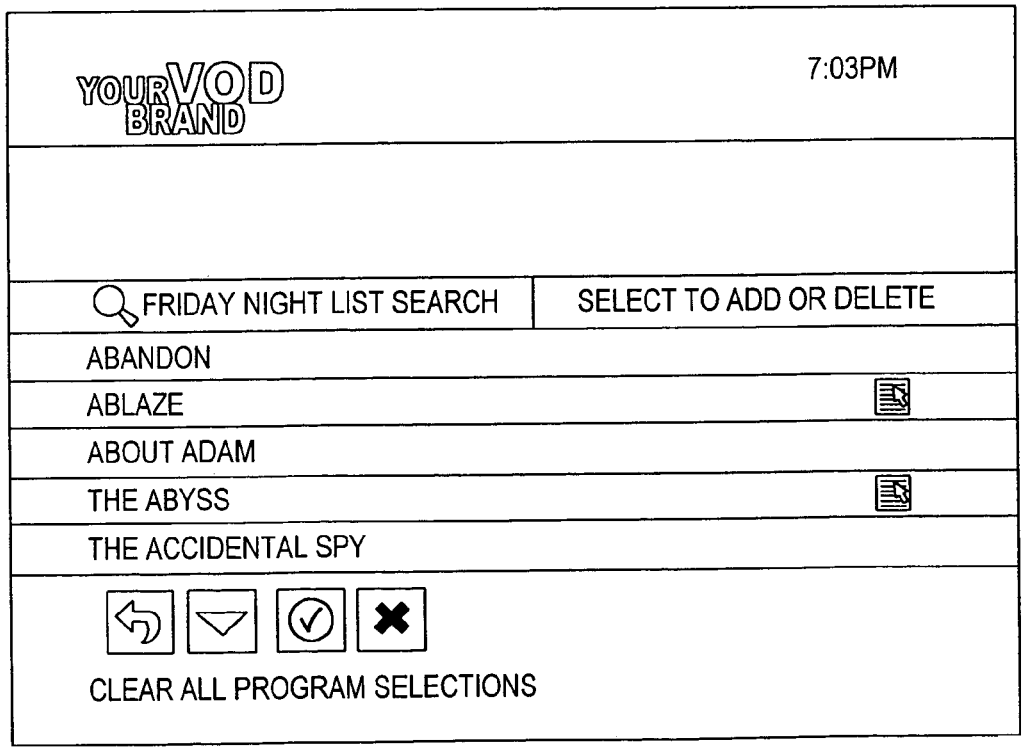
FIG. 19 shows an alternative search screen that may be provided when a user selects a search action icon in accordance with an embodiment of the invention.

FIGS. 18 and 19 show illustrative Playlist Search Screens that may be displayed when the user selects the Search action icon on the Default Playlist Screen or the Playlist with Programs Screen. These screens may contain free VOD listing search results available to add to a playlist. Tables 45-50 describe illustrative behaviors of the IPG and/or VOD server 26 in connection with providing such screens.

TABLE 45

Illustrative Playlist Search Screen General Description Table

| No. | Description |
|---|---|
| 1.0 | The Guide may display the Playlist Search Screen when the user selects the Search Icon on the Default Playlist Screen or the Playlist with Programs Screen. |
| 2.0 | The Playlist Search screen may include:<br>a screen header area<br>an instant information area<br>a playlist candidate area<br>an action icon area |
| 3.0 | The playlist candidate area may include a header row and a vertical list of playlist candidates. |
| 3.1 | The header row in the playlist candidate area may include the Search icon, followed by the text "<Playlist name> Search", left justified, where the text "Search" is in the language specified by the user in the Guide setup. |
| 3.2 | The header row in the playlist candidate area may include the text "Select to add or delete", right justified, and in the language specified by the user in the Guide setup. |
| 4.0 | The vertical list of playlist candidates may include all VOD programs that are available to the user for free, without any subscription or purchase. |
| 4.1 | The listing cell for any VOD program that is currently included in the playlist may display the Playlist icon, right justified in the listing cell. |
| 5.0 | The Guide may not permit inclusion of more than, e.g., 24 distinct VOD programs for the playlist. |
| 5.1 | If the user has toggled the playlist indicator "on" for, e.g., 24 programs, and attempts to toggle the playlist indicator "on" for an additional program, the Guide may display the Maximum Programs Notice. |
| 6.0 | Programs may be added to/deleted from a playlist immediately when toggled on/off within the Playlist Search screen. |

TABLE 46

Illustrative Playlist Search Screen Action Icon Table

| No. | Name | Condition | Description |
|---|---|---|---|
| 1.0 | Last | Always present | Displays the screen from which it was displayed |
| 2.0 | Down Arrow | Always present | Displays the next page of search results if there is a next page |
| 2.1 | Down Arrow | Always present | Inactive if there is no next page |
| 4.0 | Confirm | Always present | Displays the Default Playlist Screen if there are no programs marked as included in the playlist |
| 4.1 | Confirm | Always present | Displays the Playlist with Programs Screen if there are one or more programs marked as included in the playlist |
| 8.0 | Delete | Always present | Displays the Clear All Programs Confirmation Overlay |

TABLE 47

Illustrative Playlist Search Screen Input Key Processing

| No. | Key | Screen Focus | Behavior |
|---|---|---|---|
| 1.0 | Power | Any | Normal |
| 2.0 | Volume Up | Any | Normal |
| 3.0 | Volume Down | Any | Normal |
| 4.0 | Mute | Any | Normal |
| 5.0 | Channel Up | Any | Normal |
| 6.0 | Channel Down | Any | Normal |
| 7.0 | Bypass | Any | Normal |
| 8.0 | Menu | Any | Normal |
| 9.0 | Guide | Any | Normal |
| 10.0 | Music | Any | Normal |
| 11.0 | Themes | Any | Normal |
| 12.0 | Search | Any | Normal |
| 13.0 | Settings | Any | Normal |
| 14.0 | Exit | Any | Normal |
| 15.0 | Last | Any | Normal |
| 16.0 | Right Arrow | Any list cell | Inactive |
| 16.1 | Right Arrow | Any action icon but | Normal |

TABLE 47-continued

Illustrative Playlist Search Screen Input Key Processing

| No. | Key | Screen Focus | Behavior |
|---|---|---|---|
| | | farthest right | |
| 16.2 | Right Arrow | Farthest right action icon | The Guide may move the highlight to the farthest left action icon. |
| 17.0 | Left Arrow | Any list cell | Inactive |
| 17.1 | Left Arrow | Any action icon but the farthest left | Normal |
| 17.2 | Left Arrow | Farthest left action icon | The Guide may move the highlight to the farthest right action icon. |
| 18.0 | Up Arrow | Top list cell on first page | Inactive |
| 18.1 | Up Arrow | Any list cell except top on page | The Guide may move the highlight to the next higher list cell. |
| 18.2 | Up Arrow | Top list cell on any page but first | The Guide may display the previous page and highlight the bottom list cell. |
| 18.3 | Up Arrow | Any action icon | The Guide may highlight the bottom list cell on the page. |
| 19.0 | Down Arrow | Any list cell except bottom on page | The Guide may move the highlight to the next lower list cell. |
| 19.1 | Down Arrow | Bottom list cell | The Guide may move the highlight to the Down Arrow Action Icon. |
| 19.2 | Down Arrow | Down Arrow action icon | The Guide may display the next page of listings and highlight the top list cell. |
| 19.3 | Down Arrow | Any action icon except Down Arrow | Inactive |
| 20.0 | OK | Any action icon | See Table 46. |
| 20.1 | OK | Any list cell | The Guide may add/remove the program from the playlist and toggle the Playlist Indicator on or off, right justified in the list cell. |
| 21.0 | Digits 0-9 | Any | Normal |
| 22.0 | Scroll Up | Any | Normal |
| 23.0 | Scroll Down | Any | Normal |
| 24.0 | Day Forward | Any | Inactive |
| 25.0 | Day Back | Any | Inactive |
| 26.0 | Help | Any | Inactive |
| 27.0 | Info | Any list cell | The Guide may display the VOD Program Information Screen for the highlighted program. |
| 27.1 | Info | Any action Icon | Inactive |
| 28.0 | Favorite | Any | Inactive |
| 29.0 | Lock | Any | Inactive |
| 30.0 | Record | Any | Inactive |
| 31.0 | Stop | Any | Inactive |
| 32.0 | Pause | Any | Inactive |
| 33.0 | Play | Any | Inactive |
| 34.0 | Rewind | Any | Inactive |
| 35.0 | Fast Forward | Any | Inactive |
| 36.0 | PPV | Any | Normal |
| 37.0 | Letters A-Z | Any | Inactive |
| 38.0 | VOD | Any | Inactive |
| 39.0 | Return to Live TV | Any | Inactive |
| 40.0 | Skip Forward | Any | Inactive |
| 41.0 | Replay | Any | Inactive |
| 42.0 | A | Any | Inactive |
| 43.0 | B | Any | Inactive |
| 44.0 | C | Any | Inactive |
| 45.0 | Digital Recordings | Any | Normal |
| 46.0 | Swap | Any | Inactive |

TABLE 48

Illustrative Playlist Search Screen Other Event Handling

| No. | Event | Conditions/Comments |
|---|---|---|
| 1.0 | Screen Timeout | Normal |
| 2.0 | Reminder | Normal |
| 3.0 | Scheduled Recording Fires | Normal |
| 4.0 | Ordered PPV Start | Normal |
| 5.0 | PPV Purchase Window Expires | Inactive |
| 6.0 | Current Program Ends | Normal |
| 7.0 | Data added, deleted or modified in database | Normal |

TABLE 49

Illustrative Playlist Search Screen/Mode Entry

| No. | Functionality | Description |
|---|---|---|
| 1.0 | Guide Initialization | The Playlist Search Screen may be available as soon as the VOD feature is available. |
| 2.0 | Highlight | The default highlight may be on the first listing in the playlist candidate area. |
| 3.0 | Display Inclusion | Display all VOD programs that are free without any subscription or purchase. |
| 4.0 | Sorting/Grouping Criteria | Programs may be sorted in ascending alphanumeric order. |
| 5.0 | Customization | The OnDemand icon may be MSO-configurable. |
| 6.0 | Other Entry Actions | Not applicable |
| 7.0 | Playlist context | The Playlist Search screen may retain the context of the VOD playlist in the Playlist Information screen from which this screen was invoked. |

TABLE 50

Illustrative Playlist Search Screen Formatting

| No. | Functionality | Description |
|---|---|---|
| 1.0 | Program Title | Normal |
| 2.0 | Time | Normal |
| 3.0 | Channel | Not applicable |
| 4.0 | Other Text | Not Applicable |
| 5.0 | Colors | Normal |
| 6.0 | Indicators | Not applicable |
| 7.0 | Branding | Not Applicable |
| 8.0 | Audio | Normal |
| 9.0 | LEDs | Normal |

Figure 20:
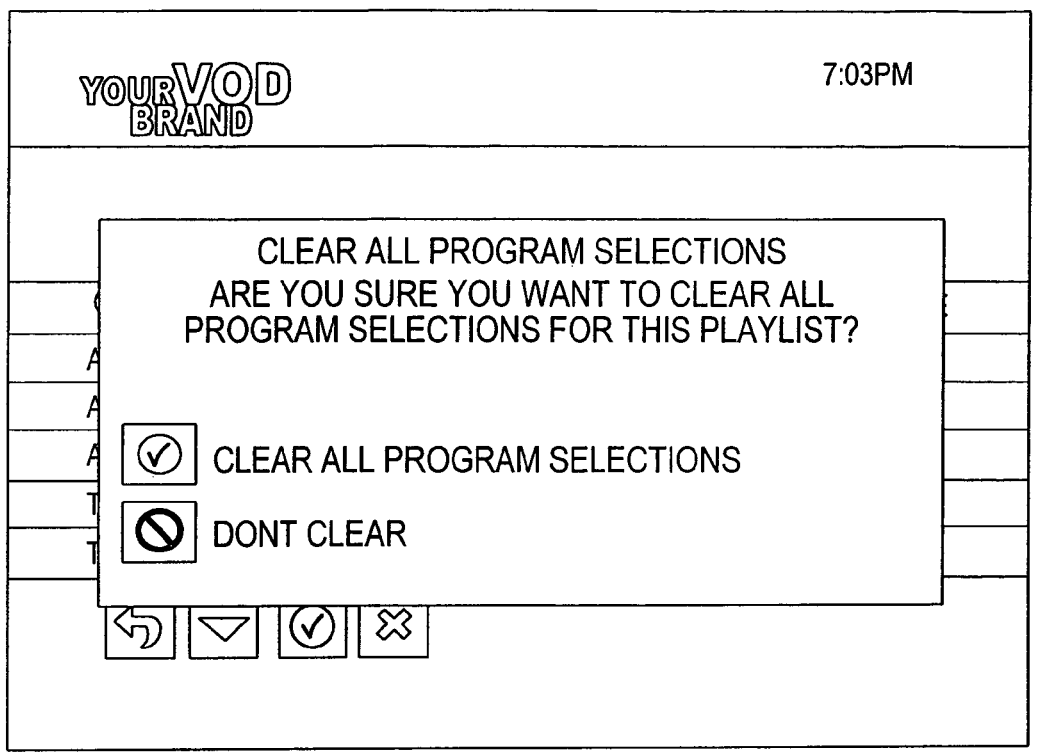
FIG. 20 shows an illustrative clear all programs confirmation overlay that may be displayed in accordance with an embodiment of the invention.

FIG. 20 shows an illustrative Clear All Programs Confirmation Overlay that may be displayed when the user selects the Delete action icon on the Playlist Search Screen. Tables 51-52 describe illustrative behaviors of the IPG and/or VOD server 26 in connection with providing such an overlay.

TABLE 51

Illustrative Clear All Programs Confirmation Overlay
General Description

| No. | Description |
|---|---|
| 1.0 | The Guide may display the Clear All Programs Overlay when the user selects the Delete action icon on the Playlist Search Screen. |
| 1.1 | The Guide may display the title "CLEAR ALL PROGRAM SELECTIONS" on the Clear All Programs Overlay in the language specified by the user in the Guide setup, in yellow text. |
| 1.2 | The Guide may display the prompt "Are you sure you want to clear all program selections for this playlist?" on the |

TABLE 51-continued

Illustrative Clear All Programs Confirmation Overlay
General Description

| No. | Description |
|---|---|
| | Clear All Programs Overlay in the language specified by the user in Guide setup. |
| 1.3 | The Guide may display the OK/Yes icon on the Clear All Programs Overlay with the label "Clear all program selections" in the language specified by the user in the Guide setup. |
| 1.4 | The Guide may display the Cancel icon on the Clear All Programs Overlay with the label "Don't clear" in the language specified by the user in the Guide setup. |
| 2.0 | The default highlight may be the OK/Yes icon. |
| 3.0 | Except as specified in this section, this confirmation screen may follow the description provided in the Common Confirmation Overlay section of the Appendix. |

TABLE 52

Illustrative Clear All Programs Confirmation Overlay
Action Icon Table

| No. | Name | Condition | Description |
|---|---|---|---|
| 1.0 | Clear all program selections | Always present | Dismisses the Clear All Programs Overlay, clears all programs from the playlist, and displays the underlying Playlist Search Screen updated with all playlist indicators removed. |
| 2.0 | Don't clear | Always present | Dismisses the Clear All Programs Overlay. |

Section III. Bookmarks

The Bookmark feature allows the user to save any programs in the combined Bookmarked/Suspended Programs List (collectively referred to herein as the Saved Programs List). In the embodiment described below, only On Demand programs are included. In other embodiments, Non-On Demand programs may be included.

In this embodiment, any On Demand program can be bookmarked regardless of whether it is always free, free with a subscription, or requires a purchase. The user may select a Bookmark Icon from, for example, an On Demand program information screen.

Figure 21:
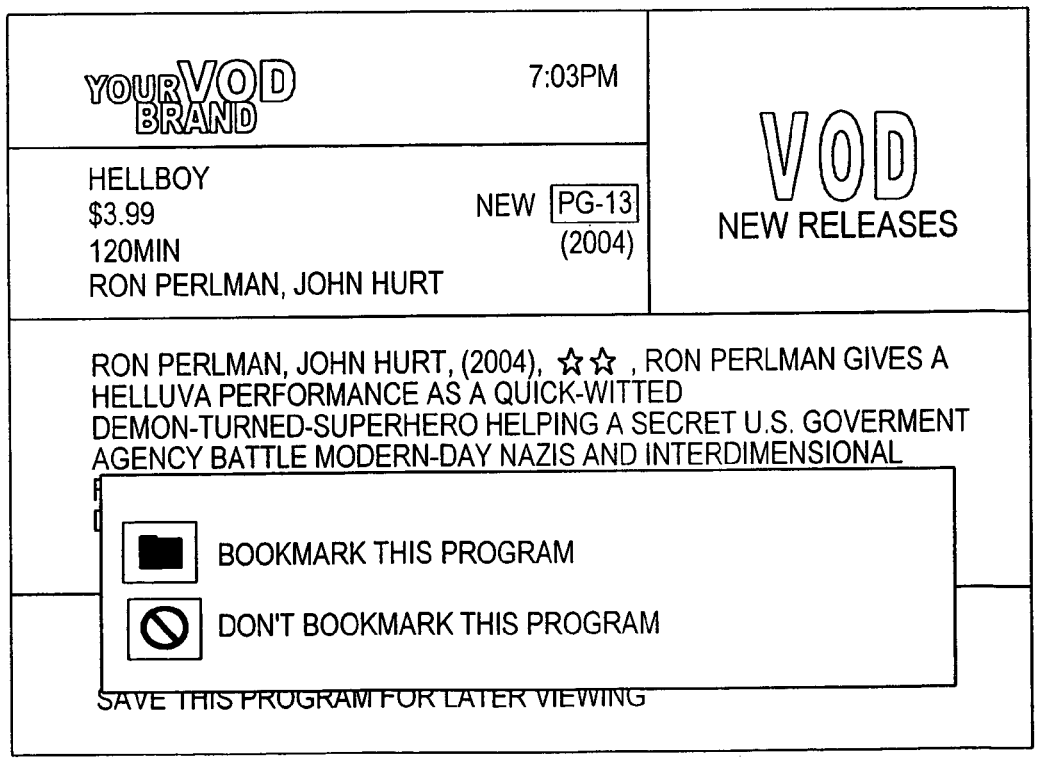
FIG. 21 shows an illustrative bookmark a VOD program confirmation display in accordance with an embodiment of the invention.

FIG. 21 shows an illustrative Bookmark a VOD Program Confirmation Overlay that may be displayed when the user selects the Bookmark Icon in a VOD program information screen, and the program has not already been bookmarked. Tables 53-55 describe illustrative behaviors of the IPG and/or VOD server 26 in connection with providing such an overlay.

TABLE 53

Illustrative Bookmark a Program Confirmation
Overlay System Description

| No. | Description |
|---|---|
| 1.0 | VOD server 26 may maintain a list of bookmarked programs for each distinct STB. |
| 2.0 | VOD server 26 may add the program shown in the information screen to the list of bookmarked programs if the Guide makes a set bookmark request based on user selection of the "Bookmark this program" action icon. |
| 2.1 | VOD server 26 may bookmark any VOD asset that is accessible to the subscriber. |
| 2.2 | If VOD server 26 already has a maximum, e.g., 20 bookmarked programs for a STB, and if the Guide requests an additional bookmarked program, VOD server |

TABLE 53-continued

Illustrative Bookmark a Program Confirmation Overlay System Description

| No. | Description |
|---|---|
| | 26 may delete the oldest bookmarked program from the bookmarked programs list for the STB. |

TABLE 54

Illustrative Bookmark a Program Confirmation Overlay General Description

| No. | Description |
|---|---|
| 1.0 | The Guide may display the Bookmark a Program Confirmation Overlay when the user selects the Bookmark Icon in any VOD program information screen. |
| 1.1 | The Guide may display the Bookmark button on the Bookmark a Program Confirmation Overlay with the label "Bookmark this program" in the language specified by the user in the Guide setup. |
| 1.2 | The Guide may display the Cancel button on the Bookmark a Program Confirmation Overlay with the label "Don't bookmark this program" in the language specified by the user in the Guide setup. |
| 2.0 | The default highlight may be the Bookmark this program action icon. |
| 3.0 | Except as specified in this section, this confirmation screen may follow the description provided in the Common Confirmation Overlay section of the Appendix. |

TABLE 55

Illustrative Bookmark a Program Confirmation Overlay Action Icon Table

| No. | Name | Condition | Description |
|---|---|---|---|
| 1.0 | Bookmark this program | Always present | Request that VOD server 26 add the bookmark, dismiss the Bookmark a Program Confirmation Overlay, and update the instant information display in the underlying VOD program information screen. |
| 2.0 | Don't bookmark this program | Always present | Dismiss the Bookmark a Program Confirmation Overlay |

Figure 22:
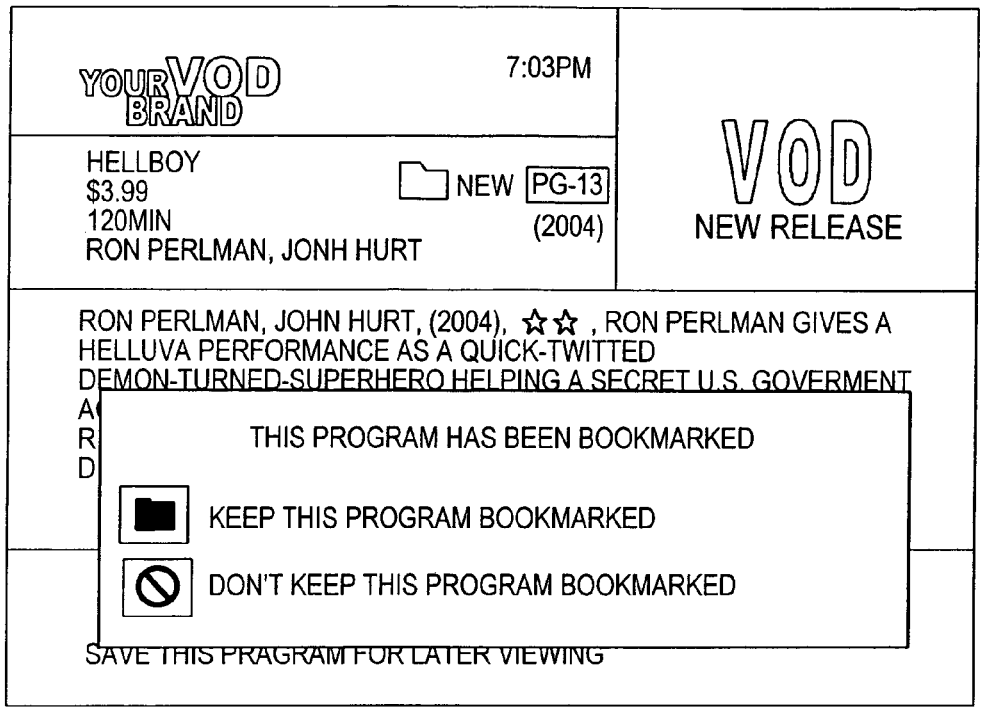
FIG. 22 shows an illustrative previously bookmarked confirmation overlay that may be displayed in accordance with an embodiment of the invention.

FIG. 22 shows an illustrative Previously Bookmarked Confirmation Overlay that may be displayed when the user selects the Bookmark Icon on a VOD program information screen for a program that has already been bookmarked. Tables 56-58 describe illustrative behaviors of the IPG and/or VOD server 26 in connection with providing such an overlay.

TABLE 56

Illustrative Previously Bookmarked Confirmation Overlay System Description

| No. | Description |
|---|---|
| 1.0 | VOD server 26 may maintain a list of bookmarked programs for each distinct STB. |
| 2.0 | VOD server 26 may delete the program shown in the information screen from the Saved Programs List if the Guide makes a remove Bookmark request based on user selection of the "Don't keep this program bookmarked" action icon. |

TABLE 57

Illustrative Previously Bookmarked Confirmation Overlay General Description

| No. | Description |
|---|---|
| 1.0 | The Guide may display the Previously Bookmarked Confirmation Overlay when the user selects the Bookmark Icon in a VOD program information screen for a program that has already been bookmarked. |
| 1.1 | The Guide may display the title "This program is already bookmarked." on the Previously Bookmarked Confirmation Overlay in the language specified by the user in the Guide setup, in yellow text. |
| 1.2 | The Guide may display the Bookmark button on the Previously Bookmarked Confirmation Overlay with the label "Keep this program bookmarked" in the language specified by the user in the Guide setup. |
| 1.3 | The Guide may display the Cancel button on the Previously Bookmarked Confirmation Overlay with the label "Don't keep this program bookmarked" in the language specified by the user in the Guide setup. |
| 2.0 | The default highlight may be the "Bookmark" Icon. |
| 3.0 | Except as specified in this section, this confirmation screen may follow the description provided in the Common Confirmation Overlay section of the Appendix. |

TABLE 58

Illustrative Previously Bookmarked Confirmation Overlay Action Icon Table

| No. | Name | Condition | Description |
|---|---|---|---|
| 1.0 | Keep this program bookmarked | Always present | Dismiss the Previously Bookmarked Confirmation Overlay. |
| 2.0 | Don't keep this program bookmarked | Always present | Request that VOD server 26 remove the bookmark, dismiss the Previously Bookmarked Confirmation Overlay, and update the instant information display in |

TABLE 58-continued

Illustrative Previously Bookmarked Confirmation
Overlay Action Icon Table

| No. | Name | Condition | Description |
|---|---|---|---|
| | | | the underlying VOD program information screen. |

Figure 23:
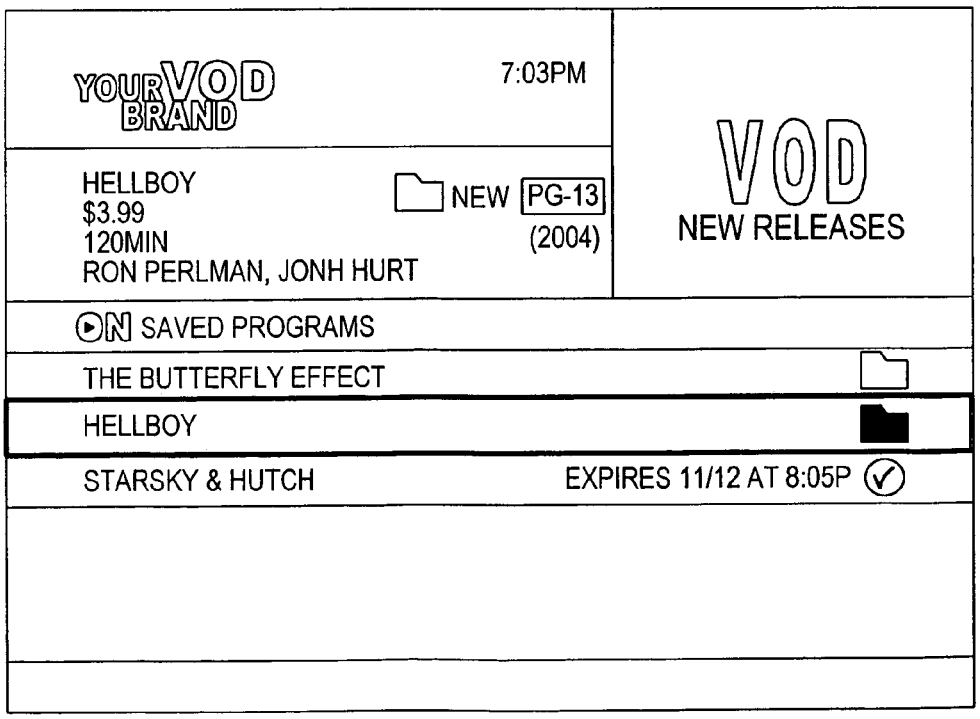
FIG. 23 shows an illustrative saved programs listing screen in accordance with an embodiment of the invention.
Figure 24:
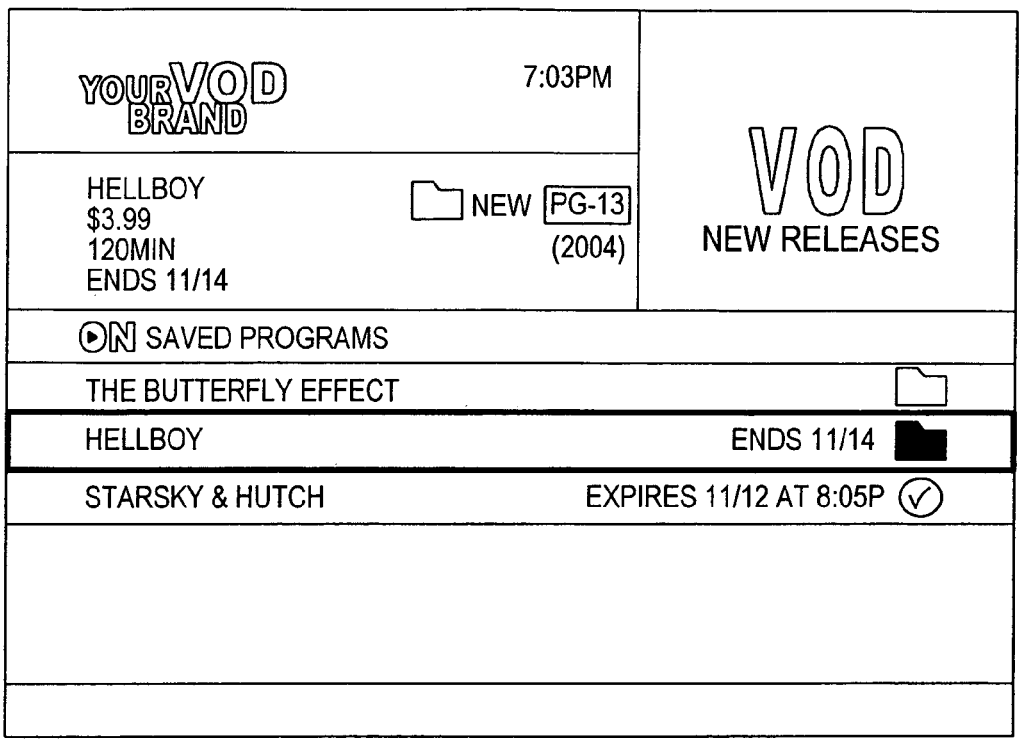
FIG. 24 shows an alternative illustrative saved programs listings screen in accordance with an embodiment of the invention.

FIGS. 23 and 24 shows illustrative Saved Programs Listing Screens that contain a list of programs the user has either bookmarked or suspended after selecting the Buy or Watch action icon on an On Demand program information screen. VOD server 26 (FIG. 1) may provides a link to the Saved Programs Listing Screen through the On Demand Main Menu or a VRN screen by defining a category on the screen for the saved programs. From this screen the user can access the On Demand information screen for a saved program and begin or resume watching that program. Tables 59-65 describe illustrative behaviors of the IPG and/or VOD server 26 in connection with providing such overlays.

TABLE 59

Illustrative Saved Programs Listing Screen
System Description

| No. | Description |
|---|---|
| 1.0 | VOD server 26 may maintain a list of suspended programs for each distinct subscriber household. |
| 2.0 | VOD server 26 may maintain a list of bookmarked programs for each distinct STB. |
| 3.0 | When the Guide requests the saved programs list, VOD server 26 may provide a combined list including: bookmarked programs for the STB suspended programs for the subscriber household. |
| 3.1 | The combined saved programs list may be sorted to include all suspended programs first, followed by all bookmarked programs. |
| 3.2 | Suspended programs and bookmarked programs may not be intermingled within the saved programs list. |
| 3.3 | Suspended programs may be sorted alphanumerically within the suspended programs section of the saved programs list. |
| 3.4 | Bookmarked programs may be sorted alphanumerically within the suspended programs section of the saved programs list. |
| 3.5 | VOD server 26 may identify each individual program within the combined saved programs list as being either suspended or bookmarked. |
| 3.6 | VOD server 26 may provide, as required, page up or down within the Saved Programs Listing screen to view additional saved program listing pages. |
| 4.0 | VOD server 26 may provide up to, e.g., 20 suspended programs per subscriber household. |
| 4.1 | The VOD server 26 configuration may determine whether a program can be suspended (i.e. added to the suspended programs list). |
| 4.2 | If VOD server 26 already has, e.g., 20 suspended programs for a subscriber household, and if the Guide requests an additional suspended program, the On Demand system may delete the oldest[3] suspended program from the suspended programs list for the subscriber household. |
| 4.3 | VOD server 26 may automatically delete suspended programs from the saved programs list when the rental or viewing period has expired. |
| 4.4 | VOD server 26 may automatically delete suspended programs from the saved programs list if they reach the end of their licensing window. |
| 5.0 | VOD server 26 may support up to, e.g., 20 bookmarked programs per STB. |
| 5.1 | VOD server 26 may bookmark any On Demand asset that is accessible to the subscriber. |
| 5.2 | If VOD server 26 already has, e.g., 20 bookmarked programs for a STB, and if the Guide requests an additional bookmarked program, VOD server 26 may delete the oldest bookmarked program from the bookmarked programs list for the STB. |
| 5.3 | VOD server 26 may automatically delete bookmarked programs from the saved programs list if they reach the end of their licensing window. |
| 6.0 | If the Guide requests suspension of a program that has already been bookmarked, VOD server 26 may change the status of the program from bookmarked to suspended. |
| 6.1 | If the Guide requests purchase and/or playback of a bookmarked program that cannot be suspended, the program may be removed from the saved programs list. |
| 7.0 | The system may provide an On Demand icon to the Guide. |
| 7.1 | The On Demand icon may be configurable to the individual headend level. |
| 8.0 | The VOD Server 26 may provide a screen title for the Saved Programs Listing screen to the Guide. |
| 9.0 | The VOD Server 26 may indicate whether a Barker Window should be displayed in the Saved Programs Listing screen. |
| 10.0 | The VOD Server 26 may provide the following metadata as applicable, for each program in the Saved Programs list: Short program title Suspended or Bookmarked flag Expiration date (for suspended programs) Licensing window data (for bookmarked programs) Adult flag |

TABLE 59-continued

Illustrative Saved Programs Listing Screen
System Description

| No. | Description |
|---|---|
|  | Price string |
|  | Closed caption flag |
|  | HDTV flag |
|  | Dolby digital audio flag |
|  | Widescreen flag |
|  | TV Rating/MPAA Rating |
|  | In a Playlist flag |
|  | Program duration |
|  | Year |
|  | Actor1, Actor2 |
|  | Free flag |
|  | Last chance flag |
| 11.0 | The system may provide an On Demand brand to the Guide. |
| 11.0 | The On Demand brand may be configurable to the headend level. |

[3] The "oldest" suspended program is the suspended program with the earliest expiration date/time.

TABLE 60

Illustrative Saved Programs Listing Screen
Instant Information Display

| No. | Highlight Location | Line | Description |
|---|---|---|---|
| 1.0 | Any Program, if video barker is present | 1 | Short program title, left justified in yellow text, as specified in the On Demand data. |
| 1.0 | Any Program, if video barker is not present | 1 | Full program title, left justified in yellow text, as specified in the On Demand data. |
| 2.0 | Any Program marked as "Free", if video barker is not present. | 1 | Price string, right justified in yellow text, as specified in the On Demand data. |
| 2.1 | Any Program not marked as "Free", if video barker is not present. | 1 | Price string, right justified in white text, as specified in the On Demand data. |
| 2.2 | Any Program marked as "Free", if video barker is present. | 2 | Price string, left justified in yellow text, as specified in the On Demand data. |
| 2.3 | Any Program not marked as "Free", if video barker is present. | 2 | Price string, left justified in white text, as specified in the On Demand data. |
| 3.0 | Any Program | 2 | Program indicators, right justified, as specified in Table 65. |
| 4.0 | Any Program, if video barker is not present | 2 | Program duration, left justified in white text, in the format "<duration in minutes>min". |
| 4.1 | Any Program, if video barker is present | 3 | Program duration, left justified in white text, in the format "<duration in minutes>min". |
| 5.0 | Any Program | 3 | Year, right justified in white text, in the format "(<year>)". |
| 6.0 | Any bookmarked program, if Last Chance flag is set and video barker is not present. | 3 | The text "Ends <last date of licensing window>", left justified in white text, in the language specified by the user in guide setup. Date format is "<mm/dd/yyyy>", or "<yyyy/dd/mm>" for DLA. |
| 6.1 | Any bookmarked program, if Last | 3 | "<Actor 1>, <Actor 2>", left justified in white text. |

TABLE 60-continued

Illustrative Saved Programs Listing Screen
Instant Information Display

| No. | Highlight Location | Line | Description |
|---|---|---|---|
| | Chance flag is not set and video barker is not present. | | |
| 6.2 | Any suspended program, if video barker is not present. | 3 | The text "Expires <expiration date/time for suspended program>", left justified in white text, in the language specified by the user in guide setup. Date/time format is "<mm/dd> at <hh:mm><a/p>", or "<dd/mm> at <hh:mm><a/p>" for DLA. |
| 6.3 | Any bookmarked program, if Last Chance flag is set and video barker is present. | 4 | The text "Ends <last date of licensing window>", left justified in white text, in the language specified by the user in guide setup. Date format is "<mm/dd/yyyy>", or "<yyyy/dd/mm>" for DLA. |
| 6.4 | Any bookmarked program, if Last Chance flag is not set and video barker is present. | 4 | "<Actor 1>, <Actor 2>", left justified in white text. |
| 6.5 | Any suspended program, if video barker is present. | 4 | The text "Expires <expiration date/time for suspended program>", left justified in white text, in the language specified by the user in guide setup. Date/time format is "<mm/dd> at <hh:mm><a/p>", or "<dd/mm> at <hh:mm><a/p>" for DLA. |

TABLE 61

Illustrative Saved Programs Listing Screen
General Description

| No. | Description |
|---|---|
| 1.0 | The Saved Programs Listing screen may include:<br>a screen header area<br>an instant information area<br>a saved programs listing area |
| 1.1 | The saved programs listing area may include a header row and a vertical saved programs list. |
| 1.2 | The saved programs listing area header row may include the On Demand icon, followed by the screen title specified in the On Demand data, left justified in white text. |
| 2.0 | The Guide may obtain a list of suspended and/or bookmarked programs for display on the Saved Programs Listing Screen. |
| 2.1 | The Guide may display between, e.g., zero and seven listing cells on the Saved Programs Listing screen. |
| 2.1.1 | When a Barker Window is present, the Guide may display between, e.g., zero and six listing cells on the Saved Program Listing Screen. |
| 2.2 | The listing cells may be displayed by the Guide on the Saved Programs Listing screen in a vertical column, below the header row in the saved programs listing area. |
| 2.3 | The Guide may display one listing cell for each distinct asset that is returned in the On Demand data. |
| 2.4 | The label of each listing on the Saved Programs Listing screen may be the short title of the program, as specified by the On Demand data, unless the video is rated Adult and the Hide Adult Titles option is enabled in the Parental Control Setup. |
| 2.5 | The label of a listing cell on the Saved Programs Listing Screen may be "Adult Programming" in the user-selected language, if the rating of the video is Adult and the user has enabled the Hide Adult Titles option in the Parental Control Setup. |
| 2.6 | The Guide may display the Bookmarked icon on the listing cell if the On Demand data indicates that the program is bookmarked. |
| 2.6.1 | The Guide may display the text "Ends" in the user-selected text language, followed by the last date of the program's licensing window, right justified in the listing cell, directly to the left of the bookmarked icon, if the On |

TABLE 61-continued

Illustrative Saved Programs Listing Screen
General Description

| No. | Description |
|---|---|
| | Demand data indicates that the program is bookmarked, and that the program is a last chance video.<br>Example: "Ends 6/25" (i.e. June 25) |
| 2.6.2 | In a DLA environment, the Guide may display "Ends" in the user-selected text language, followed by the last date of the program's licensing window in international date format, right justified in the listing cell, directly to the left of the bookmarked icon, if the On Demand data indicates that the program is bookmarked, and that the program is a last chance video.<br>Example: "Ends 25/6" (i.e. June 25) |
| 2.7 | The Guide may display the Checkmark icon on the listing cell if the On Demand data indicates that the program is suspended. |
| 2.7.1 | The Guide may display the text "Expires" in the user-selected text language, followed by expiration date and time, right justified in the listing cell, directly to the left of the checkmark icon, if the On Demand data indicates that the program is suspended.<br>Example: "Expires 11/12 at 8:05p" (i.e. November 12) |
| 2.7.2 | In a DLA environment, the Guide may display "Expires" in the user-selected text language, followed by the expiration date and time in international date format, right justified in the listing cell, directly to the left of the checkmark icon, if the On Demand data indicates that the program is suspended.<br>Example: "Expires 12/11 at 8:05p" (i.e. November 12) |
| 2.8 | The Guide may display the program listing cells on the screen in the order programs are specified in the On Demand data, beginning with the top cell and proceeding to the bottom cell. |
| 2.9 | The color of the listing cells on the Saved Programs Listing Screen may be blue. |
| 3.0 | The Guide may highlight the screen item that currently has focus. |
| 4.0 | The Guide may provide a mechanism to page up and down to view additional saved program listing pages. |
| 4.1 | Navigation across multiple saved program listing pages may not be circular, navigation above the top of the list or below the bottom of the list may be disabled. |
| 5.0 | The Guide may control the display of the Saved Programs Listing Screen elements. |
| 5.1 | The Guide may postpone display of the listing cells until the listing data is available. |
| 5.2 | The Guide may display the No Listings Available Screen if the server returns an indication that no suspended or bookmarked programs are currently available. |
| 6.0 | The Guide may support an optional barker window on the Saved Programs Listings screen as specified in the On Demand data. |
| 6.1 | The Guide may remove the on-screen display of the Saved Programs Listing Screen between sets of coordinates using a scale of e.g., 1000 × 1000 screen pixels when the Saved Programs Listing Screen is displayed and the On Demand data indicates that the barker is enabled in particular positions. |
| 6.2 | The Guide may not remove the on-screen display to accommodate the barker window when the Saved Programs Listing screen is displayed and the On Demand data indicates that the barker window is not enabled or the barker window is enabled in various positions. |

TABLE 62

Illustrative Saved Programs Listing Screen Input Key
Processing Table

| No. | Key | Screen Focus | Behavior |
|---|---|---|---|
| 1.0 | Power | Any | Normal |
| 2.0 | Volume Up | Any | Normal |
| 3.0 | Volume Down | Any | Normal |
| 4.0 | Mute | Any | Normal |
| 5.0 | Channel Up | Any | Normal |
| 6.0 | Channel Down | Any | Normal |
| 7.0 | Bypass | Any | Normal |
| 8.0 | Menu | Any | Normal |
| 9.0 | Guide | Any | Normal |
| 10.0 | Music | Any | Normal |
| 11.0 | Themes | Any | Normal |
| 12.0 | Search | Any | Normal |

TABLE 62-continued

Illustrative Saved Programs Listing Screen Input Key Processing Table

| No. | Key | Screen Focus | Behavior |
|---|---|---|---|
| 13.0 | Settings | Any | Normal |
| 14.0 | Exit | Any | The Guide may return to Idle Mode and display Flip Banner. |
| 15.0 | Last | Any | Normal if the previous screen was not an On Demand video. |
| 15.1 | Last | Any | The Guide may display the top-level categories of the On Demand Main Menu and place the focus on the top-left category bar if the previous screen was an On Demand video. |
| 16.0 | Right Arrow | Any | Inactive |
| 17.0 | Left Arrow | Any | Inactive |
| 18.0 | Up Arrow | Top Listing Cell, any but First Page | The Guide may display the previous page of listings with lowest selectable listing cell highlighted. |
| 18.1 | Up Arrow | Top Listing Cell, First or Only Page | Inactive |
| 18.2 | Up Arrow | Other | Normal |
| 19.0 | Down Arrow | Bottom listing cell, any but last page | The Guide may display the next page of listings with top listing highlighted. |
| 19.1 | Down Arrow | Bottom listing cell, last page | Inactive |
| 19.2 | Down Arrow | Other | Normal |
| 20.0 | OK | Listing Cell | The Guide may display the On Demand Program Information - Not Suspended Screen for the program if the listing cell represents a bookmarked program. |
| 20.1 | OK | Listing Cell | The Guide may display the On Demand Program Information - Suspended Screen for the program if the listing cell represents a suspended program. |
| 21.0 | Digits 09 | Any | Normal |
| 22.0 | Scroll Up | Any | Normal |
| 23.0 | Scroll Down | Any | Normal |
| 24.0 | Day Forward | Any | Inactive |
| 25.0 | Day Back | Any | Inactive |
| 26.0 | Help | Any | Inactive |
| 27.0 | Info | Listing Cell | The Guide may display the On Demand Program Information - Not Suspended Screen for the program if the listing cell represents a bookmarked program. |
| 27.1 | Info | Listing Cell | The Guide may display the On Demand Program Information -Suspended Screen for the program if the listing cell represents a suspended program. |
| 28.0 | Favorite | Any | Inactive |
| 29.0 | Lock | Program Listing | Normal |
| 30.0 | Record | Any | Inactive |
| 31.0 | Stop | Any | Inactive |
| 32.0 | Pause | Any | Inactive |
| 33.0 | Play | Any | Inactive |
| 34.0 | Rewind | Any | Inactive |
| 35.0 | Fast Forward | Any | Inactive |
| 36.0 | PPV | Any | Normal |
| 37.0 | Letters AZ | Any | Inactive |
| 38.0 | VOD | Any | Inactive |
| 39.0 | Return to Live TV | Any | Normal |
| 40.0 | Skip Forward | Any | Inactive |
| 41.0 | Replay | Any | Inactive |
| 42.0 | A | Any | Inactive |
| 43.0 | B | Any | Inactive |
| 44.0 | C | Any | Inactive |
| 45.0 | Digital Recordings | Any | Normal |
| 46.0 | Swap | Any | Inactive |

TABLE 63

Illustrative Saved Programs Listings Screen
Other Event Handling Table

| No. | Event | Conditions/Comments |
|---|---|---|
| 1.0 | Screen Timeout | This screen may time out in 2 minutes to the underlying screen. |
| 2.0 | Reminder | Normal |
| 3.0 | Scheduled Recording Fires | Normal |
| 4.0 | Ordered PPV Start | Normal |
| 5.0 | PPV Purchase Window Expires | Inactive |
| 6.0 | Current Program Ends | Inactive with Barker window, Normal without Barker window |
| 7.0 | Data added, deleted or modified in database | Not Applicable |

TABLE 64

Illustrative Saved Programs Listings Screen/Mode Entry Table

| No. | Functionality | Description |
|---|---|---|
| 1.0 | Guide Initialization | The Saved Programs Listing Screen may be immediately available after startup. |
| 2.0 | Highlight | The default highlight may be the first listing on the page. |
| 2.1 | Highlight | The highlight position may not be remembered when this screen is exited |
| 3.0 | Display Inclusion Criteria | Refer to the system and general description above. |
| 4.0 | Sorting/Grouping Criteria | The items on the screen may be displayed in the order received from VOD server 26. |
| 5.0 | Customization | Refer to Table 61. |

TABLE 65

Illustrative Saved Programs Listings Screen Formatting

| No. | Functionality | Description |
|---|---|---|
| 1.0 | Program Title | The label of each listing on the Saved Programs Listing Screen may be the short title of the video as returned by the VOD Server 26 unless the video is rated Adult and the Hide Adult Titles option is enabled in the Parental Control Setup. |
| 1.1 | Program Title | The label of a listing cell on the Saved Programs Listing Screen may be "Adult Programming" in the user-selected language if the rating of the video is Adult and the user has enabled the Hide Adult Titles option in the Parental Control Setup. |
| 2.0 | Time | Normal |
| 3.0 | Channel | Not Applicable |
| 4.0 | Other Text | Not Applicable |
| 5.0 | Colors | The color of the listing cells may be blue. |
| 6.0 | Indicators | Program Indicators may be displayed as applicable, right justified within the instant information area in the following order of priority (displayed left to right): Lock/Un-Lock Closed Caption HDTV Dolby Digital Audio Wide Screen TV Rating/Movie Rating Purchase or Checkmark Indicator Bookmarked In a Playlist If the full title and all active indicators do not fit within the Instant Information area, then one or more of the lowest priority indicators may be omitted as necessary. |
| 6.1 | Indicators | The icon associated with the menu option used to access the Saved Programs Listing screen may be displayed to the left of the screen title in the saved program listing area header. |
| 6.2 | Indicators | An up or down arrow icon may be displayed to indicate the availability of additional pages of listings. |
| 7.0 | Branding | The On Demand brand provided by the system may be displayed left-justified within the screen header area. |
| 8.0 | Audio | If a video barker is provided, the audio may correspond to that barker. |
| 8.1 | Audio | If no video barker window is displayed, the audio may be normal. |
| 9.0 | LEDs | The Guide may display the last user channel or current time on the LED according to the description provided in the Appendix for time/channel display on the LED. |

Figure 25:
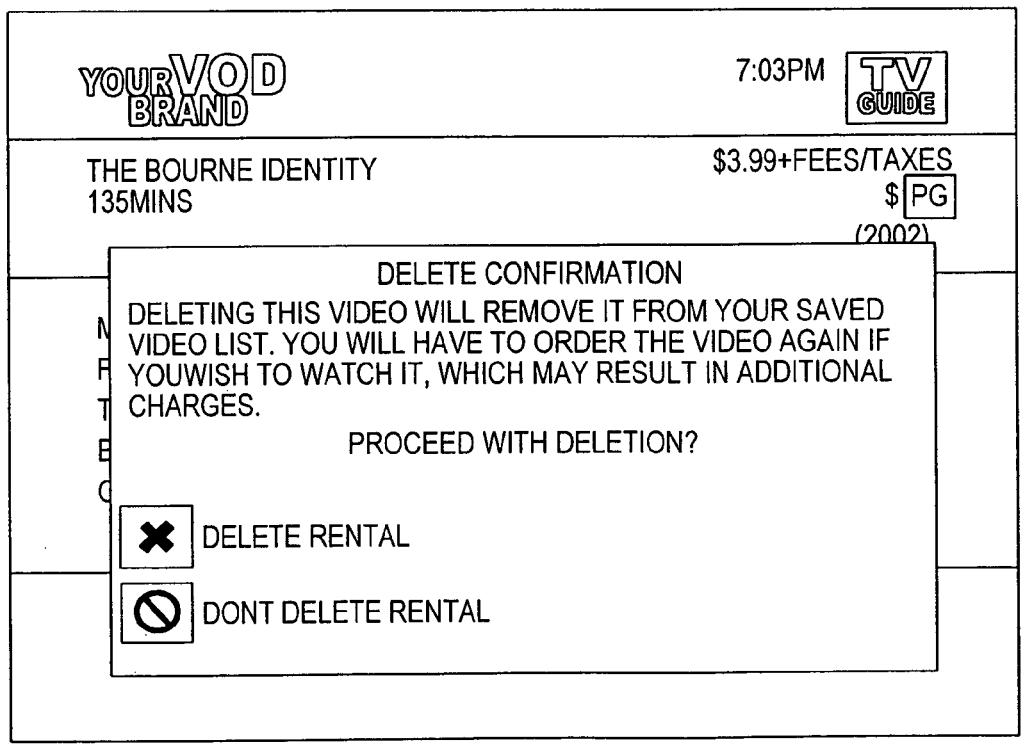
FIG. 25 shows an illustrative delete video confirmation overlay in accordance with an embodiment of the invention.

When the viewer elects to delete a video from the Saved Programs Listing Screen, the Guide may display a confirmation overlay explaining the operation that they are about to perform and requesting confirmation before proceeding. FIG. 25 shows an illustrative Delete Video Confirmation Overlay. Table 66 describes illustrative behaviors of the IPG and/or VOD server 26 in connection with providing such an overlay.

For the purposes of the Delete Confirmation Overlay the "Delete Rental" option is also referred to as the "YES" option and the "Don't Delete Rental" option is also referred to as the "NO" option.

TABLE 66

Illustrative Delete a Video Confirmation Overlay

| No. | Description |
|---|---|
| 1.0 | The Guide may display the Delete a Video Confirmation Overlay when the user selects the Delete option from a Rented Video Information screen. |
| 1.1 | The Guide may display the title, "DELETE CONFIRMATION" in yellow text on the Delete a Video Confirmation Overlay in the language specified by the viewer in the guide setup. |
| 1.2 | The Guide may display the instruction text, "Deleting this video will remove it from your saved video list. You will have to order the video again if you wish to watch it, which may result in additional charges Proceed with deletion?" In white text on the Delete a Video Confirmation Overlay in the language specified by the viewer in the guide setup. |
| 1.3 | The Delete Rental (Yes) button may be displayed on the Delete a Video Confirmation Overlay by the Guide with the label "Delete Rental" in the language specified by the viewer through the guide setup. |

TABLE 66-continued

Illustrative Delete a Video Confirmation Overlay

| No. | Description |
|---|---|
| 1.4 | The Don't Delete Rental (No) button may be displayed on the Delete a Video Confirmation Overlay by the Guide with the label "Don't Delete Rental" in the language specified by the viewer through the guide setup. |
| 2.0 | The default highlight may be the Don't Delete Rental (No) option. |
| 3.0 | If the user selects the Yes button, the Guide may send a request to the VOD Server 26 to delete the video, remove the Delete a Video Confirmation Overlay, query the VOD Server 26 for the current saved programs, and display the Saved Programs Listing Screen with the current saved programs returned by the server and the top listing bar highlighted. |
| 4.0 | If the user selects the No button, the Guide may remove the Delete a Video Confirmation Overlay and highlight the Delete button. |
| 5.0 | Except as specified in this section, this confirmation screen may follow the description provided in the Common Confirmation Overlay section of the Appendix. |
| 6.0 | If the user pressed the Info key while this overlay is displayed, the Guide may remove the Delete a Video Confirmation Overlay and highlight the Delete button. |

Section IV. Illustrative Playlist Transport Bar

A playlist transport bar according to the invention provides an overlay which graphically represents assets of a playlist in a manner that enables a user to easily ascertain a playback position within the playlist and within a particular asset.

A playlist transport bar may be displayed in response to any number of different user inputs. For example, a user input device may have a playlist transport bar button which causes the playlist transport bar to be displayed when pressed. The transport bar may be removed when the button is pressed again. The playlist transport bar may be displayed when the user issues a stop, pause, fast-forward, rewind, play, resume, or any other command that affects playback of an asset. For example, the playlist transport bar may be displayed for a predetermined period of time in response to a pause or stop command. After the predetermined period of time expires, the interactive media application may substitute other content in place of the pause or stopped media to prevent screen burn-in. As another example, the playlist transport bar may be displayed while the user is issuing a fast-forward or rewind command. When the user resumes playback of assets in the playlist, the playlist transport toolbar may be displayed for a predetermined period of time before it is removed from the screen. In yet another example, the playlist transport bar may be displayed when the user is navigating among various elements of the transport bar (discussed below in more detail in connection with FIGS. 32-36).

Figure 26:
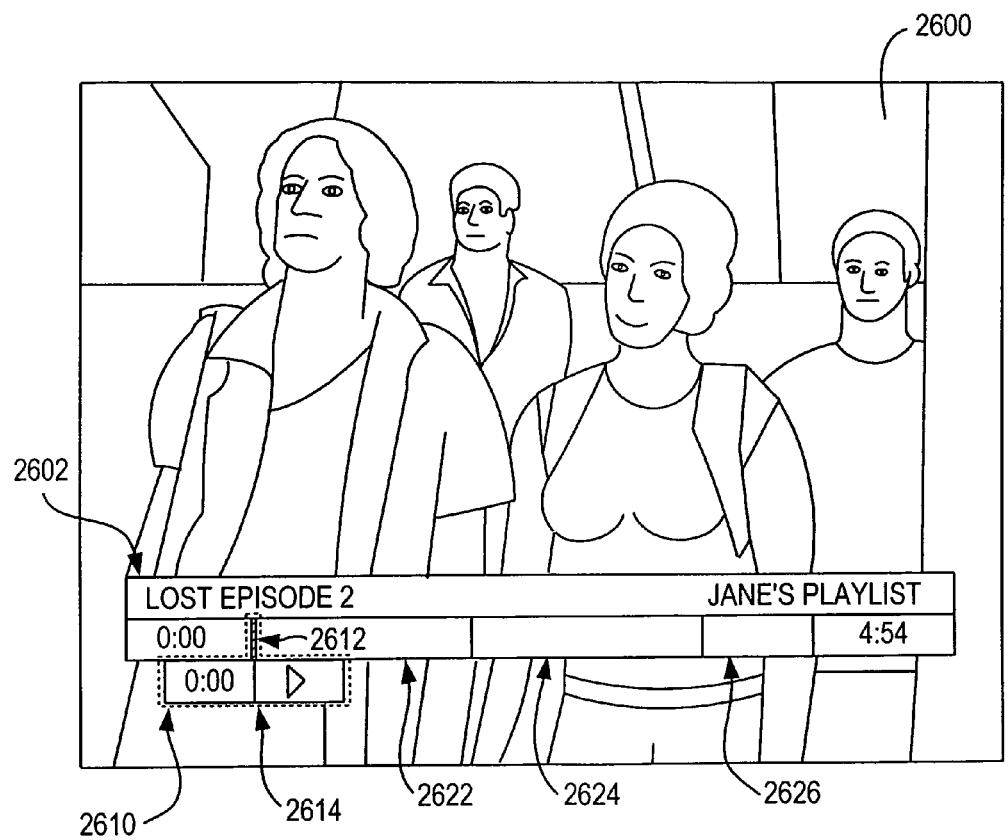
FIG. 26 shows an illustrative transport bar for playing back programs in accordance with an embodiment of the invention.
Figure 27:
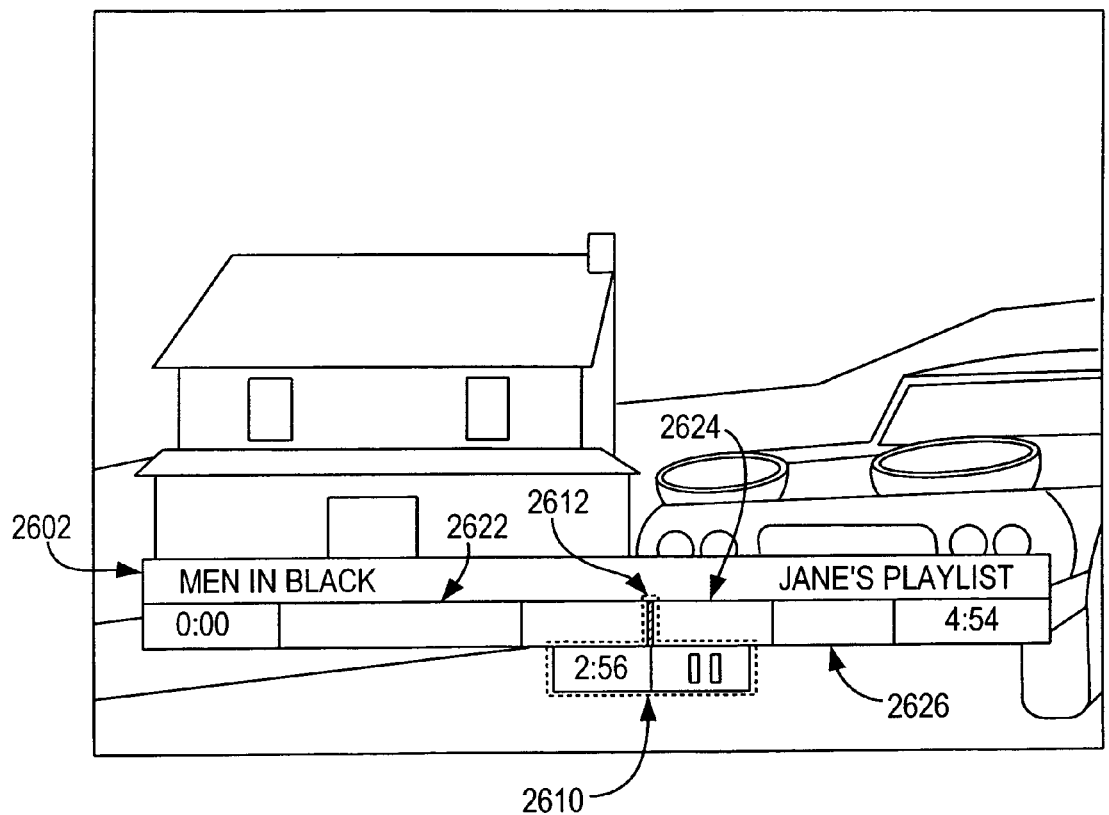
FIG. 27 shows an alternative illustrative transport bar for playing back programs in accordance with an embodiment of the invention.

FIGS. 26 and 27 show illustrative transport bars for playing back assets of a playlist. FIG. 26 shows an illustrative transport bar 2602 that the interactive television application (e.g., IPG) may display on screen 2600 when the user begins playing back a program from a playlist (such as by, for example, selecting the resume or restart icons of FIGS. 6-9).

FIG. 27 shows an illustrative playlist transport bar that may be displayed when a user pauses playback in accordance with an embodiment of the invention. In some embodiments, users may stop playback, which may result in having an illustrative playlist transport bar be displayed. In other embodiments, the interactive television application may stop playback automatically after the playlist has been paused for a period of time. Users may resume playback of a paused or stopped program by, for example, selecting the resume icon of FIGS. 6-9 or by pressing a play button on a remote device.

Playlist transport bar 2602 may display information such as the title of the currently playing program (shown here as Lost, Episode 2), the name of the playlist (shown here as Jane's Playlist), and the total amount of time of programming in the entire playlist (shown here as 4:54). Playlist transport bar 2602 may include position indication region 2610 and asset regions 2622, 2624, and 2626.

Position indication region 2610 may provide a visual indicator of the playback position and may include position needle 2612 and information region 2614. Position needle 2612 may be a graphical object (e.g., a vertical bar) overlaying a portion of one of the asset regions. As shown in FIG. 26, position needle 2612 is at the beginning of asset region 2622, and in this particular embodiment, is also shown at the beginning of the playlist. As a particular asset is played back, position indication region 2610 may advance, from left-to-right, through the asset region corresponding to that asset, and as multiple assets are played back from the playlist, position indication region 2610 may advance through one asset region and then advance through the next.

Information region 2614 may display time information indicating, for example, how much time has elapsed in a currently playing asset, how much playback time is remaining in the currently playing asset, how much time has elapsed in playback of the playlist, how much playback time is remaining in the playlist, or any combination thereof. Note that the elapsed time is meant to represent the time it takes for normal speed, uninterrupted, playback of assets in the playlist. Thus, if a user fast-forwards through or skips an asset, the time displayed in information region 2614 is indicative of the time it would have taken to reach the new playback position at a normal uninterrupted speed. However, it will be appreciated that, in an alternative embodiment to the foregoing, the actual time spent accessing (e.g., viewing) assets in the playlist may be displayed. Information region 2614 also includes the playback action indicator, shown here as a play indicator. The playback action indicator may change to a pause indicator while the playback of the playlist is paused, to a reverse play indicator while the playlist is being played in the reverse direction, to a fast-forward indicator while the playlist is being fast-forwarded, and to a rewind indicator while the playlist is being rewound. If desired, different indicators may be used for different speeds of play, reverse play, rewind, and fast-forward.

As playback of an asset progresses, both position needle 2612 and information region 2614 may move concomitantly. This is illustrated in FIG. 27 in which both position needle 2712 and information region 2714 are shown connected together even though two hours and fifty-six minutes of programming has played back. It will be appreciated that in other embodiments the information region may remain in a fixed location (e.g., the far left-hand side of the transport bar), while the position needle advances in connection with playback of the programming in the playlist. In other embodiments, the position needle and information region may remain stationary, while the asset regions move to the left as playback progresses.

Referring now back to FIG. 26, each of asset regions 2622, 2624, and 2626 may correspond to an asset (e.g., program) in a playlist (e.g., Jane's Playlist). For example, asset region 2622 may correspond to a first asset (e.g., Lost, Episode 2, which is shown being played back on screen 2600) in the playlist. Asset region 2624 may correspond to the next asset (e.g., Men In Black) in the playlist to be played back, and asset region 2626 may correspond to the asset following the asset corresponding to asset region 2624.

A number of different approaches may be taken with respect to the display of the asset regions. The asset regions may be displayed in a rectangular fashion, where the regions are attached end-to-end, and where the regions are clearly delineated to clearly indicate where one asset region ends and another begins. Moreover, the regions may exhibit certain attributes (e.g., colors or highlighting) to further distinguish one region from another. For example, the region currently being played back may be colored different than the other regions. As another example, the regions may be colored to represent the theme or genre of the asset. It is understood that many various ways of presenting the regions may be implemented and that such presentation techniques are largely a matter of design choice. Therefore, various display techniques (e.g., asset region shapes, coloring, and highlighting, etc.) not specifically mentioned herein may be applied to the playlist transport bar.

FIG. 26 is merely an illustrative of such a display screen including a playlist transport control bar. Other suitable arrangements may be used. For example, information such as asset title, channel, any other suitable programming-related information, advertisements, logos, or any combination thereof may be displayed within or in association with the playlist transport bar.

Figure 28:
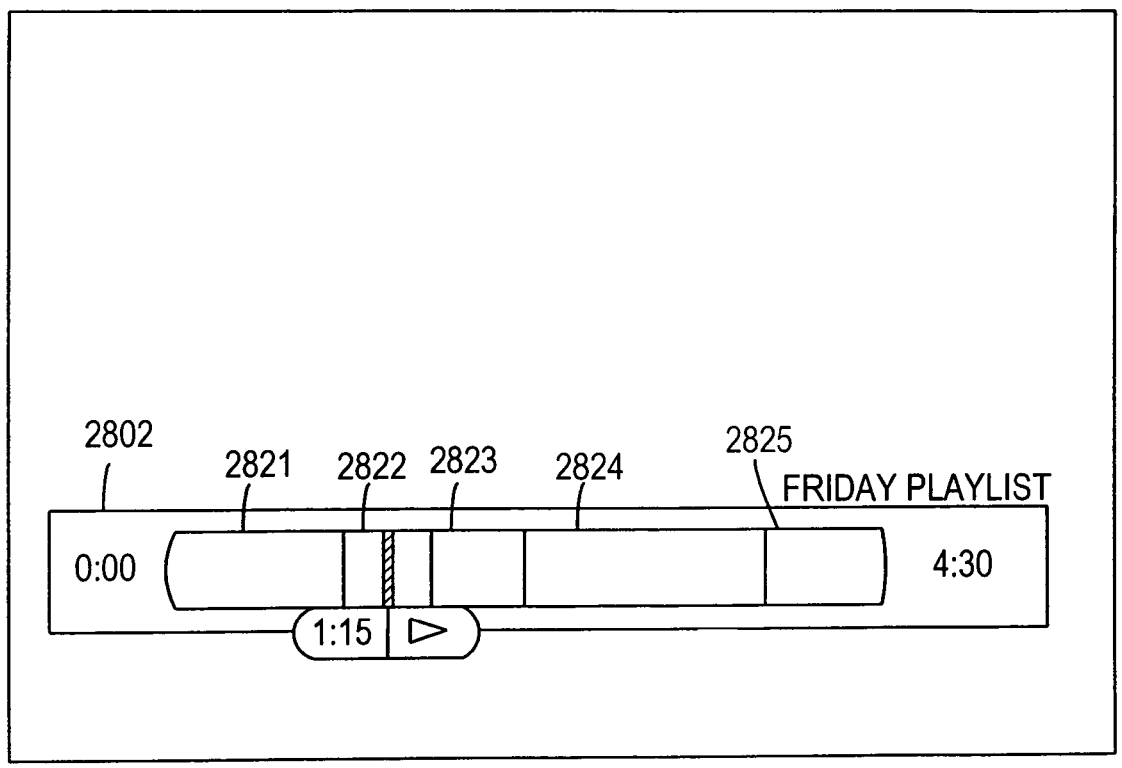
FIG. 28 shows an illustrative playlist transport bar that displays a region for each asset in the playlist in accordance with an embodiment of the invention.

Any number of different approaches may be practiced in determining the number of asset regions displayed in the playlist transport bar at a given time and the space occupied by each displayed asset region. FIG. 28 shows an illustrative playlist transport bar 2802 that displays an asset region for each asset in the playlist. This approach ensures that playlist transport bar 2802 includes regions representative of the entire playlist. Thus, when a user views playlist transport bar 2802, the user can quickly determine how far along he is in the playback of the playlist.

If the playlist includes, for example, five assets, the playlist transport bar displays five asset regions corresponding to those five assets. The interactive media guidance application may allocate an appropriate size for each asset region, while optionally taking into account factors such as the run-length of each asset, in order to simultaneously display regions for each asset in the playlist. As shown, playlist transport bar 2802 includes five regions, regions 2821, 2822, 2823, 2824, and 2825, each of which are apportioned space based on their relative lengths. For example, asset regions 2822, 2823, and 2825 may represent half-hour shows, asset region 2821 may represent an hour show, and region 2824 may represent a two-hour show.

Figure 29:
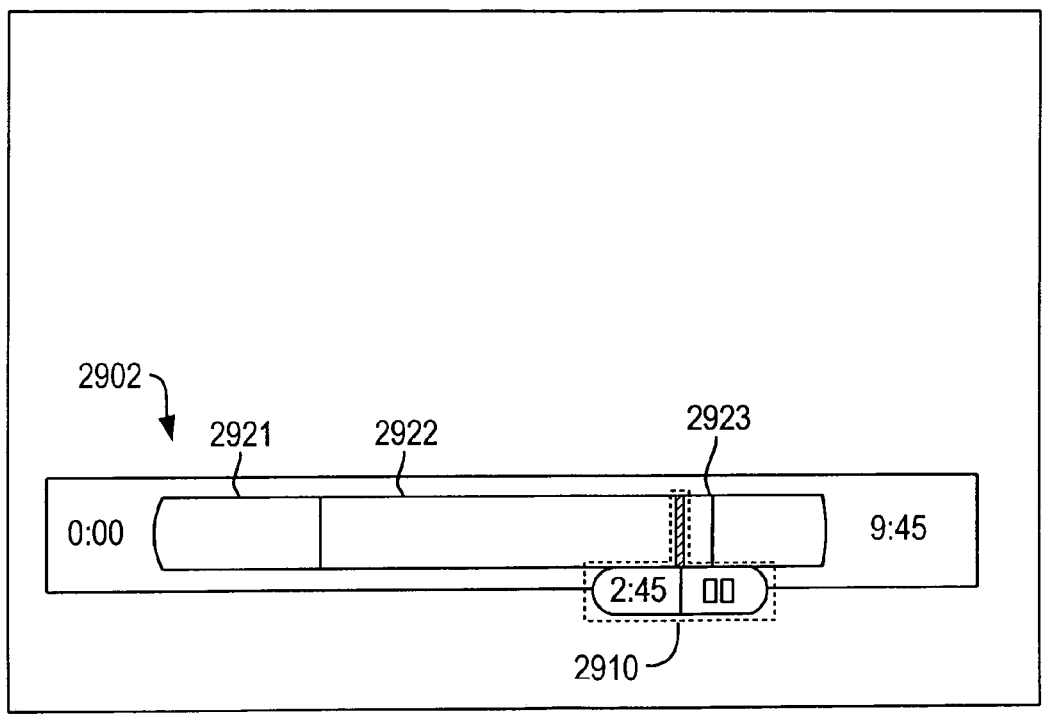
FIG. 29 shows an illustrative playlist transport bar in which the number of regions displayed are limited in number in accordance with an embodiment of the invention.

FIG. 29 shows an illustrative playlist transport bar 2902 in which the number of regions displayed are limited in number so as to not saturate transport bar 2902 with regions corresponding to all the potential assets of a playlist, thereby potentially making it difficult for users to quickly and easily differentiate different regions. In this approach a relatively small number of regions (e.g., 2-6) may be displayed in the playlist transport bar. This way, if the playlist includes a large number of assets, playlist transport bar 2902 may display just a few regions such as, for example, the regions centered around the region currently being played back.

Moreover, by limiting the number of regions displayed in playlist transport bar 2902 at any given time, this allows the interactive media guidance application to allocate an appropriate predetermined minimum amount of space to each displayed region. In FIG. 29, playlist transport bar 2902 corresponds to a playlist having nine hours and forty-five minutes of programming, but is only able to display, for example, four hours of programming at any given time. For example, regions 2921 and 2923 may represent hour long programs and region 2922 may represent a two hour long program. As can be seen, the spacing allotted to each region accurately reflects the length of a particular asset with respect to the other shown assets. That is, region 2922 (a two hour asset) occupies approximately twice the space as region 2921 (an hour long asset).

Figure 30:
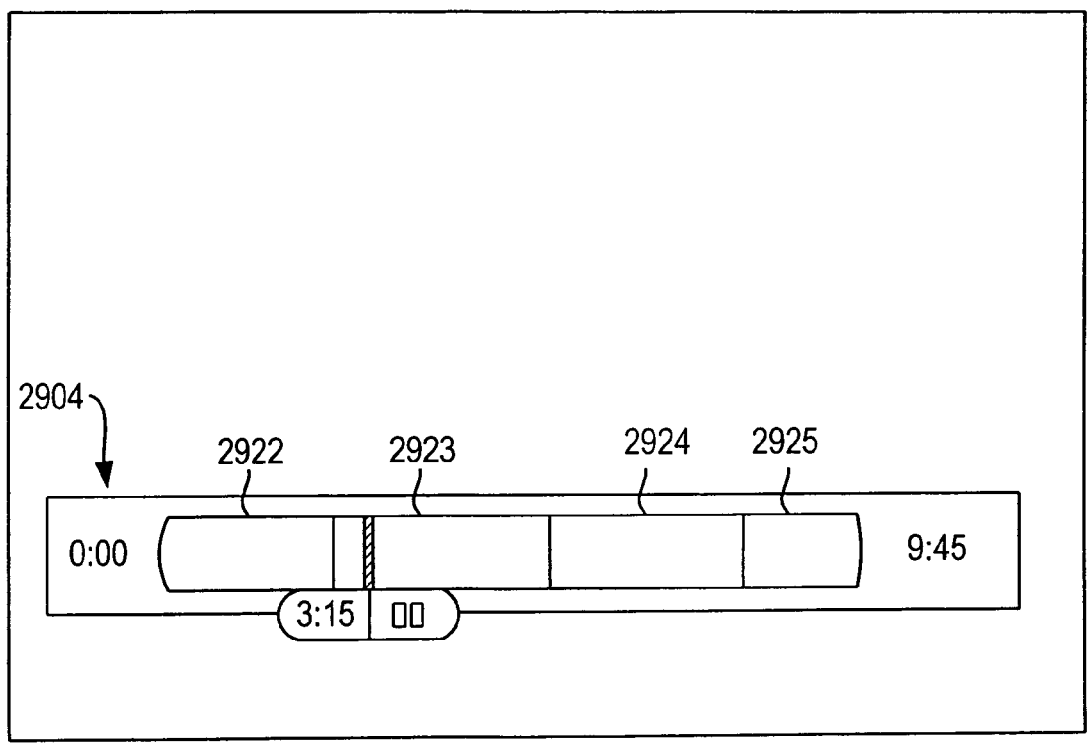
FIG. 30 shows an example of the playlist transport bar of FIG. 29 in accordance with an embodiment of the invention.

The interactive media guidance application may position the currently played back region 2922 in the center of playlist transport bar and place other regions or portions thereof on either side of the currently played region. In FIG. 29, position indication region 2910 is positioned at region 2922, indicating that the asset corresponding to region 2922 is being played back. Because region 2922 is the current region, region 2921 may be placed before it, and region 2923 may be placed after it. When position indication region 2910 advances to region 2923, the interactive media guidance application may position region 2923 in the center of playlist transport bar 2902, resulting in playlist transport bar 2904 of FIG. 30. FIG. 30 shows region 2923 positioned near the center, with a portion of region 2922 located left of region 2923 and regions 2924 and 2925 located right of region 2923. As shown with region 2922, a region at the start or end of the display may be truncated, showing only a portion of its allocated length. In some embodiments, a truncated asset region may be displayed differently than a whole asset region, for example with a ragged edge or an arrowhead-shaped end.

As an alternative to the embodiment discussed in connection with FIGS. 29 and 30, the playlist transport bar may only be able to display up to a predetermined number of hours of programming. Thus, if the number of hours of programming in the playlist exceeds the number of hours that can be displayed at any given time, the playlist transport bar may display only regions or portions thereof totaling the number of hours that can be displayed at any give time. In embodiments in which the entire playlist length is not shown on screen, an indicator may be shown at the start and/or end of the playlist transport bar to inform the user that additional assets are available. For example, an arrow or an ellipsis may be used to indicate additional assets prior to or subsequent to the displayed asset regions.

Figure 31:
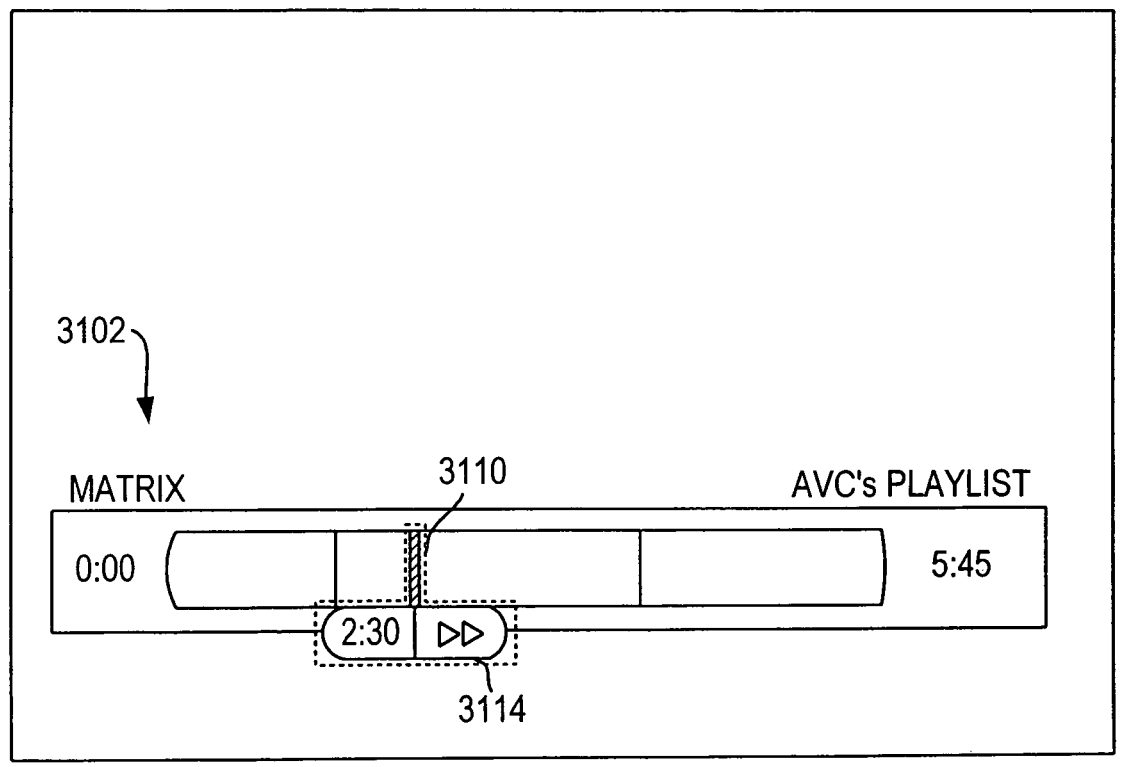
FIG. 31 shows a playlist transport toolbar that may be displayed when the user is implementing a command that affects playback of an asset in the playlist in accordance with an embodiment of the invention.

FIG. 31 shows a playlist transport bar 3102 that may be displayed when the interactive media guidance application executes a command that affects playback of an asset in the playlist such as fast-forward, rewind, skip asset, replay asset, or any other function which may or may not be directly supported by a remote device (e.g., remote control). For example, when a user initiates a fast-forward command through an asset, playlist transport toolbar 3102 may be displayed for at least the duration of the fast-forward. While fast-forwarding, position indication region 3110 may be shown rapidly progressing from left-to-right and the time displayed in information region 3114 may be shown elapsing at a fast-forwarded pace. In addition, information region 3114 may display a conventional fast-forward symbol to signify to the user that a fast forward command is being implemented. It will be appreciated that information region 3114 may indicate a current action status (e.g., play, rewind, fast-forward, pause, or any other suitable mode) in the form of an icon, as illustrated in FIG. 31, text, or any other suitable form.

Figure 32:
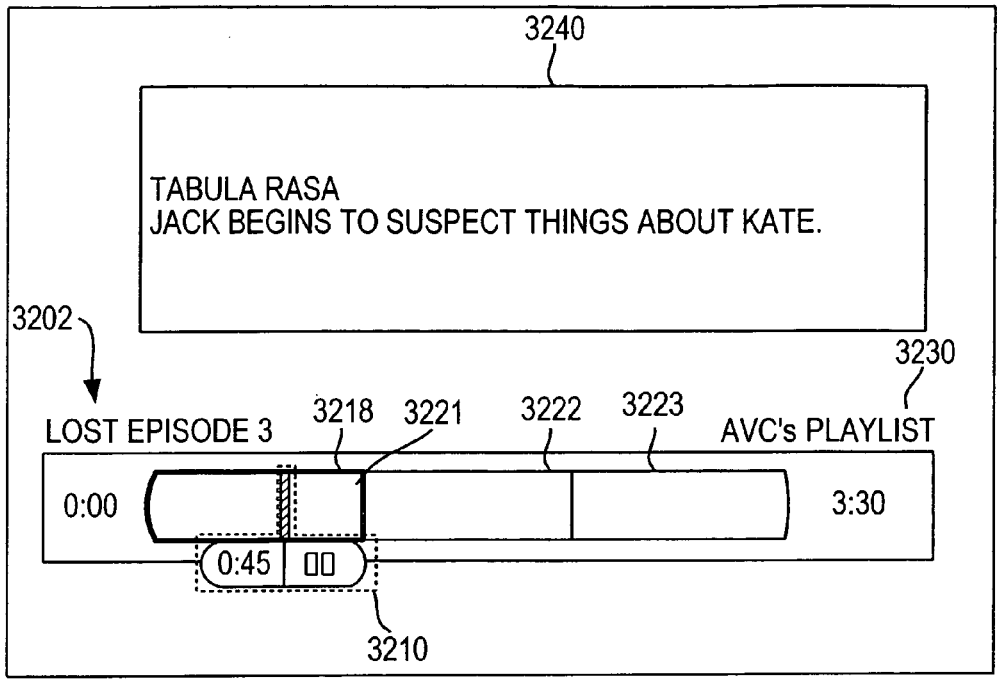
FIGS. 32, 33, 34A-B, 35A-B, and 36 show several illustrative playlist transport bars in which a user may navigate a highlight region within the playlist transport bar, and, if desired, cause a particular action to occur in accordance with embodiments of the invention.

FIGS. 32, 33, 34A-B, 35A-B, and 36 show several illustrative playlist transport bars in which a user may navigate a highlight region within the playlist transport bar, and, if desired, cause a particular action to occur in accordance with embodiments of the invention. Referring now to FIG. 32, the user may navigate a highlight region 3218 (currently highlighting asset region 3221) to various elements of transport bar 3202. For example, a user may navigate highlight region 3218 to any one of asset regions 3221, 3222, 3223, or, in some embodiments (such as an embodiment in which a limited number of regions can be displayed), to regions not currently displayed. The user may navigate highlight region 3218 to position indication region 3210 or playlist name 3230. The interactive media guidance application may execute a predetermined function in response to a user navigating an element in the playlist transport bar or user selection of a highlighted element. For example, the interactive media guidance application may display an information overlay 3240 containing information related to the asset corresponding to asset region 3221 when the user highlights asset region 3221. If the user highlights an asset region and selects the asset, for example by pressing a Select key on the remote control, the interactive media guidance application may immediate commence playback of the selected asset.

Figure 33:
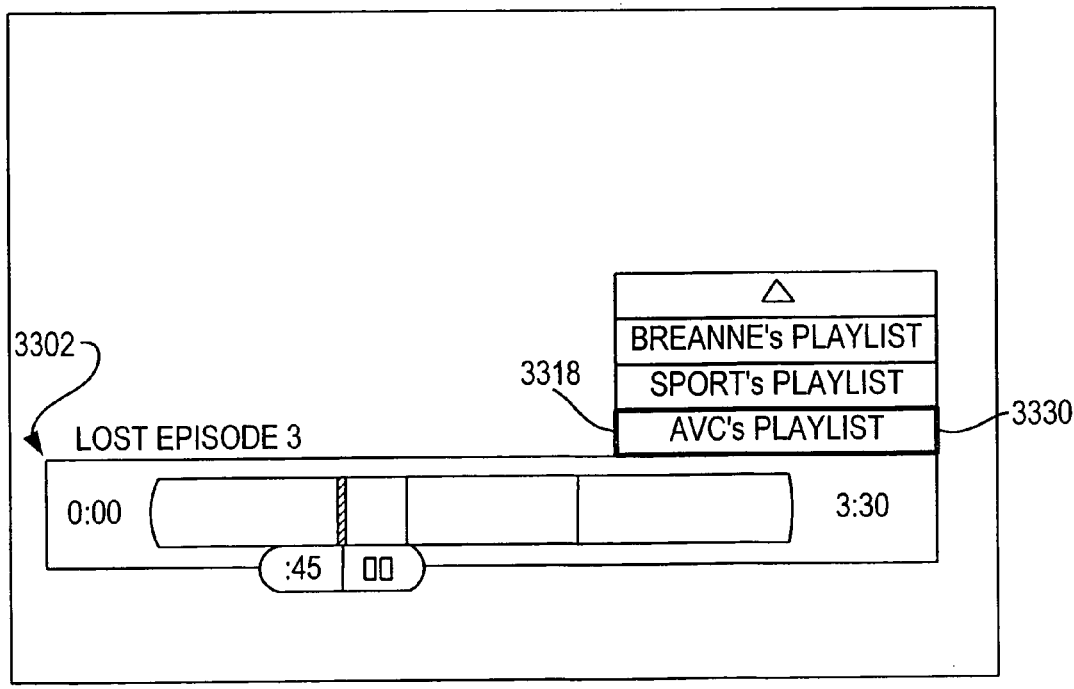

FIG. 33 shows an illustrative playlist transport bar 3302 in which a highlight region 3318 has been navigated to playlist name 3330. As shown in FIG. 33, after the user navigates a highlight region to or selects playlist name 3330, several names of playlists may be displayed. These playlists may include playlists previously created by a user or playlists provided by a system operator. Displaying the available playlists gives the user the option to load in a different playlist by navigating to and selecting a particular playlists. When a new playlist is selected, the user may be prompted with a confirmation screen, and upon confirmation, the interactive media guidance application may commence playback of the selected playlist and display a playlist transport bar tailored to the selected playlist.

Figure 34A:
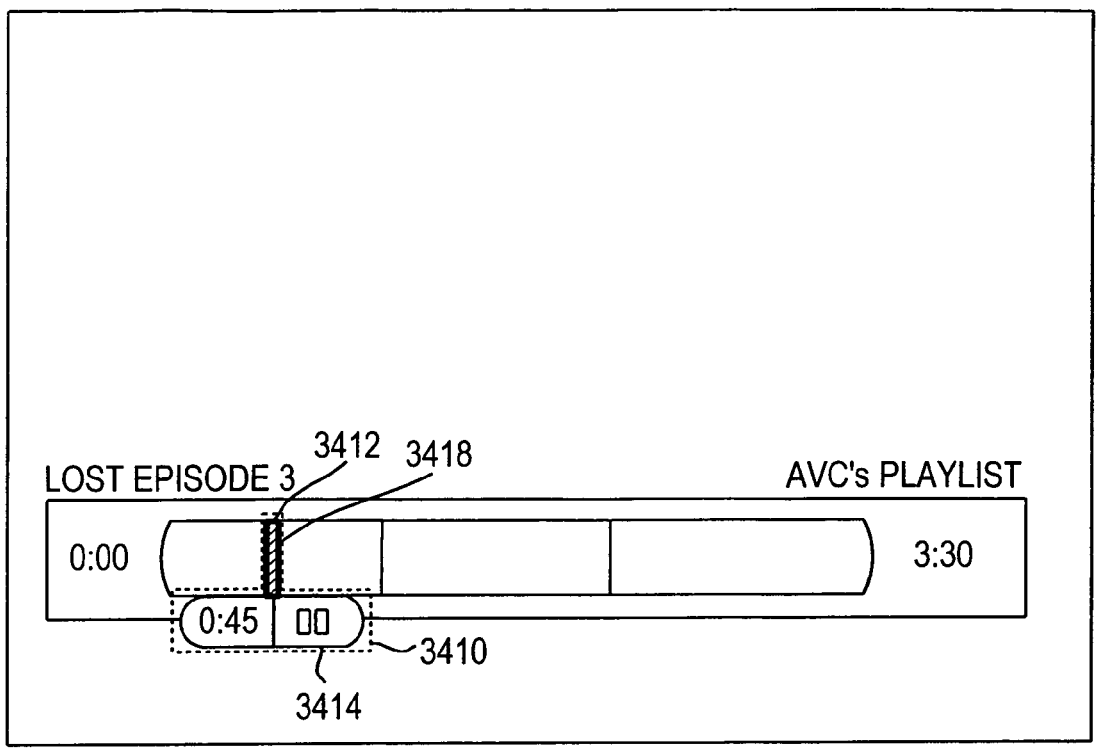
Figure 34B:
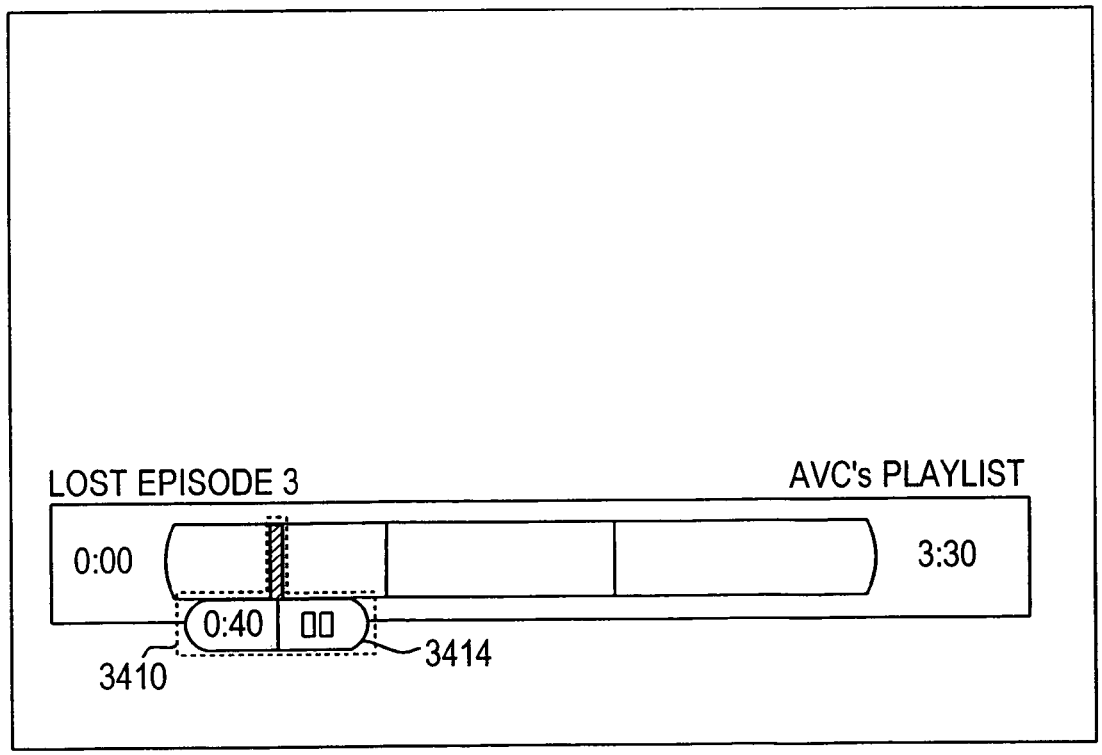

FIGS. 34A-B show before and after screen shots, respectively, illustrating how a user may manually drag and drop a position indication region to any desired location in accordance with an embodiment of the invention. FIG. 34A shows position needle 3412 highlighted with highlight region 3418. Note that information region 3414 specifies a time of forty-five minutes. When the user selects the highlighted position needle, the interactive television program guide may enter a "drag and place mode" that permits the user to manually move position indication region 3410 to another location (e.g., another region) using, for example, pressing buttons (e.g., left and right cursor buttons) on a remote device. FIG. 34B shows that the user moved position indication region 3410 back five minutes (as indicated by information region 3414) with respect to the location of position indication region 3410 in FIG. 34A.

When the user has placed position indication region 3410 in a desired location, the user may exit the drag and place mode in any number of different ways. For example, the user may deselect position indication region 3410 by pressing a particular button (e.g., an exit button or a play button or a select button) or by navigating away from position indication region 3410. Note that as position indication region 3402 is moved, the time information may change accordingly, and the displayed name of assets in playlist may change as needle position 3412 is positioned at different regions. When the new playback position is selected, the interactive media guidance application may commence playback at the newly selection asset and time.

Figure 35A:
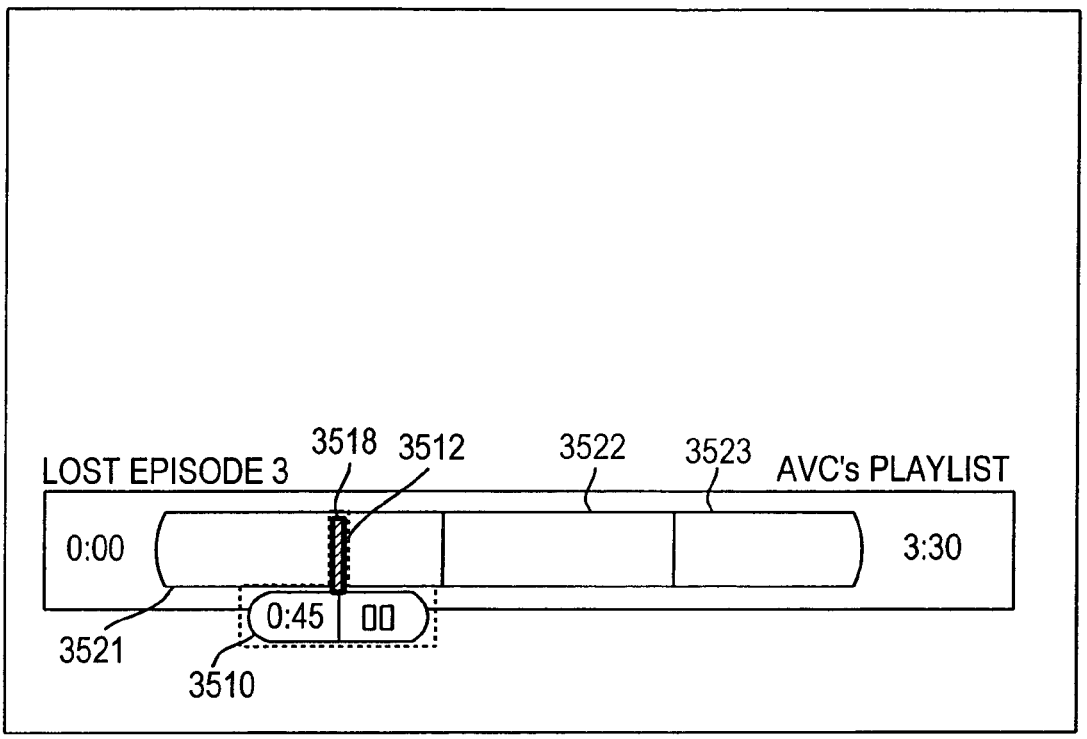
Figure 35B:
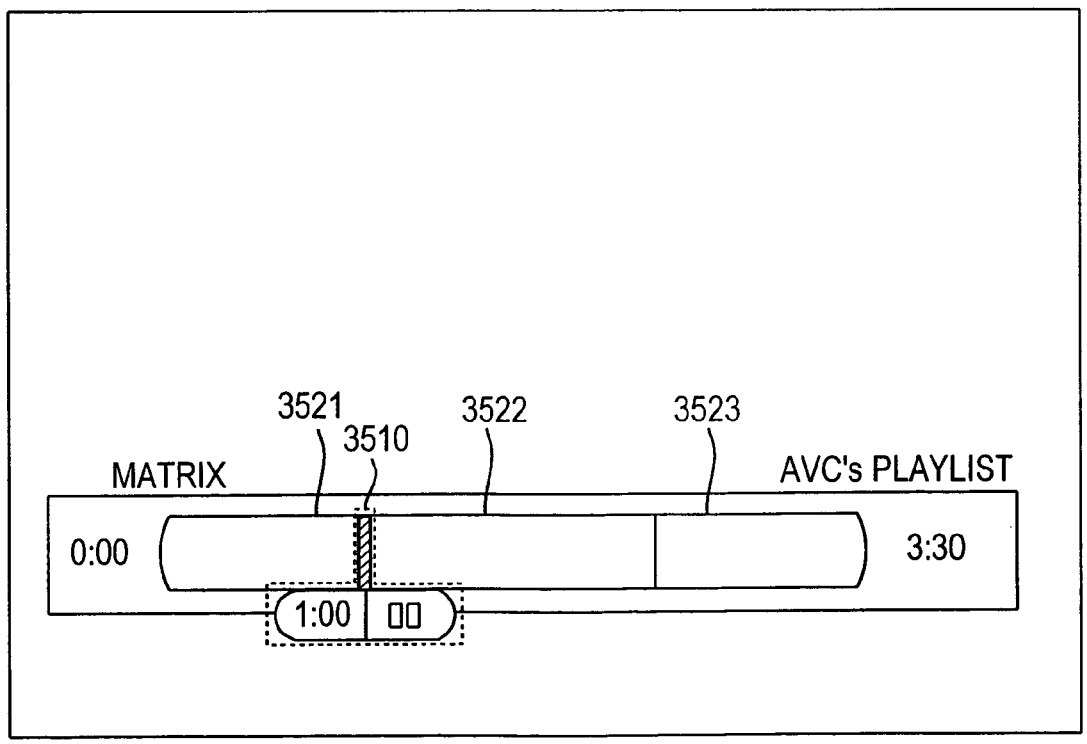

FIGS. 35A-B show before and after screen shots, respectively, illustrating how a user may use a "skip to next region" function to move the location of position indication region 3510 in accordance with an embodiment of the invention. The "skip to next region" function may advance position indication region 3510 to the beginning of an adjacent asset region. The skip to next region function may be invoked when position needle 3512 is selected, as shown in FIG. 35A. When the user presses a button (e.g., up/down arrow buttons, next/previous page buttons, or dedicated next/previous buttons) on a remote device, position indication region may skip to the next region.

FIG. 35B illustrates the result of the skip function when the user presses, for example, a right arrow button once. As shown, position indication region skips from region 3521 to the beginning of region 3522. If the user presses the right arrow button again, position indication region may skip to the beginning of region 3523.

If the user presses the left arrow button, position indication region 3510 may either advance to the beginning of the region in which position indication region 3510 is currently overlaying or to the beginning of the region adjacent to the region in which position indication region 3510 is currently overlaying. As an alternative embodiment, position indication region 3510 may advance to the beginning of a previous region only if position indication region 3510 is at the beginning of the region it is currently positioned at.

Figure 36:
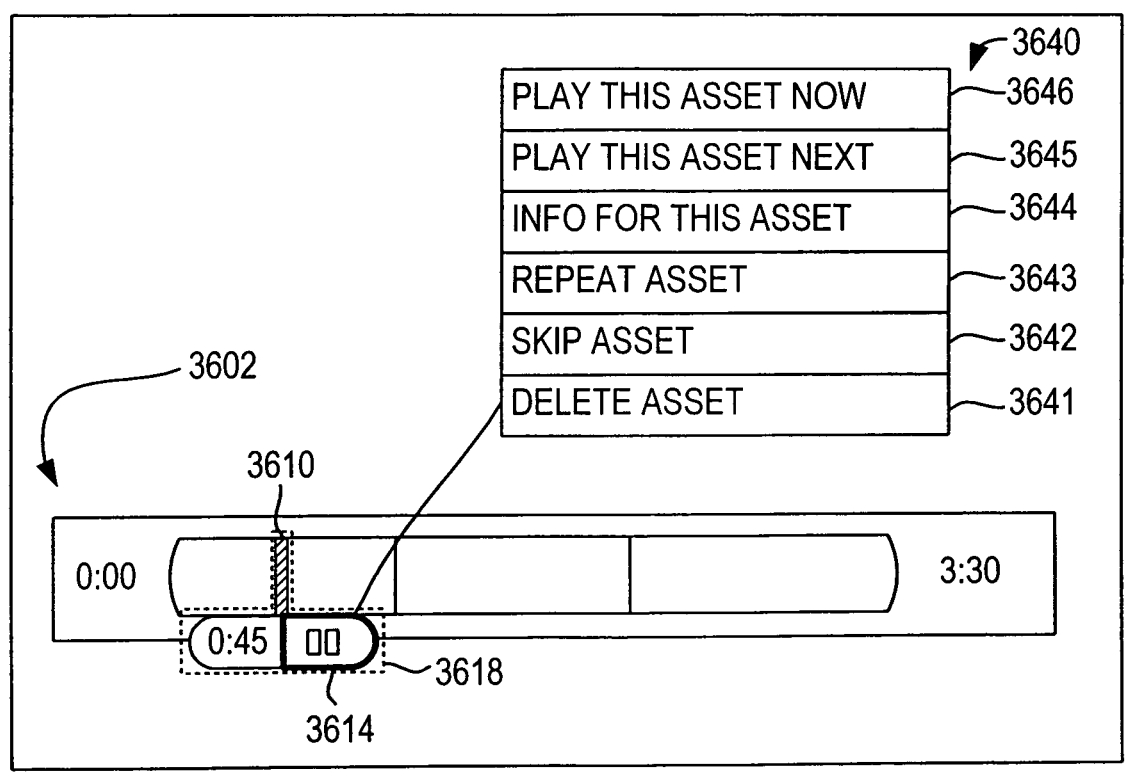

FIG. 36 shows an illustrative screen shot of playlist transport bar 3602 that may be displayed when a user navigates a highlight region to, for example, information region 3614 in accordance with an embodiment of the present invention. As shown, when information region 3614 is highlighted with highlight region 3618, playlist options menu 3640 may be displayed. Playlist options menu 3640 may provide a user with an opportunity to execute one of many different functions with respect to the asset associated with the region currently indicated by position indication region 3610, or with respect to the current position in that asset. The user may execute one of these functions by navigating highlight region to a desired function and select a pre-determined button on a remote device.

The functions included in playlist options menu 3640 may provide added flexibility in manipulating playback of assets in the playlist, to edit the playlist, or to access information on various assets in the playlist. For example, a user may select delete asset 3641 to delete an asset from the playlist, select skip asset 3642 to skip playback of the asset, select repeat asset 3643 to repeat play of the asset, or select information for this asset 3644 to view additional information on the asset. In addition, play this asset next 3645 may be selected to have this asset play next, regardless of the order it appears in the playlist. Selection of play this asset 3645 may result in a re-ordering of the playlist. Furthermore, play this asset now 3646 may be selected to cause this asset to begin substantially immediate playback. Note that the functions included in playlist options menu 3640 are largely a matter of design choice and are not limited to the specific examples discussed herein.

More detailed information and additional examples of functions that may be included in a playlist options menu may be found in co-pending U.S. patent application Ser. No. 11/324,191, filed Dec. 29, 2005, the disclosure of which is hereby incorporated by reference herein in its entirety. Examples of other functions that may be accessed from such a menu include setting a mark at the current location in the current asset that can be jumped to easily at a later time, jumping to a previously selected marked location; selecting a specific asset to begin playing, selecting a specific playback offset in the current asset at which to begin playback, and jumping forward or backwards in the playlist by a user-specified number of seconds or minutes.

Note, playlist options menu 3640 may be displayed or accessed in ways other than that mentioned herein. For example, a remote device may include a button which when pressed may cause playlist options menu 3640 to be displayed, regardless of whether a highlight region has been navigated to information region 3614. In another approach, playlist options menu 3640 may be displayed only after the user selects highlighted information region 3614 using, for example a remote device.

Figure 37:
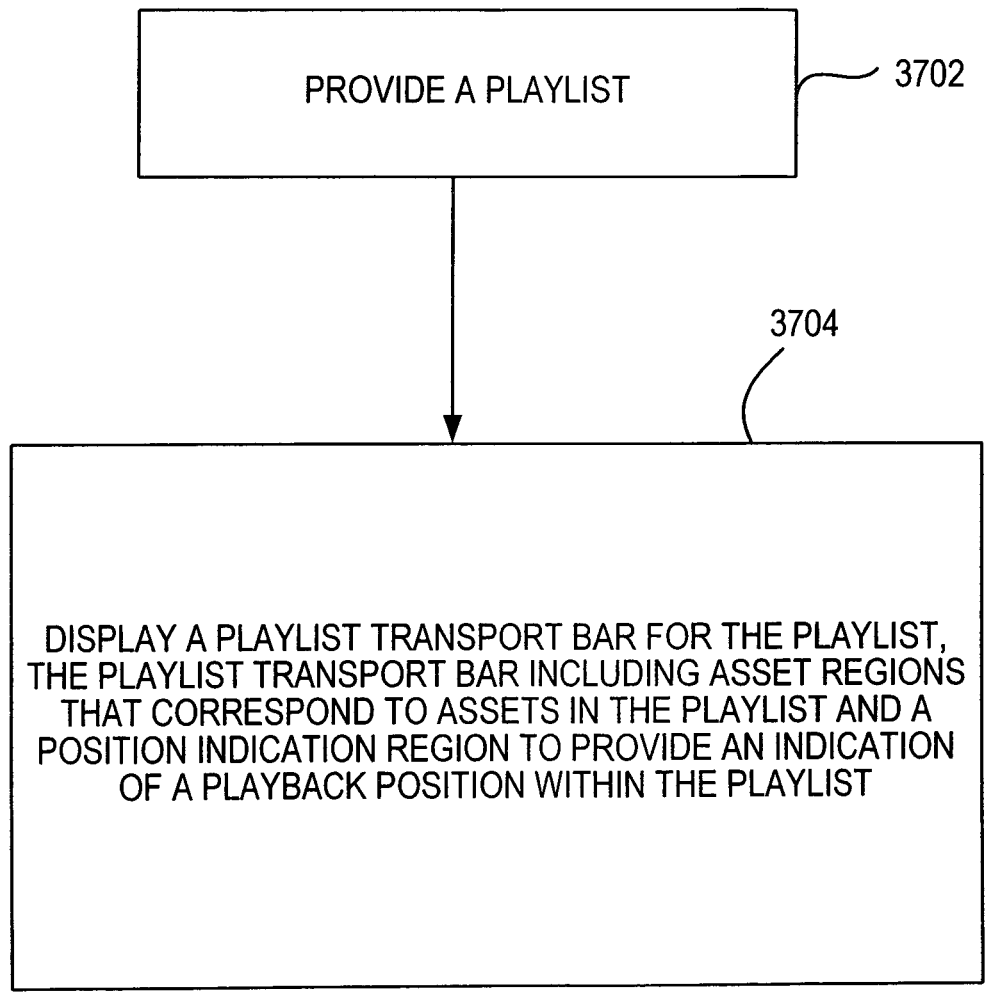
FIG. 37 shows a flowchart of illustrative steps in displaying a playlist transport bar in accordance with an embodiment of the invention.

FIG. 37 is a flow chart illustrating the display of a playlist transport bar in accordance with an embodiment of the invention. Beginning at step 3702, a playlist is provided. This playlist may be one of many playlists available which the interactive media guidance application may use for displaying a playlist transport bar according to the invention. At step 3704, the interactive media guidance application may display a playlist transport bar for the playlist. The playlist transport bar may include asset regions that correspond to assets in the playlist and a position indication region to provide an indication of a playback position within the playlist. When the playlist transport bar is displayed, several different actions may be taken. For example, the position indication region may be moved (e.g., manually by a user) to a new position in the playlist transport bar. Another example action may include navigating a highlight region to access additional information relating to an asset or other features available in connection with the playlist transport bar (e.g., playlist options menu of FIG. 36).

Section V. VOD Information Screen

Figure 38:
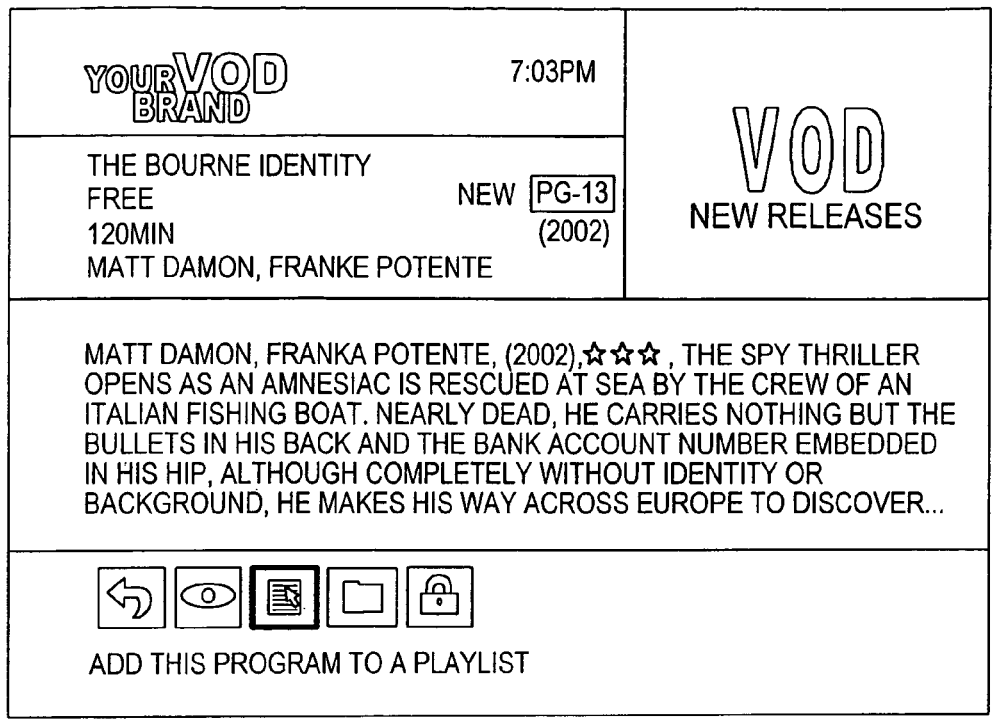
FIG. 38 shows an illustrative VOD program information screen that may be displayed in accordance with an embodiment of the invention.
Figure 39:
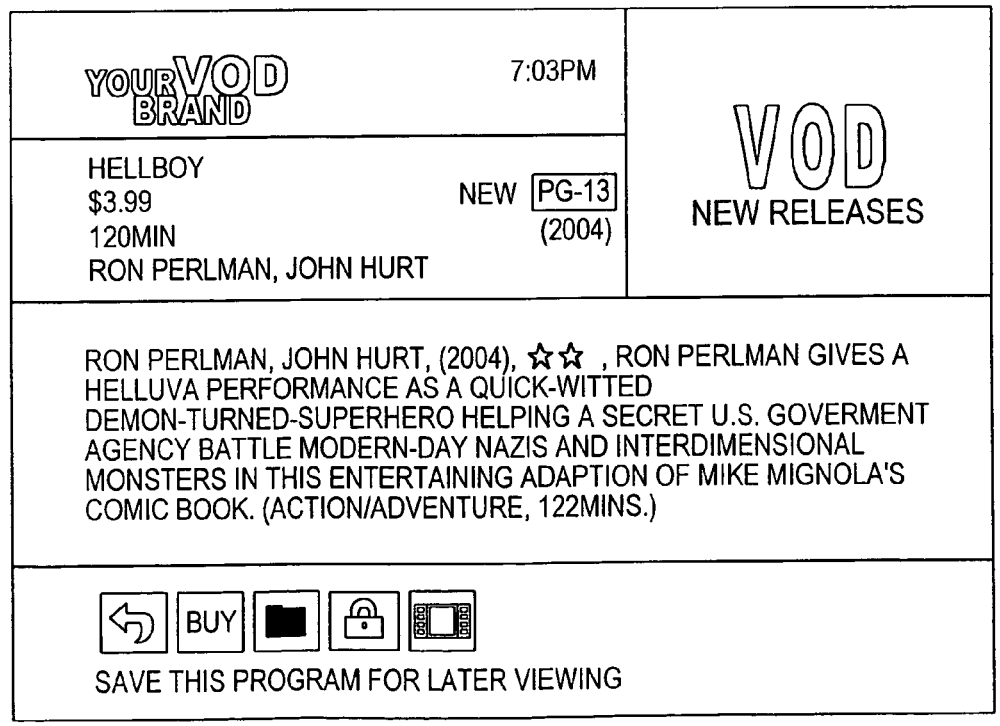
FIG. 39 shows an alternative illustrative VOD program information screen that may be displayed in accordance with an embodiment of the invention.

In some embodiments, the interactive television application (e.g., IPG), may provide users with access to playlist and bookmark features from a VOD program information screen. FIGS. 38 and 39 show illustrative VOD information screens that may be provided in response to, for example, a user selecting a VOD program listing from a VOD program listings display.

In FIG. 38, the selected program is a free VOD program and an illustrative playlist icon is highlighted. In this embodiment, only free VOD programs may be added to playlists. In other embodiments, non-free VOD programs and other types of programs may be added to playlists.

In FIG. 39, the selected program is a non-free VOD program and an illustrative bookmark icon is highlighted. In other embodiments, free VOD programs and other types of programs may be bookmarked.

In response to a user selecting the playlist icon of FIG. 38, the interactive television application may present an overlay allowing a user to select a playlist to which the program will be added, such as the Select A Playlist Overlay of FIG. 11 for example. If no playlists are set, the interactive television application may instead present an overlay that indicates no playlists are set, such as the Illustrative No Playlists Set Overlay of FIG. 3 for example.

In response to a user selecting the bookmark icon of FIG. 39, the interactive television application may present an overlay allowing the user to confirm the marking of the program, such as the Bookmark a Program Confirmation Overlay of FIG. 21.

The above described embodiments of the present invention are presented for purposes of illustration and not of limitation, and the present invention is limited only by the claims which follow.

What is claimed is:

1. A method for displaying a playlist transport bar using an interactive media guidance application (IMGA), comprising:
    displaying a playlist transport bar for a playlist, the playlist transport bar comprising:
        a plurality of asset regions, each asset region corresponding to an asset in the playlist; and
        a position indication region to provide an indication of both a first playback position within the playlist and a second playback position within a first asset in the playlist, the position indication region comprising a playback information region that includes an interactive option selectable by a user, wherein the interactive option, when selected by the user displays a playlist options menu, and textual information about the first asset in the playlist and textual information relative to other assets in the playlist, wherein the textual information provided in the playback information region is different from the indication provided by the position indication region, and wherein, during playback, the playback information region moves with the position indication region, at a same rate as the position indication region, in accordance with the playback position toward an asset that sequentially follows the first asset; and
    moving, in response to a user input, the position indication region to a third playback position within the playlist and a fourth playback position within a second asset in the playlist, wherein the third and fourth playback positions are selected by the user input as anywhere within the playlist and anywhere within the second asset in the playlist.

2. The method of claim 1, wherein the playback information region displays an elapsed playback time of the playlist.

3. The method of claim 1, wherein the playback information region displays an elapsed playback time of one of the assets.

4. The method of claim 1, further comprising:
    moving the position indication region to another position in the playlist transport bar; and
    displaying the position indication region while it is being moved.

5. The method of claim 4, further comprising playing back an asset in the playlist from the position that the position indication region was moved to.

6. The method of claim 4, wherein moving comprises fast-forwarding or rewinding the position indication region.

7. The method of claim 1, further comprising:
    receiving a command to select the position indication region; and
    moving the selected position indication region to another location in the playlist.

8. The method of claim 1, wherein the playback information region displays a name of the playlist.

9. The method of claim 1, wherein the playback information region displays a name of an asset corresponding to the location of the position indication.

10. The method of claim 1, wherein the information relative to other assets in the playlist includes total playtime of all assets in the playlist.

11. The method of claim 1, wherein the plurality of asset regions displayed in the playlist transport bar include an asset region for each asset in the playlist.

12. The method of claim 1, wherein the playlist transport bar displays a portion of a total playtime of all assets in the playlist and wherein the playlist transport bar includes asset regions for at least two assets in the playlist.

13. The method of claim 12, wherein at least one of the displayed asset regions is representative of the run-length of the asset corresponding to the displayed asset region.

14. The method of claim 1, further comprising:
allowing a user to load a different playlist while accessing the playlist transport bar.

15. The method of claim 1, further comprising:
allowing a user to modify the playlist while accessing the playlist transport bar.

16. The method of claim 1, wherein the playlist transport is displayed as an overlay that overlays a portion of a currently played asset.

17. The method of claim 1, wherein the interactive media guidance application is an interactive television program guide.

18. The method of claim 1, wherein the interactive media guidance application is an online television program guide.

19. The method of claim 1, wherein the interactive media guidance application is a Website.

20. A system for displaying a playlist transport bar, the system comprising:
a processor operative to:
display a playlist transport bar, transport bar comprising:
a plurality of asset regions, each of which corresponds to an asset in a playlist;
and a position indication region to provide an indication of both a first playback position within the playlist and a second playback position within a first asset in the playlist, the position indication region comprising a playback information region that includes an interactive option selectable by a user, wherein the interactive option, when selected by the user displays a playlist options menu, and textual information about the first asset in the playlist and textual information relative to other assets in the playlist, wherein the textual information provided in the playback information region is different from the indication provided by the position indication region, and wherein, during playback, the playback information region moves with the position indication region, at a same rate as the position indication region, in accordance with the playback position toward an asset that sequentially follows the first asset; and
move, in response to a user input, the position indication region to a third playback position within the playlist and a fourth playback position within a second asset in the playlist, wherein the third and fourth playback positions are selected by the user input as anywhere within the playlist and anywhere within the second asset in the playlist.

21. A method for displaying a playlist transport bar, comprising:
displaying at least two asset regions in a playlist transport bar, each asset region corresponding to an asset of a playlist;
displaying a position indication region in the playlist transport bar to provide an indication of both a first playback position within the playlist and a second playback position within a first asset in the playlist, the position indication region comprising a playback information region that includes an interactive option selectable by a user, wherein the interactive option, when selected by the user displays a playlist options menu, and textual information about the first asset and that allows access to information relating to other assets in the playlist, wherein the textual information provided in the playback information region is different from the indication provided by the position indication region, and wherein, during playback, the playback information region moves with the position indication region, at a same rate as the position indication region, in accordance with the playback position toward an asset that sequentially follows the first asset; and
moving, in response to a user input, the position indication region to a third playback position within the playlist and a fourth playback position within a second asset in the playlist, wherein the third and fourth playback positions are selected by the user input as anywhere within the playlist and anywhere within the second asset in the playlist.

22. The method of claim 1, wherein information about a particular asset is displayed and updated automatically in the position indication region without user input.

23. The method of claim 1, wherein the moving comprises sliding the position indication region to the third playback position within the playlist.

24. The method of claim 1, wherein, in response the user input, the position indication region provides indication of both the third playback position within the playlist and the fourth playback position within the second asset in the playlist.

25. The method of claim 1, wherein the first asset is different from the second asset.

26. The method of claim 1, wherein the first asset is the same as the second asset.

27. The method of claim 1 further comprising:
displaying a playlist window adjacent a first of the asset regions in the playlist transport bar, wherein:
the playlist window provides information about a third asset in the playlist corresponding to the first asset region and information relative to other assets in the playlist, and
the information includes playback position of the third asset;
moving the playlist window in accordance with the playback position towards a second of the asset regions in the playlist transport bar corresponding to a fourth asset, wherein the fourth asset sequentially follows the third asset in the playlist; and
changing the information provided in the playlist window automatically to provide information about the fourth asset when the playlist window is adjacent the second asset region.

28. The system of claim 20, wherein information about a particular asset is displayed and updated automatically in the position indication region without user input.

29. The system of claim 20, wherein the moving comprises sliding the position indication region to the third playback position within the playlist.

30. The system of claim 20, wherein, in response the user input, the position indication region provides indication of both the third playback position within the playlist and the fourth playback position within the second asset in the playlist.

31. The system of claim 20, wherein the first asset is different from the second asset.

32. The system of claim 20, wherein the first asset is the same as the second asset.

33. The system of claim 20, wherein the system is further operative to:
display a playlist window adjacent a first of the asset regions in the playlist transport bar, wherein:
the playlist window provides information about a third asset in the playlist corresponding to the first asset region and information relative to other assets in the playlist, and
the information includes playback position of the third asset;
move the playlist window in accordance with the playback position towards a second of the asset regions in the playlist transport bar corresponding to a fourth asset, wherein the fourth asset sequentially follows the third asset in the playlist; and
change the information provided in the playlist window automatically to provide information about the fourth asset when the playlist window is adjacent the second asset region.

34. The method of claim 1, wherein the playback information region includes an option to retrieve information relating to one of the other assets in the playlist.

35. The method of claim 1, wherein the playback information region occupies an area of a display, wherein the area comprises a width along an axis of the playlist transport bar larger than a width of the position indication region, and wherein the area occupied by the playback information region in the display moves, along the axis of the playlist transport bar, with the position indication region in accordance with the playback position.

36. The method of claim 1, wherein the playlist options menu provides an option with respect to an asset being played back.

37. The system of claim 20, wherein the playlist options menu provides an option with respect to an asset being played back.

38. The method of claim 21, wherein the playlist options menu provides an option with respect to an asset being played back.

* * * * *